US011416617B2

(12) United States Patent
Völp et al.

(10) Patent No.: US 11,416,617 B2
(45) Date of Patent: Aug. 16, 2022

(54) COMPUTING APPARATUS

(71) Applicant: Université du Luxembourg, Luxembourg (LU)

(72) Inventors: Marcus Völp, Luxembourg (LU); Paulo Esteves-Veríssimo, Luxembourg (LU); Jérémie Decouchant, Luxembourg (LU); Vincent Rahli, Luxembourg (LU); Francisco Rocha, Luxembourg (LU)

(73) Assignee: Université du Luxembourg, Luxembourg (LU)

( * ) Notice: Subject to any disclaimer, the term of this patent is extended or adjusted under 35 U.S.C. 154(b) by 235 days.

(21) Appl. No.: 16/485,287

(22) PCT Filed: Feb. 8, 2018

(86) PCT No.: PCT/EP2018/053203
§ 371 (c)(1),
(2) Date: Aug. 12, 2019

(87) PCT Pub. No.: WO2018/146207
PCT Pub. Date: Aug. 16, 2018

(65) Prior Publication Data
US 2020/0175168 A1      Jun. 4, 2020

(30) Foreign Application Priority Data

Feb. 10, 2017   (LU) .......................... 100069

(51) Int. Cl.
*G06F 21/57*   (2013.01)
*G06F 21/76*   (2013.01)
(52) U.S. Cl.
CPC ............ *G06F 21/575* (2013.01); *G06F 21/76* (2013.01); *G06F 2221/034* (2013.01); *G06F 2221/2141* (2013.01)

(58) Field of Classification Search
CPC .. G06F 21/575; G06F 21/76; G06F 2221/034; G06F 2221/2141
See application file for complete search history.

(56) References Cited

U.S. PATENT DOCUMENTS

| 4,570,261 A * | 2/1986 | Maher ................. G06F 11/0757 714/25 |
| 9,912,642 B1 * | 3/2018 | Eidt .................... G06F 21/6218 |

(Continued)

OTHER PUBLICATIONS

P. Sousa, A. N. Bessani, M. Correia, N. F. Neves, and P. Verissimo, "Highly available intrusion-tolerant services with proactive-reactive recovery," IEEE Trans. Parallel Distrib. Syst., vol. 21, No. 4, pp. 452-465, Apr. 2010 (Year: 2010).*

(Continued)

*Primary Examiner* — Jeremy S Duffield
*Assistant Examiner* — Zhe Liu
(74) *Attorney, Agent, or Firm* — Dickinson Wright PLLC; Nicholas P. Coleman

(57) ABSTRACT

There is disclosed a computing/data processing device comprising: a plurality of computing units, each computing unit comprising a computing resource; the computing device comprising at least three computing units, each computing unit comprising a/the same computing resource; each computing unit further comprising a computing unit access manager, each unit access manager being adapted to control access to the computing resource of the respective computing unit in response to at least one request; wherein, the computing unit access manager only allows a response to the at least one request if a majority of the computing units provide a same response to the at least one request; and wherein, the computing device comprising a network-on-a-chip, is provided on a chip and/or comprises an integrated chip (IC) or microprocessor. The IC beneficially comprises a Field-Programmable Gate Array (FPGA) device. In a (Continued)

preferred embodiment, the unit access manager controls access to the computing resource based on a token; the token comprising: a pointer to the respective computing resource, a set of rights relating to that computing resource, and a numerical representation of that computing resource.

19 Claims, 33 Drawing Sheets

(56) References Cited

U.S. PATENT DOCUMENTS

| | | | | |
|---|---|---|---|---|
| 10,216,949 | B1* | 2/2019 | McKelvie | G06F 21/6227 |
| 10,454,754 | B1* | 10/2019 | Patel | H04L 67/1095 |
| 2003/0007378 | A1* | 1/2003 | Regev | G11C 15/04 |
| | | | | 365/49.17 |
| 2003/0037275 | A1* | 2/2003 | Bakke | G06F 11/2089 |
| | | | | 714/4.3 |
| 2009/0122812 | A1* | 5/2009 | Steiner | H04J 3/0652 |
| | | | | 370/503 |
| 2009/0204383 | A1* | 8/2009 | Weiss | G06F 11/261 |
| | | | | 703/28 |
| 2010/0169886 | A1* | 7/2010 | Troxel | G06F 11/187 |
| | | | | 718/101 |
| 2011/0154467 | A1* | 6/2011 | Bomar | G06Q 20/385 |
| | | | | 726/9 |
| 2018/0025435 | A1* | 1/2018 | Karame | H04L 9/3236 |
| | | | | 705/30 |
| 2018/0181759 | A1* | 6/2018 | Smith | G06F 9/4416 |
| 2018/0227275 | A1* | 8/2018 | Russinovich | H04L 9/3265 |
| 2018/0267866 | A1* | 9/2018 | Venu | G06F 11/1658 |

OTHER PUBLICATIONS

Cheraghlou et al., "A survey of fault tolerance architecture in cloud computing."Journal of Network and Computer Applications, 61. Feb. 2016. p. 81-92. (Year: 2016).*

Sousa et al., "Highly available intrusion-tolerant services with proactive-reactive recovery." IEEE Trans. Parallel Distrib. Syst., vo. 21 , No. 4. Apr. 2010. p. 452-465 (Year: 2010).*

International Search Report for PCT/EP2018/053203 dated Apr. 13, 2018.

Grammatikakis, Miltos D., et al., "Security in MPSoCs: A NoC Firewall and an Evaluation Framework II", IEEE Transactions on Computer Aided Design of Integrated Circuits and Systems, vol. 34, No. 8, Aug. 1, 2015 pp. 1344-1357.

JP H08 212093A—English Machine Translation of Abstract.

Lemay, Michael, et al: "Network-on-Chip Firewall: Countering Defective and Malicious System-on-Chip Hardware"Aug. 27, 2015. Network and Parallel Computing; [Lecture Notes in Computer Science; Lect. Notes Computer], Springer International Publishing, Cham; pp. 404-426.

Asmussen, Nils, et al., "M3: A Hardware/Operating-System Co-Design to Tame Heterogeneous Manycores", Architectural Support for Programming Languages and Operating Systems, Jan. 1, 2016 pp. 189-203.

* cited by examiner

```
1  // on implicit invocation ,
2  // idx = extract log2(ci;max) highest order bits
3  // from physical address
4
5  Mon_src . invoke capability (idx , op ):
6    c = capability_register (idx );
7    if perm (op) _ c. perm {
8      tile_dest := tile (c.ptr );
9      send <invoke : c.ptr , c.auth , op , c.l>
10       to Mon( tile_dest );
11   } else {
12     signal error : insufficient access ;
13   }
14
15 Mon_dest receives
16     <invoke : c.ptr , c.auth , op , c.l>
17     from Mon_src :
18   if c. auth = ID {
19     if c.ptr points to voter {
20       voter := voter (c.ptr );
21       c := voter . capability_register (c.ptr );
22       // check rights (op) _ c. perm
23       wait for matching quorum ;
24       if mismatch {
25         signal error ;
26       }
27     }
28     forward op , c.l and p to tile ;
29   } else {
30     // c. auth != ID
31     signal error : wrong subsystem ;
32   }
```

Figure 15

```
1   // pre: Monsrc and Mondest confirmed access
2   msg . block bk arrives from replica ri:
3     if sequence (bk) != seq {
4       discard message ;
5     }
6     if p = 0 {
7       set p to 1;
8       start timer with timeout value ;
9     }
10    if bk is message header {
11      if si is empty {
12        store size in si;
13        store c.ptr. reg in regi;
14      } else {
15        drop message ; // already voted
16      }
17    } else {
18      if buffer buf i is empty at location k {
19        store bk in buf i[k];
20      } else {
21        drop message ; // already voted
22      }
23    }
24    compare all voting structures
25        (i.e., the regs si, regi, buffer
26        locations 0, ... , si □ 1; ignore empty );
27    on mismatch {
28      set err to 1;
29      if suspend = 1 {
30        suspend vote ;
31        signal error ;
32      }
33    }
34    if no. of identical messages >= quorum {
35      if not (err = 1 and suspend = 1) {
36        extract majority vote
37          (si, regi, buf i)
38        c := capability (reg$^{maj}$i );
39        forward to tile : c.ptr , c.l,
40          op := buf$^{maj}$[0; : : : s$^{maj}$i ];
41        set p := 0; seq := seq + 1;
42        clear all buffers ;
43        stop timer ;
44      }
45    }
46
47 on timeout :
48   set err = 1;
49   suspend vote ;
50   signal error ;
51
52 vote to reset arrives from replica ri:
53   set rvi = 1;
54   if rvi = 1 for quorum different replicas {
55     if res = 0 {
56       reset voter to
57         err := 0; p := 0; seq := 0;
58       clear all buffers ;
59     } else {
60       err := 0; re - check quorum ;
61     }
62   }
```

Figure 19

Label
State of the Art
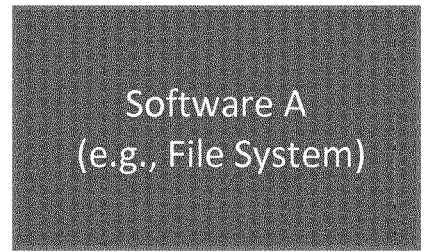
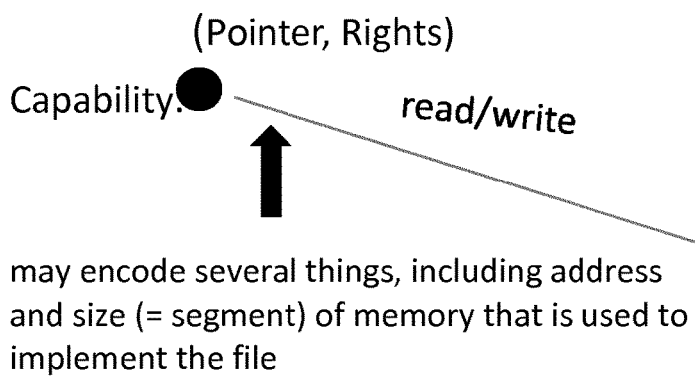
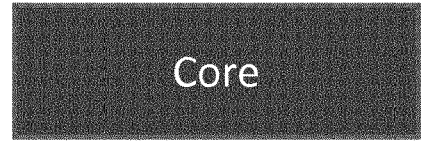
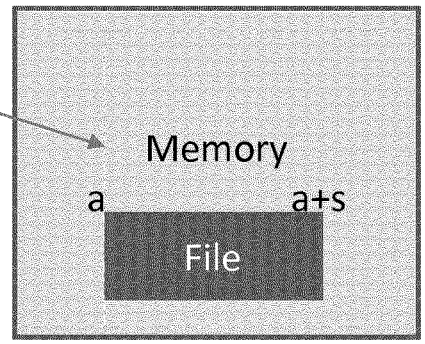
Figure 34 (a)

Firewall V Mon

Voter
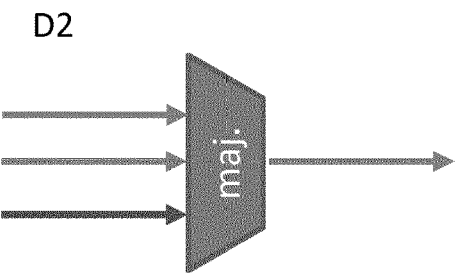
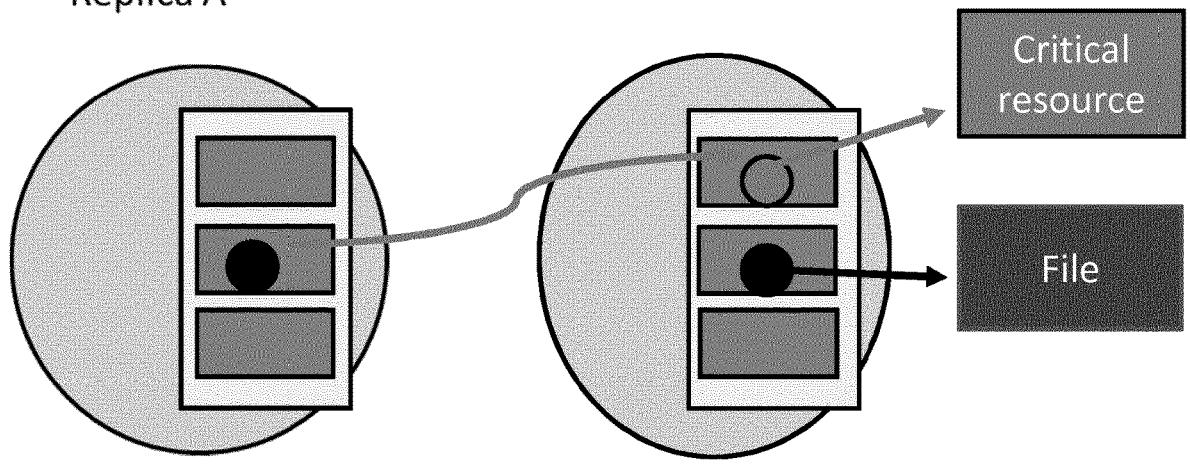
Any single replica can "invent" capabilities.
Figure 36 (a)

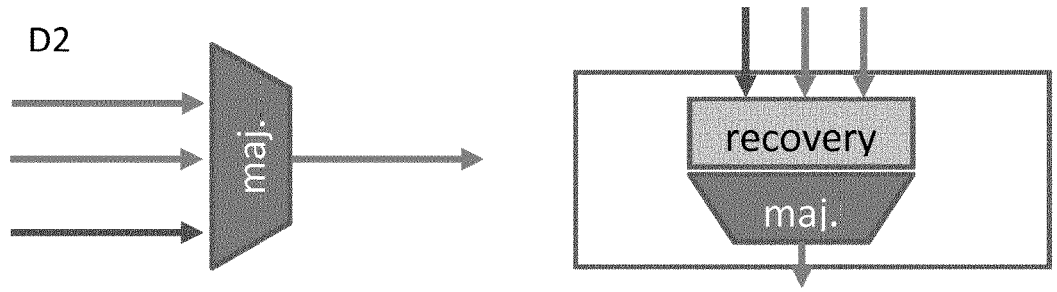
Any single replica can "invent" capabilities.
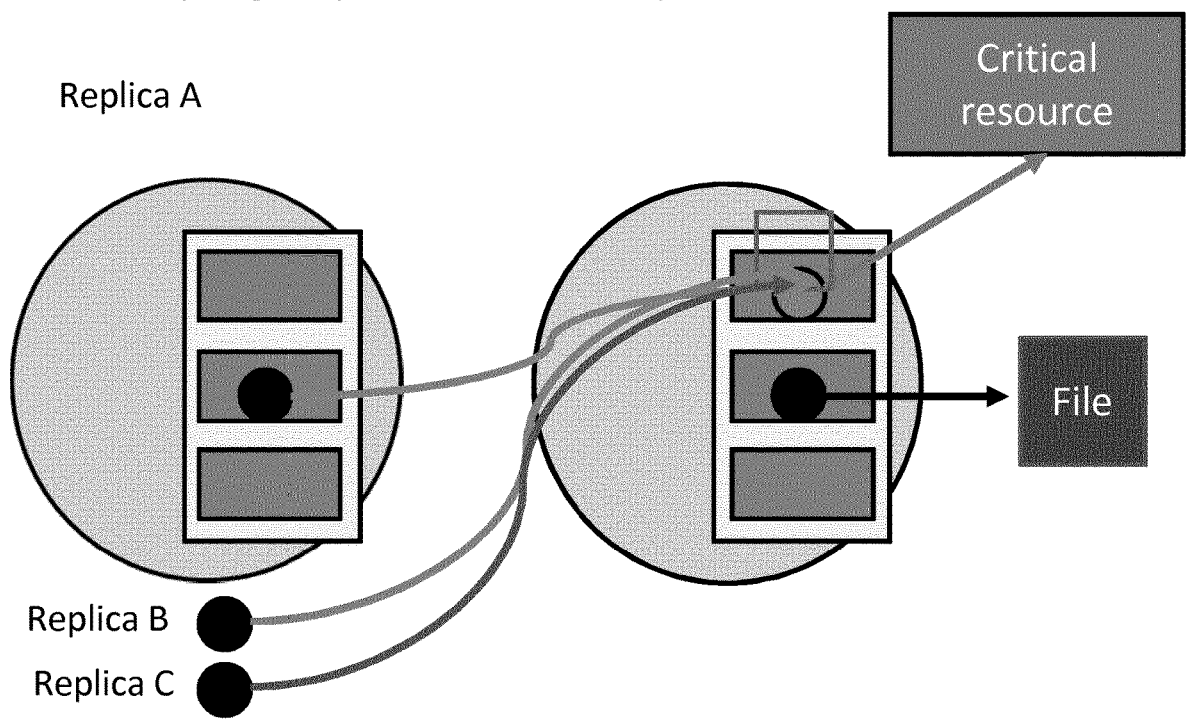
Figure 36 (b)

COMPUTING APPARATUS

This application is the national stage of International Patent Application No. PCT/EP2018/053203 filed on Feb. 8, 2018, which in turn claims priority from Luxembourg Patent Application No. LU100069 filed on Feb. 10, 2017, the disclosures of which are incorporated herein by reference in their entirety.

TECHNICAL FIELD

The present invention relates to a computer or data processing device, a computer or data processing apparatus/system, and to a method of operating a computing or data processing apparatus/system.

More generally, the present invention relates to security, dependability and/or fault and/or intrusion tolerance. More specifically, though not exclusively, the present invention relates to:

secure and dependable architectures, a middleware for resilience of large-scale systems and critical information infrastructures such as cloud, telco, or energy; privacy and integrity of highly sensitive data such as e-biobanking ecosystems and other personal or business data; adaptability and safety of real-time networked embedded systems such as connected and autonomous cars or planes.

BACKGROUND

Computers and computing resources are vulnerable to attacks, and various technologies have been developed to detect and avoid such attacks. For example, it is known to duplicate algorithm execution and compare the results (e.g. Paxos, PBFT, MinBFT). Attacks are detected and avoided by only allowing results of such an execution to be used if a majority of the replicas agree. However, these are limited to algorithms (i.e. software) and do not help to detect hardware-based intrusion in all circumstances (for example attacks targeting hypervisors). It is desirable to be able to detect and circumvent at all levels of abstraction in a computing system.

A "capability" is a token used to grant or restrict access to a computing resource in a computing system which implements capability-based security. The capability comprises a pointer and a set of rights. The pointer comprises a value which points to an object and the associated rights govern access to that object. However, the disadvantages with this is that once the capability is generated and assigned, there is no way to check the authenticity.

This is a particular problem when considering multiple hardware-based processing cores. Using the traditional system, the only way to associate a capability with a processing sub-unit is to generate a chain of trust, starting with the trusted "core" (this could be Trusted Platform Module or TPM) to generate capabilities. These chains of trust are difficult to manage and deal with and, furthermore, create a single point of failure at the first "link" (i.e. when the first capabilities are generated, which could comprise the entire system).

Herein, the Inventors will make reference to the following:
1. TPM Main Specification Version 1.2, Rev. 116 ed., Trusted Computing Group, March 2011.
2. R. M. Needham and R. D. H. Wilkes, "Domains of protection and the management of processes," The Computer Journal, vol. 17, no. 2, 1974.
3. N. Asmussen, M. Völp, B. Nöthen, H. Hartig, and G. Fettweis, "M3: A hardware/operating-system co-design to tame heterogeneous manycores," in Architectural Support for Programming Languages and Operating Systems. Atlanta, Ga., USA: ACM, April 2016.
4. A. S. Tanenbaum and M. F. Kaashoek, "The amoeba microkernel," in Distributed Open Systems, 1994, pp. 11-30.
5. J. Woodruff, R. N. Watson, D. Chisnall, S. W. Moore, J. Anderson, B. Davis, B. Laurie, P. G. Neumann, R. Norton, and M. Roe, "The cheri capability model: Revisiting risc in an age of risk," in Proceeding of the 41st Annual International Symposium on Computer Architecture, ISCA '14. Piscataway, N.J., USA: IEEE Press, 2014, pp. 457-468.
6. O. S. Hofmann, S. Kim, A. M. Dunn, M. Z. Lee, and E. Witchel, "Inktag: Secure applications on an untrusted operating system," SIGPLAN Not., vol. 48, no. 4, pp. 265-278, March 2013.
7. I. Corp., IntelÅö 64 and IA-32 Architectures Software Developer's Manual, 325462nd ed., December 2016.
8. V. Costan and S. Devadas, "Intel SGX explained," Massachusetts Institute of Technology, Tech. Rep., 2016.
9. M. Castro and B. Liskov, "Practical byzantine fault tolerance," in $3^{rd}$ Symposium on Operating Systems Design and Implementation. New Orleans, USA: ACM, February 1999.
10. G. S. Veronese, M. Correia, A. N. Bessani, L. C. Lung, and P. Verissimo, "Efficient byzantine fault-tolerance," IEEE Trans. Comput., vol. 62, no. 1, pp. 16-30, January 2013.
11. P. Sousa, A. N. Bessani, M. Correia, N. F. Neves, and P. Verissimo, "Highly available intrusion-tolerant services with proactive-reactive recovery," IEEE Trans. Parallel Distrib. Syst., vol. 21, no. 4, pp. 452-465, April 2010.
12. R. Kapitza, J. Behl, C. Cachin, T. Distler, S. Kuhnle, S. V. Mohammadi, W. Schröder-Preikschat, and K. Stengel, "Cheapbft: Resource-efficient byzantine fault tolerance," in Proceedings of the $7^{th}$ ACM European Conference on Computer Systems, ser. EuroSys '12. New York, N.Y., USA: ACM, 2012, pp. 295-308.
13. C. Chai, J. Fischer, M. Phan, and J. Silberman, "Apparatus for detecting multiple hits in a camram memory array," November 2004, U.S. Pat. No. 6,816,396.
14. P. Sousa, N. F. Neves, and P. Verissimo, "Proactive resilience through architectural hybridization," in Proceedings of the 2006 ACM symposium on Applied computing. ACM, 2006, pp. 686-690.
15. Miltos D. Grammatikakis et al: "security in MPScCs: A NoC Firewall and an Evaluation Framework", IEEE Transactions on Computer Aided Design of Integrated Circuits and Systems, vol. 34, no. 8, 1 Aug. 2015 (2015-08-01), pages 1344-1357, XP055411865, US ISSN: 0278-0070, DOI: 10.1109/TCAD.2015.2448684.
16. JP H08 212093 A (Toshiba Corp) 20 Aug. 1996 (1996-08-20).
17. Lemay Michael et all: "Network-on-Chip Firewall: Countering Defective and Malicious System-on-Chip Hardware", 27 Aug. 2015 (2015-08-07), Network and Parallel Computing; [Lecture notes in Computer Science; lect. notes computer], Springer International Publishing, CHAM, pages(s) 404-426, XP047366467, ISSN: 0302-9743, ISBN: 978-3-642-17571-8.

It may be an object of at least one embodiment of at least one aspect of the present invention to obviate or at least mitigate one or more problems and/or disadvantages in the prior art.

It may be an object of at least one embodiment of at least one aspect of the present invention to provide processing which beneficially affects the way a computing device or computer apparatus operates, e.g. with regard to security of processing and/or control of data transfer. The invention is, therefore, of a technical character implemented on a computing/computer device/apparatus.

SUMMARY

First Invention

According to a first aspect of the present invention there is provided a computing device (and/or data processing device).

The (computing) device may comprise a plurality of computing units. Each computing unit may comprise a computing resource.

The (computing) device may comprise at least three computing units. Each computing unit may comprise a/the same computing resource.

Each computing unit may comprise a computing unit access manager. Each computing unit access manager may be adapted to control access to the computing resource of the respective computing unit in response to at least one request.

The computing unit access manager may allow or only allow a response to the at least one request if a majority of the computing units provide a same response to the at least one request.

The computing device may comprise a network-on-a-chip, may be provided on a chip, and/or may comprise an integrated chip (IC) or microprocessor.

According to a preferred implementation the computing (and/or data processing) device may comprise a computing (and/or data processing) device comprising:

a plurality of computing units, each computing unit comprising a computing resource;

the computing device comprising at least three computing units, each computing unit comprising a/the same computing resource;

each computing unit further comprising a computing unit access manager, each computing unit access manager being adapted to control access to the computing resource of the respective computing unit in response to at least one request; wherein the computing unit access manager only allows (e.g. in use) a response to the at least one request if a majority of the computing units provide a same response to the at least one request; and wherein the computing device comprises a network-on-a-chip, is provided on a chip, and/or comprises an integrated chip (IC) or microprocessor.

Beneficially, the computing unit access manager may be adapted to provide for recovery of or on mismatching responses (votes) if there is not provided a majority vote. The computing unit access manager(s) may provide a recovery means or arrangement.

Advantageously, majority response (voting) may be applied to reconfiguration of a/the computing unit access manager(s). There may be provided an application/reconfiguration means or arrangement.

The integrated chip may comprise a Field-Programmable Gate Array (FPGA) device.

Each computing unit may comprise a microprocessor core.

A/the/each request may comprise an external request or an internal request.

Herein by "network-on-a-chip" is meant a network at a transistor level allowing messages to be passed between sub-regions of a microprocessor.

The computing device may comprise at least one regulator.

The/each regulator may comprise a buffer, e.g. for receiving messages from other computing units, and for sending messages comprising responses to the/each request.

In one embodiment, the buffer may be a "single daughter buffer", which may have an advantage of reduced space. In a further embodiment, the daughter buffer may include comparators or a single-match or multi-match, content-addressable memory may be used to allow identification of majority response or results.

The/each unit access manager may control access to the/the respective computing resource based on a token.

The token may comprise a pointer to the/the respective computing resource, a set of rights relating to the computing resource, and a numerical representation of the/the respective computing resource.

Provision of the numerical representation of the (computing) resource may allow the unit access manager to control access, such as directly control access, to the computing resource or specific resource optionally without affecting an entire chain, such that independent chains may be created and destroyed as needed or units booted and rebooted as required.

There may be at least three computing units and results from each may be compared by voting, such that optionally access may be allowed after a majority vote by creating a/the token.

According to a second aspect of the present invention there is provided a computing (and/or data processing) apparatus comprising at least one computing device according to the first aspect of the present invention.

According to a third aspect of the present invention there is provided a computing system comprising at least one computing system comprising at least one computing device according to the first aspect of the present invention or at least one computing apparatus according to the second aspect of the present invention.

The computing system may comprise a local area network (LAN) or a wide area network (WAN).

According to a forth aspect of the present invention there is provided a method of controlling, such as controlling access to, at least one computing resource of a computing device.

The computing device may comprise a plurality of computing units. Each computing unit may comprise a computing resource;

The computing device may comprise at least three computing units. Each computing unit may comprise a/the same computing resource.

Each computing unit may (further) comprise a computing unit access manager, which may be adapted to control access to the computing resource of the respective computing unit in respect to at least one request.

The computing device may comprise a network-on-a-chip, may be provided on a chip and/or may comprise an integrated chip (IC) or microprocessor.

The method may comprise:

the computing access manager only allowing a response to the at least one request if a majority of the coupling units provide a same response to the at least one request.

The following method steps may apply to the fourth aspect hereinbefore or the tenth aspect hereinafter.

Hereinafter for any aspects or embodiments of the inventions, let N be the set of natural numbers such that:

1 in N;

if k in N then the successor (i.e. k+1) is in N.

Further hereinafter f is a natural number, f+1 is the successor, and f is a parameter of the system describing the number of tolerated faulty replicas.

The method may comprise the step of the computing unit access manager providing recovery of or on mismatching responses (votes) if there is not provided a majority vote.

The method may comprise the step of majority response (voting) being applied to reconfiguration of a/the computing unit access manager.

In a first implementation where only f+1 coupling units may be actively participating of which up to f may diverge in their response, the computing access manager may allow or only allow a response to at least one request if all f+1 active coupling active units provide a same response to the at least one request.

Where the computing access manager may allow to change from f+1 active coupling units to 2f+1 active coupling units in case up to f coupling units diverge in their response, the computing access manager may allow or only allow a response to at least one request if at least f+1 of the 2f+1 coupling units provide a same response to the at least one request.

The number f and hence the active coupling units in error-free operation (f+1) and in the error case (2f+1) may be adjusted dynamically to reflect the risk of coupling units becoming faulty or compromised and hence diverge in their response to the at least one request.

A divergence in response by the f+1 active coupling unit may cause the computing access manager to suspend the response to the at least one request in such a way that the response of each coupling unit can be read by other coupling units without them being able to change their vote. At least agreement/disagreement to one response to the at least one request may become visible.

Coupling units may respond to the computing access manager to repeat the vote, which the computing access manager may do only if a majority of coupling units request such a repeating.

Coupling units may respond to the computing access manager to repeat the check whether a majority of coupling units have provided a same response to the at least one request.

Any of the f+1 active coupling units can trigger error recovery in the involved coupling units such that all involved coupling units read, analyse and resolve the error situation by responding to the computing access manager.

Where a found to be diverging replica is rejuvenated to a healthy state, the method may comprise several steps, each of which involve (the at least one request which) the computing access manager allowing or only allowing a response to the at least one request if a majority of the coupling units provide a same response to the at least one request.

The coupling units may perform the rejuvenation, procedure without the replica being found to diverge in its vote.

In case of a divergence in the steps for rejuvenation, the computing access manager may allow continuation of the to-be-rejuvenated coupling unit at the state prior to the rejuvenation.

Coupling units can vote to exclude/include coupling units from repeated votes. The computing access manager may not consider the vote of a coupling unit if a majority of coupling units voted to exclude this replica. It may consider the votes of this replica again after a majority has voted to include this replica.

According to a fifth aspect of the present invention there is provided a computer readable storage medium for storing computer readable instructions, the computer readable instructions being adapted to implement the steps of the method of the fourth aspect of the present invention.

According to a sixth aspect of the present invention there is provided a computer program (product) comprising software code adapted to perform the steps of the method of the fourth aspect of the present invention.

Second Invention

According to a seventh aspect of the present invention there is provided a computing (and/or data processing) device.

The (computing) device may comprise a plurality of computing units. Each computing unit may comprise a computing resource. Each computing unit may (further) comprise a unit access manager. Said unit access manager may control access to the computing resource in respect to requests.

The/each unit access manager may control access to the/the respective computing resource based on a token.

The token may comprise a pointer to the/the respective computing resource, a set of rights relating to the computing resource, and a numerical representation of the/the respective computing resource.

The numerical representation of the/the respective computing resource may be referred or comprise a label.

The numerical representation may be encoding of software which may provide the/the representative computing resource.

The computing device may comprise a network-on-a-chip, be provided on a chip, and/or comprise an integrated chip (IC) or microprocessor.

The integrated chip may comprise a Field Programmable Gate Array (FPGA) device.

Each computing unit may comprise a core of a microprocessor.

The/each request may comprise an external request or an internal request.

Provision of the numerical representation of the resource may allow the unit access manager to control access, e.g. directly control access, to the computing resource or specific resource without affecting the entire chain.

Independent chains can be created and destroyed as needed (e.g. units booted and rebooted) as required.

The unit access manager of the seventh aspect may be the same as the unit access manager of the first aspect of the present invention (e.g. there may be at least three units and results compared by voting). In such case access may be allowed after a majority vote by creating a token, as defined. Such may act to ensure that the computing unit is only accessed by trusted entities.

According to an eighth aspect of the present invention there is provided a computing (and/or data processing) apparatus comprising at least one computing device according to the seventh aspect of the present invention.

According to a ninth aspect of the present invention there is provided a computing system comprising at least one computing device according to the seventh aspect of the present invention or at least one computing apparatus according to the eighth aspect of the present invention.

The computing system may comprise a Local Area Network (LAN) or a Wide Area Network (WAN).

According to a tenth aspect of the present invention there is provided a method of controlling, such as controlling access to, at least one computing device or at least one computing resource of at least one computing device.

The at least one computing device may comprise a plurality of computing units. Each computing unit may comprise a computing resource. Each computing unit may (further) comprise a computing unit access manager which may be adapted to control access to the computing resource of the respective computing unit in response to at least one request.

The method may comprise controlling access to a computing resource based on a token. The token may comprise a pointer to the computing resource, a set of rights relating to the/the respective computing resource, and/or a numerical representation of the/the respective computing resource.

The/the respective computing resource may be the/the respective numerical representation or label which may be encoding of software (encoded in software).

The method may also comprise a step of generating a token.

According to the eleventh aspect of the present invention there is provided a computer readable storage medium for storing computer readable instructions being adapted to implement the steps of the method of the tenth aspect of the present invention.

According to twelfth aspect of the present invention there is provided a computer program (product) comprising software code adapted to perform the steps of the method of the tenth aspect of the present invention.

Other optional, preferable and/or beneficial features of any of the aspects of the present invention may be derived from the embodiments hereinafter disclosed, and in particular though not exclusively, from the section hereinbelow entitled "Beneficial Features of Embodiments of the Invention".

It will also be appreciated that any features of any of the foregoing aspects may be considered or combined one with another.

The present invention may be preferably, though not exclusively, applicable to multi-core microprocessors.

BRIEF DESCRIPTION OF THE DRAWING FIGURES

Embodiments of the present invention will now be described by way of example only, with reference to accompanying drawings, which are:

FIG. 1 a direct acyclic graph showing inter-dependencies of features and embodiments of the present invention;

FIG. 2 a direct acyclic graph showing dependencies of features and embodiments of the present invention—without dependencies to not mentioned apparati;

FIG. 3 a direct acyclic graph showing claim dependencies—simplified or minimal version;

FIG. 4 an architecture overview;

FIG. 5 an example of a tile, a Mon being located at the tile to network-on-chip interconnect;

FIG. 6 a multicore system;

FIG. 7 a manycore system;

FIG. 8 a capability invocation;

FIG. 9 a construction of enclaves in Mon-enabled manycore systems;

FIG. 10 a Mon hardware capability unit; capabilities (denoted as black dots) refer to a resource R in the tile or, in case of a reconfiguration capability the Mon reconfiguration interface; these pointers are denoted by dashed lines; the tile invokes capabilities by issuing an invocation command to the Mon;

FIG. 11 a privilege and authentication token check for a directly accessed resource;

FIG. 12 a sequence diagram of Mon-based access control (direct access);

FIG. 13 a privilege and authentication token check for a voted resource access;

FIG. 14 a sequence diagram for voted access check;

FIG. 15 a pseudo-code of Mon-based access control (direct access and voted access, see text);

FIG. 16 a privilege and authentication token check for a voted Mon reconfiguration operation;

FIG. 17 a pointer format;

FIG. 18 a Mon Voter V1: n=2f+1 message buffers store the messages of each replica;

FIG. 19 a voting operation with Mon Voter (V1);

FIG. 20 a multiple buffer variant of the Mon voter;

FIG. 21 a voter V2 example buffer allocation for f+1 matching votes;

FIG. 22 a voter V2 example buffer allocation for f+1 matching votes $A_i$ and one mismatching vote $B_j$, where A and B block arrivals interleave;

FIG. 23 a single buffer variant of the Mon voter;

FIG. 24 a voter V3 example arrival matrix for f+1 matching votes;

FIG. 25 a voter V3 example arrival matrix for mismatching votes;

FIG. 26 a set-up of reconfiguration voter capabilities in the Mons of the supervisor replicas;

FIG. 27 a voter set-up for application-level voting;

FIG. 28 a recovery after suspension with reflective consensus;

FIG. 29 a recovery after suspension with reflective consensus (the second faulty replica stays silent until short before the end);

FIG. 30 a recovery with supervisor;

FIG. 31 a proactive/reactive rejuvenation of a faulty/healthy replica;

FIG. 32 a sequence diagram: reactive rejuvenation; and

FIG. 33 a sequence diagram: proactive rejuvenation;

FIG. 34(*a*) a schematic diagram illustrating the prior art;

FIG. 34(*b*) a schematic diagram illustrating a problem in the prior art;

FIG. 34(*c*) a schematic diagram illustrating a solution according to the prior art;

FIG. 34(*d*) a schematic diagram illustrating a solution according to the present invention;

FIG. 34(*e*) a schematic diagram further illustrating the present invention;

FIGS. 35(*a*) and (*b*) schematic diagrams illustrating differences between Firewall and Mon;

FIGS. 36(*a*) and (*b*) schematic diagrams illustrating a voter arrangement according to the prior art;

FIG. 36(*c*) a schematic diagram illustrating a voter arrangement according to the present invention;

FIG. 37 an illustration of a variety of ways in which the present invention can be implemented;

FIG. 38 an illustration of an access manager according to the present invention; and FIG. 39 an illustration of how an access manager only allows a response to an at least one request if a majority of computing units provide a same response to the at least one request; and FIG. 40 an illustration of an embodiment of the present invention embodied in a Local/Wide Area Network (LAN/WAN).

DETAILED DESCRIPTION

1. Context of Invention

Inter alia the present invention is concerned with construction of secure systems which facilitate multiple, functionally-rich but large, complex and hence potentially error-prone and vulnerable operating systems (OS) next to more trustworthy execution environments called enclaves. Among the functionally rich Oss, the Inventors identify a management OS, which is first started when the platform boots and whose responsibility is to start and manage resources of enclaves and of the applications and other isolated rich OSs. That is, the platform boots in an untrusted way and later has to establish trust in the enclaves and the code executing therein.

Although this general vision is shared by many systems (including Intel SGX, ARM Trustzone and several research activities), all known solutions crucially depend on the correctness of the processor cores which execute operating-system and enclave code to convey the desired security guarantees. The coverage of this assertion is doubtful in the presence of sophisticated threats. Unlike these previous approaches, the security guarantees of our platform do not depend on the correct execution of single processor cores, but emerges from a majority of non-divergent executions in a set of cores, a minority of which can be compromised.

This invention provides a device or apparatus, hereinafter called "Mon", and a method(s) to tolerate faults and intrusions into the lowest operating-system layers (e.g. the microkernel, hypervisor or an enclave-enabling kernel). Intel SGX provides enclaves through a hypervisor-like implementation in microcode, which ensures enclave memory is either inaccessible to the management OS or properly protected by cryptographic means. In this invention disclosure, the Inventors assume enclaves are implemented on top of the lowest OS layer, irrespective of whether this layer is implemented in microcode or whether it is an inktag-enabled software hypervisor.

Traditionally, software at this low supervisor level has access to all information in all applications and it may arbitrarily elevate its privileges (e.g. by manipulating page tables, which control access to memory-mapped objects). So besides addressing integrity, embodiments of the invention also seek to prevent a minority of compromised kernel replicas from leaking information or execute sensitive, privilege-elevating operations.

The invention further extends the above-mentioned guarantees, by providing methods to recover those failed or compromised low-level components at runtime, in order to preserve the above-mentioned majority of correct cores along the timeline, against advanced persistent threats.

2. Features of Embodiments of the Invention

Referring to FIGS. 1 to 3, there is shown in diagrammatic form interdependencies of various features of embodiments of the present invention which will be more fully understood with reference to the description given hereinafter.

To ensure that only a majority of agreeing replicas can perform sensitive operations, this invention contributes the following hardware components:

A.1: An apparatus—Mon—located at the tile-to-network-on-chip interconnect of every tile in a tiled architecture. Mon is comprised of:

a) A hardware capability-enforcement unit with several capability registers, extended with a logic for storing and checking authentication tokens in the Mon ID register and in the capabilities stored in the former capability registers. Authentication tokens enhance traditional capabilities in an important way, by binding them to labels or "signatures" of software subsystems.

b) At least one reconfiguration voter hardwired to the Mon reconfiguration interface and capable of reconfiguring essential features of each Mon unit. Reconfiguration is performed as a general means to achieve error recovery of replicas detected as compromised or failed. However, such sensitive components can neither be reconfigured by themselves nor by some other Mon replica alone. Instead, the reconfiguration voter is only sensitive to a majority of healthy replicas providing the same reconfiguration instruction.

c) At least one message voter equipped with a set of capability registers, to hold capabilities referring to resources in the Mon-associated tile. Message voters are used by the supervisor replicas and by application-level server replicas when responding to client requests. Voting on these responses ensures responses are confirmed by majority of healthy replicas. Moreover, voting prevents leakage of information to which the kernel and these shared servers may have access but which must not be known by the client. The vote ensures majority agreement prior to revealing information to the client.

d) An interface, which an authenticated boot unit (e.g. TCG's trusted platform module), can be used to install a sufficiently unique identifier (e.g. a secure hash) of the subsystem booted on the Mon-associated tile.

The role of Mon is to create fault containment domains across the system's compute and memory resources at the granularity of tiles, and to protect subsystems mapped to tiles against software and hardware-level accidental faults and compromises. Fault and intrusion tolerance techniques can thus be used to achieve these goals, provided that different subsystems and replicas thereof are located on different tiles. This is readily achievable in the target multi- or many-core architectures envisioned in this invention.

A.2: A system architecture comprised of at least one authenticated boot unit, a network-on-chip (NoC) of arbitrary kind and topology, and at least 2f+1 tiles of arbitrary kind, where f is the number of simultaneously compromised tiles that should be tolerated. Where relevant, the Inventors have annotated the example configurations shown in the Figures with the number of faulty or compromised replicas f. Tiles are connected to the NoC through a Mon located at the tile-to-NoC interface of each tile. In one instance of the invention, the functionality required to create enclaves is provided through a trusted-trustworthy hardware component, which may be implemented in a distributed fashion. In another instance, a capability kernel executing in the lowest operating-system mode offers this functionality. To simplify the following description, the Inventors call both the hardware and software capability kernel the supervisor.

The following methods establish the desired security and dependability properties:

M.1: Authentication tokens: a method for enforcing subsystem authenticity during capability invocation (referring to A.1.a and A.1.d); capabilities augmented with authentication tokens not only control access to resources (tiles, containers, etc.), but also to concrete subsystems loaded therein; this innovation prevents abuse of tile access due to stale or legacy capabilities, and enables as well safe reconfiguration of modular manycore systems;

M.2: Vote shielding: a method for protecting the information involved in sensitive voting operations, at the supervisor level, in terms of access control and confidentiality (referring to A.1.b and A.1.c). The method ensures that: (a) votes are confidentiality-preserving in the sense that information and other side effects of the vote remain hidden from the target tile until a majority of replicas agree to reveal this information; and (b) privilege elevation is only possible if consensus is reached by a majority of supervisor replicas;

M.3: Quorum elasticity: a method for adjusting the number of working replicas dynamically and seamlessly at runtime (referring to A.1.b and A.1.c). Quorum elasticity is a method to change number of replicas participating in a vote while all replicas agree (normal case)/while replicas disagree (error case). The system is fabricated with a target maximum resilience, equated by the expected tolerance of a number $f_{max}$ of faults. This, in turn, implies resourcing voters and other structures to support $n_{max}=2f_{max}+1$ replicas. At runtime, both supervisor and application-level replica sets can, however, be adjusted to a certain, non-maximal level of threat, using only a subset of these resources, to tolerate $f<f_{max}$ faults. Conversely, they can be adjusted up again, should the system intend to augment its resilience. Likewise, given any working quorum $n \le n_{max}$, another instantiation of the method allows the system to be configured to work with the reduced quorums mentioned above, $n'=\min Q=f+1$, where the system can detect errors caused by up to f simultaneously faulty or compromised replicas, but not tolerate them, for which the system must elastically go back to the full quorum, $n=\max Q=2f+1$, where then not only the system can recover from or mask those errors, but also diagnose (identify) which are the faulty replicas. Conversely, the quorum can be adjusted down again, to spare resources.

M.4: Reflective consensus: a method (referring to A.1.b and A.1.c) which, when errors occur and are detected in operations involving several tiles, allows deciding about the safe reconfiguration of those same tiles. Since the decision is to be achieved in the presence of faulty or compromised tiles, only decisions consensual amongst a majority of correct tiles are implemented, in order to ensure error containment and/or avoid single-points-of-failure. That is, the set of tiles, detecting errors in one or more of them, reflect a consensus about the necessary reconfiguration actions, onto their own structure. One concrete use of this method is when tiles host replicas of some component, and hence enable the safe reconfiguration and/or self-healing of the replicated component, by having a majority of correct replicas vote unanimously on their own reconfiguration. In this invention, the method provides a way for recovering from the suspended voting mentioned above, by reflecting consensus results onto the coherent reconfiguration of the structure of the voting replicas themselves (e.g. to increase the voting quorum);

M.5: Restartable voting: a method for tentatively performing voted computations with the minimum replica quorums or voting structures that nevertheless ensure safe progress (e.g. f+1 replicas), yielding at a minimum, reliable error detection (voting divergence from at least one correct replica). The method recursively resorts to M.3 in order to determine the quorum adjustment whenever necessary, and to M.4, in order to reflectively enforce this reconfiguration onto the replicas. Any divergence or omission suspends the voting and raises an exception. The processing of the exception seeks to reconfigure the system with enough resources (e.g. 2f+1 replicas), to proceed through the end of the computation, and then voting is resumed or restarted, with the aim of allowing to perform error recovery or masking, achieving a unanimous vote of a majority of correct replicas that overrules any minority votes, and/or fault diagnosis, identifying the faulty replica(s) and possibly enabling recovery measures.

M.6: Reflective rejuvenation: a method for rejuvenating tiles, which entails a reconfiguration of the relevant replicas. The method recursively resorts to M.5, in order to vote the operations leading to the reconfiguration of the replicas. In case of voting failures arising, the method recursively resorts to M.4, in order to reflectively enforce the quorum reconfiguration onto the replicas. Part of the recovery requires repairing failed or compromised replicas, which is achieved in a reactive and/or proactive mode, depending respectively, on whether or not the fault has been identified. As it is done in a decentralised way and in the presence of faulty and possibly stealthy components, the protocols for reactive and proactive rejuvenation are based on restartable voting, to ensure that the sequence of voted steps required, each of which may be suspended by faulty replicas, terminates correctly.

3 State of the Art

The following is an account of the state-of-the-art in the context of this invention:

3.1 Tiled Architecture

Reference is made to FIGS. 4 and 5. The Inventors envisage an application of the extended hardware-capability unit—Mon (A.1)—in a tiled architecture. For the purpose of this invention disclosure, a tile is any combination of computing and storage resources that are located at the same logical position in the on-chip interconnect and that share a common network interface. FIG. 5 shows an example of a tile. Mon is located at the tile-to-network-on-chip interconnect.

The Inventors distinguish compute tiles which contain any combination of normal, general-purpose processor cores, special types of accelerators including graphical processing units, caches, tightly coupled memories and the interfaces required to access memory-mapped 10 devices (MMIO). Applications and the management OS run on compute tiles. In the proposed architecture (A.2), threads of an application or the management OS must invoke capabilities located in the Mon on the tile on which they execute in order to access resources of other tiles.

Memory tiles are inactive in that they do not run threads that invoke capabilities. They contain any combination of on-chip memories, logic (e.g. to compute error correction codes ECC) that is associated with these memories, the interfaces to access off-chip storage and MMIO interfaces. Applications on compute tiles use the storage of memory tiles as additional, compute-tile-external resources, which they access by invoking capabilities.

FIG. 6 shows an example of a small-scale multicore system and the extensions the Inventors propose to obtain architecture (A.2). Three tiles (comprised, for example of a single core with local instruction and data caches) are connected to off-chip memories and other resources, the interfaces of which the Inventors also organize into a tile. Examples of the interconnecting network include busses such as ARM AMBA, crossbars or on-chip networks. The apparatus (A.1) of this invention—Mon—interposes the network connection of each tile. A unit (e.g. a TPM [Reference 1]) capable of performing an authenticated boot is connected to the network to attest the boot process of the supervisor and of enclaves.

FIG. 7 shows an example of a larger scale manycore system. Tiles are connected through an on-chip network of arbitrary topology and kind. Shown here is a mesh interconnect. The present invention does not restrict the type of on-chip network used. In particular, Mon allows tiles to send messages in multiple parts, which the Inventors call blocks. While being delivered, blocks of a message may take arbitrary routes from the source to the destination tile and they may arrive at the destination in an arbitrary order, possibly after recombining block information that was encoded into smaller units and delivered over multiple routes. In Section 6.4 hereinbelow, the Inventors describe simplifications of the apparatus that become possible if the network conveys additional guarantees (for example if messages arrive in order). The role of the authenticated-boot unit in FIG. 6 is to initialize the Mons of the supervisor replicas.

Locating a hardware-capability unit such as Mon at the tile-to-NoC interconnect has already been proposed by CAP [Reference 2] and the M3 microkernel [Reference 3]. The trusted kernel in these systems and the core on which this kernel executes form single points of failure. That is, a software fault in the kernel or a hardware fault in the core may allow adversaries to compromise the entire system. In contrast, Mon is no single point of failure. This invention considers Mon (re-)configuration a sensitive operation, and ensures that any change to the Mon voter set-up and the creation of capabilities emerge from a majority of non-diverging votes by the supervisor replicas, a minority of these replicas may be compromised or faulty.

3.2 Capability-Based Systems

The requirement that tile-external resources can only be accessed by invoking capabilities in the Mon of the invoking thread's tile turns the Inventors architecture into a capability-based system.

In a capability-based system, possession of a capability with sufficient rights is both necessary and sufficient to access the resource to which the capability points. A capability c=(ptr,perm,l) is an unforgeable token consisting of a pointer ptr to a resource r, a set of access rights R and optionally a label l. The owner of a capability may perform an operation op on the referenced resource r, provided perm contains an access right which authorizes op. For example, to modify a region of memory referenced by a capability c, the set c.perm of this capability must contain write permissions (i.e. w∈c.perm). The label l is an application-provided value, which is stored in the capability and passed to the resource as an additional parameter when the capability is invoked to perform an operation.

In this work, the Inventors are concerned with capabilities that refer to the resources of a tile (e.g. to a region in the memory of this tile). However, with the help of the label l it is also possible to convert these low-level resources into higher level resources. For example, using the memory region as mailbox buffer for file-system operations and the label as a reference to the file. Other known uses of the label l include storing a user ID or similar values as reference for an access control policy implemented in the (file)server. FIG. 8 illustrates this example.

Capability enforcement is the process of checking access rights and forwarding the pointer ptr when an application invokes one of its capabilities. Enforcement can be by validating cryptographically-protected capabilities in the resource implementor (like in Amoeba [Reference 4]), by checking capability tables in the supervisor (like in Keykos, Eros, and the L4-family microkernels), and by hardware capability units like in CAP [Reference 2], Cheri [Reference 5] and the M3 microkernel [Reference 3]. This invention applies the latter scheme by providing the hardware capability unit Mon (apparatus A.1). In addition to checking the privileges perm at the invoking tile's Mon and forwarding the pointer ptr and the label l of c, the Inventors introduce a second, special label—the authentication token auth (M.1)—to validate the identity of the resource implementing hardware and software. The operation and its parameters are only forwarded to this implementing tile if its identity could be positively confirmed. Otherwise, if the targeted application no longer controls this tile, the operation is discarded and an error reported to the invoker (see Methods M.2 and M.9 in Section 5.0.2).

The literature discusses various interfaces to invoke capabilities in a capability unit. For example, CAP [Reference 2] offers an explicit interface, identifying a capability register and invoking the capability stored therein. In addition, Cheri [Reference 5] offers an implicit interface to support legacy applications where part of the physical address is interpreted as capability register identifier. Mon adopts both schemes. In addition, Mon adopts the scheme of the M3 microkernel and data transfer units (DTUs) by distinguishing the interface to use capabilities from the interface to reconfigure Mon. Unlike DTUs, where a single kernel is able to reconfigure the capability enforcement unit, Mon subjects such reconfiguration to a majority vote to tolerate compromise of a minority of these kernels.

The literature also discusses options for creating capabilities in hardware by deriving from a more powerful capability. For example, given a capability c to a memory region [a,d] and with rights perm, Cheri [Reference 5] allows deriving from c a memory capability c' to the region ptr'=[b,c] and with rights perm', provided [b,c]⊆[a,d] and perm'⊆perm. In addition, Cheri tags memory locations as either capability or data storage, preventing read, write access to the former. Alternatively, a software capability kernel can be used to control the creation of capabilities and to prevent misconfusing capability for data and vice versa. Mon supports both variants but ensures that the sensitive capability creation operation is subject to majority agreement.

3.3 Capability Kernel, Management Operating System and Enclaves

FIG. 9 shows the type of innovative systems the Inventors intend to construct with Mon-enabled multi- or manycore systems (A.2). The management OS is in charge of all tiles and platform resources which the Inventors assume are organized in tiles. As usual, the management OS (e.g. Linux) implements the resource management policies for these resources and it may run applications programs. However, it may also start more trustworthy execution environments— the enclaves (here, A and B)—to run security-critical parts of an application. The construction is such that enclaves do not need to trust the management OS with regard to the security properties from which they benefit.

There are several known ways to implement such an architecture:

by implementing enclaves on top of an Inktag-enabled hypervisor: an instance of a hypervisor runs in the privileged supervisor mode on every core and in every tile and implements a user- or kernel-level component, called Inktag [Reference 6]. By pre-empting the management OS' access to enclave memory whenever this enclave runs, Inktag ensures that the management OS sees enclave state only in encrypted form and that the integrity of this state is maintained whenever control is transitioned to the enclave;

by supporting enclaves in hardware: Intel SGX, Chp. 37, [Reference 8] offers a hypervisor-like implementation in microcode and a special processor mode to execute enclaves; or by executing enclaves on dedicated tiles: the M3 microkernel [Reference 3] allows isolating cores through DTUs, which enables the construction of enclaves as shown in FIG. 9.

The solution proposed by the present Inventors adopts M3's way of constructing enclaves by assigning dedicated tiles to prevent soft- or hardware errors and attacks from propagating into enclaves that are executed on other tiles. However, unlike M3 which is based on a single, necessarily trusted capability kernel, the Inventors envisage the creation of a replicated capability kernel such that even the compromise of a minority of kernel replicas cannot violate the enclaves' security properties. Since traditionally the lowest software layer (i.e. the kernel which executes in the most privileged processor mode) is in control of all platform resources, the Inventors introduce the trusted-trustworthy capability enforcement unit Mon (A.1) to prevent the kernel from directly accessing all these resources. Instead, the Inventors apply and extend Byzantine fault and intrusion tolerance techniques such that all sensitive operations, including the creation of capabilities which grant the kernel access to all platform resources, are subject to a majority vote.

The challenges, met by this invention, for creating a trustworthy supervisor, lie in: (i) minimizing the resources required for replicated kernel execution by exploiting the tight coupling of tiles through the NoC; and (ii) enabling the kernel to recover itself from a minority of compromised kernel replicas.

Further challenges arise from the dynamic nature of the system. Assume subsystem B offers a high-level resource r (e.g. a file) with the help of the low-level resources of its tiles and A holds a capability c to this high-level resource. Then for A to trust in r, it needs to know that B still controls the tiles to which its capability refers. But the management OS may relocate tiles to different subsystems, including a compromised subsystem C that mimics B to violate A's integrity and confidentiality. Authentication tokens (method M.1 of this invention) solve this problem by linking the validity of capabilities to the subsystem that controls a tile. Without such a mechanism, the capability c and, more generally, all capabilities to B must reliably be revoked prior to C gaining control over B's tiles. However, without authentication tokens, this implies either tracking all capabilities and traversing complex data structure to find and invalidate all copies of capabilities or equipping capabilities with a lease and preventing the management OS from revoking a tile from a subsystem such as B. The complexity of the former is one reason why capability-kernel based systems seldomly support revocation in hardware. The latter has non-trivial impacts on the resource management policies implemented in the management OS. Authentication tokens (M.1) solve this problem of current systems, by linking the capabilities referring to a tile, to the software generation to which it belongs.

3.4 Byzantine Fault and Intrusion Tolerance

Faulty components in a system may crash silently or they may exhibit arbitrary (i.e. Byzantine) behaviour, which other components may interpret as inputs. Byzantine fault-tolerance (BFT) protocols such as PBFT [Reference 12] or MinBFT [Reference 12] allow such behaviour to be tolerated by preventing the interpretation of a minority of responses as valid answer.

Let f be a configurable number of simultaneously present faults/component compromises that a system should tolerate, then BFT protocols ensure that a majority of at least f+1 replicas will eventually reach agreement on the request to be processed and on the response given to this request. For that, BFT protocols need a number n=3f+1 or n=2f+1 replicas, respectively, in the absence or presence of trusted-trustworthy components that prevent certain faulty behaviour. For example, the trusted-trustworthy USIG in MinBFT allows replicas to verify that message ordering is contiguous and monotonic. For that, the universal sequence and identity generator (USIG) signs and returns the hash of a message together with a cryptographically-protected counter value which it increments for each message.

The application of state-of-the-art BFT protocols in the context of this invention (supervisor resilience) is not feasible, since the former have been constructed with the assumption of loosely coupled and, in particular, independently failing nodes (e.g. servers connected via the internet). As such, they imply latency and fault independence expectations that are not easily met in state-of-the-art multi- and many-core environments. The costs of state-of-the-art BFT protocols lie in the complexity of computing steps, in the number of messages that need to be exchanged, and in the energy required by the n active replicas. In this invention, the Inventors exploit the tight coupling of tiles in on-chip networks to create a new class of protocols that makes BFT viable at chip level (M.2, M.3, and M.6), aiming at avoiding these costs. Because on-chip network latencies are at least six orders of magnitude smaller, protocol steps tolerable in a cloud setting are no longer tolerable at this low level. Instead, supervisor-level BFT protocols must be extremely fast. Beside costs, the close coupling of cores in contemporary multi—and many—core systems violates the independent-failure and compromise assumption. However, this assumption is an essential requirement for BFT protocols. Through Mon (A.1), the Inventors introduce fault independence at the granularity of tiles, an obvious point to introduce diversity, for example. Introspection and the inclusion of trusted-trustworthy voters in Mon ensures trustworthy reconfiguration of supervisor replicas by activation or self-reconfiguration through rejuvenation.

3.5 Reconfiguration

Dependable systems often rely on reconfiguration to achieve fault-tolerance, or to improve efficiency of the latter. Particular cases in fault and intrusion tolerance that have deserved some attention, are proactive and reactive rejuvenation of diverse replicas, and incrementally adjusted replica quorums.

Rejuvenation and diversification are required in the presence of continuous attacks, to prevent resource exhaustion after f replicas have successfully been compromised. Rejuvenation repairs a replica, while diversification prevents common-mode faults, ensuring that attackers cannot stage parallel attacks to several replicas, or benefit from previous successful attacks. Therefore, as long as the protocol repairs replicas faster than attackers can compromise them, the system will survive a continuous and/or persistent attack. State-of-the-art BFT protocols require n=3f+1+2k replicas for preventing resource exhaustion while rejuvenating k replicas, respectively n=2f+1+k replicas with a trusted-trustworthy component [Reference 11].

Other state-of-the-art fault and intrusion tolerant systems operate through several modes requiring incrementally higher numbers of replicas, depending on the perceived threat, or occurrence of actual errors. However, these mechanisms normally concern higher-level software (tasks, servers), and performing the mode change seamlessly and ensuring perfect error detection and fault containment, are quite delicate and normally require trust on the lower-levels of the OSs to perform the former correctly in the presence of faults.

The Mon apparatus and methods of this invention (M.2, M.5, M.4, M.6), which the Inventors detail hereinafter, innovate from the state-of-the-art, by securing perfect error detection, state preservation and fault containment, eliminating single-points-of-failure, from the lowest levels of the system up to tasks and servers, whilst ensuring exhaustion-safe reactive or proactive rejuvenation with only n=2f+1 replicas. Furthermore, they allow the seamless change of the quorum of active replicas anywhere from min Q=f+1 to max Q=2f+1, e.g. upon detection that a faulty or compromised replica prevents reaching consensus.

Although CMOS scaling resulted in abundantly available computing resources, reducing the quorum of needed replicas, and keeping those replicas inactive during most of the system activity, helps system designers to meet the energy-consumption and heat-dissipation envelope, in particular if the system is used in harsh environments (e.g. in close proximity to an engine or a car).

3.6 Authenticated Boot

For remote users of the platforms to trust in the applications running in enclaves, the platform must provide applications with a means to attest that they run in a secure set-up. Since the management OS starts first, this guarantee must be established as part of the late launch of the enclave. The state-of-the-art for authenticating the secure boot of an enclave consists of protocols implemented in a trusted platform module (TPM) respectively in an Intel provided enclave in SGX. This special Intel enclave is booted securely (i.e. only Intel-signed code runs) and extends this boot guarantee by measuring the to-be-booted application. The proof of the authenticated-boot process is thereby provided by the boot enclave/the TPM signing a message which contains the identity of the booted code (e.g. a hash) and a nonce provided by the remote user to prevent replay attacks.

This invention disclosure assumes the application of any of the above technologies to securely boot the supervisor replicas and to initialize the ID registers of the Mons of the supervisor replicas.

4 Threat Model

This invention targets advanced and persistent threats and sophisticated attacks by highly skilled and well-equipped adversaries. The Inventors, therefore, assume extreme adversarial powers. In particular, adversaries may:

T1: compromise all software-layers including the hypervisor and the microcode of processor cores;

T2: compromise tiles at the hardware level (e.g. by manipulating the IP blocks to install trapdoors that grant them supervisor privileges on the compromised tile; and T3: they may have compromised off-chip resources (e.g. a network card), which grants them a high-speed entrance to the system to persist in their attack.

The Inventors do though constrain attackers in the following ways:

T1.a: although adversaries may compromise software at all levels, the Inventors assume each attack takes a minimal amount of time $t_a$. Moreover, the Inventors assume diversification to be strong enough to not let $t_a$ shrink any further if previous attacks have been successful.

T1.b: the Inventors assume software-level attacks must be mounted through the explicit or implicit interfaces of the software component. In particular, the Inventors assume that software-level attacks to the supervisor have to go through the interfaces of the supervisor, which imply invoking a capability to send requests to the tiles of the supervisor replicas.

The rationale behind T1.a and T1.b is to restrict the degree of parallelism of the attack because the majority of correct supervisor replicas will serialize request processing. In addition, the Inventors assume:

T2.a: IP blocks are manipulated only in the digital realm. Any mixed-signal circuit is detected in the integration process and the IP-block discharged.

T2.b: The Inventors assume that all authenticated boot units, all Mons and all components of the network on chip are trusted-trustworthy components. That is, they may crash silently but they may not exhibit Byzantine behavior. In particular, the Inventors assume all state kept in these components remains unaltered or, if not, the component ceases operation in a silent manner and no such state leaves the trusted component.

T2.c: The Inventors further assume that the network delivers all messages after a bounded amount of time $t_d$, or not at all. That is, there cannot be arbitrarily long delays of messages.

T2.d: Moreover, the Inventors assume that all time bases for timeouts are reliable, in the sense of exhibiting a bounded and known rate of drift Q from real-time. Moreover, the Inventors assume that time bases are robust against changes of internal or external environmental conditions.

As long as IP blocks adhere to the digital-design rules (T2.a), the logic in the block cannot be used to successfully attack the Mon (which is located next to it), the network on chip or other tiles of the system. The trusted-trustworthy component assumption (T2.b) is justified by the simplicity of these components and by the possibility to verify their operation to the highest rigor. Error detection and correction mechanisms ensure crash on data corruption. The network assumptions (T2.c) are justifiable only with moderate coverage. In consequence, the Inventors assume the application of advanced network-coding, cryptographic network-resiliency and shielding techniques to increase the coverage of assumption T2.c. The coverage of assumption T2.d may be improved by linking timeouts to difficult to influence physical conditions (e.g. the decay of information in DRAM).

T4: Assumptions T1.a and T1.b justify our argument that with n=2f+1 replicas, the protocols the Inventors introduce continuously tolerate up to f simultaneous faults and attacks, provided replicas are repaired faster than adversaries may compromise additional replicas.

The number $n \leq n_{max}$ and hence $f \leq f_{max}$ can thereby be adjusted to match the risk of compromise (see quorum elasticity (M.3) in Section 10) hereinafter.

5 Mon (A.1)

The Inventors now describe Mon, the main apparatus of this invention, in greater detail. FIG. 10 illustrates the components of Mon and its location at each tile's networkon-chip interconnect. The Inventors say the tile at which the Mon is located is this Mon's associated tile.

As a hardware capability unit, Mon implements capability enforcement by checking the access rights of invoked capabilities. For that, each Mon implements at least one capability register, at least one message voter and at least one reconfiguration voter. The Inventors allow each Mon to be statically tailored to the applications that the Inventors anticipate to run on the associated tile. For this reason, the number of capability registers $c_{i,max}$, the number of message voters $v_{i,max}^{msg}$ and the number of reconfiguration voters $v_{i,max}^{rec}$ can be chosen individually for each Mon at hardware design time. Capability registers and the capabilities stored therein are addressed through the index $0 \ldots c_{i,max}$.

Each capability register stores a capability comprised of a pointer ptr, a set of rights perm, and an optional label l or it holds a special nil capability which provides no access and is used to encode that no valid capability is present in this register. Unlike state-of-the-art capability units, Mon provides space to store an additional label—the authentication token auth (M.1)—in each capability register. Moreover, Mon offers tile readable status bits, whose use in error reporting the Inventors describe in Section 6.1.4 hereinafter.

When the access right check succeeds, the Mon of the operation-invoking tile $Mon_{src}$ forwards ptr, l and the authentication token auth together with the operation op to the Mon of the resource-implementing tile $Mon_{dest}$, the address of which is stored in p. Once $Mon_{dest}$ receives this information, it checks whether the tile associated with $Mon_{dest}$ belongs to the intended subsystem. For that, each Mon stores the identifier of the subsystem, which is currently controlling the associated tile, in the ID register. There are two ways in which this ID register can be set:
1. By the authenticated boot unit when starting a new subsystem. In this case, the ID register is set to the secure hash of the booted subsystem; and
2. By the subsystem itself, when it expands to further tiles to which it holds a capability authorizing this expansion. During expansion, the ID value cannot be changed. Instead, the ID value from the expansion-triggering tile is copied into the ID register of the tile to which this subsystem expands.

The interface of Mon is divided into two parts with different access restrictions. The first part combines all interface functions required to invoke capabilities (e.g. to write to external memory or to load capabilities from capability storage). This part of the interface is freely accessible by any component in the tile that is associated to the Mon. It is inaccessible from other tiles. The second part is only accessible by invoking a capability, which refers to a dedicated class of voter in the Mon: the reconfiguration voters. Unlike message voters, which may contain arbitrary capabilities to resources implemented by the associated tile and which are accessed by forwarding messages to this tile, the singular capability of a reconfiguration voter is hard-wired to the reconfiguration interface of Mon, which interprets the messages received by the voter as commands.

To ensure all sensitive operations are invoked only if a majority of replicas agree to perform this operation, both types of voters are required (i.e. at least one message voter (A1.b) and at least one replica voter (A1.c)). Clearly, the creation of capabilities (i.e. reconfiguration of capability registers), rebooting the tile and reconfiguring the voting parameters are critical operations. Hence, the inclusion of a reconfiguration voter. However, also messages, which target the tile of the management OS, an application or subsystem, may be sensitive, if they originate from an application-level server or from the supervisor in case these senders have access to information which the application must not know. In this case, a single server or supervisor replica could leak this information unless consensus is required for delivering messages to these clients. Besides reconfiguration voters, Mon therefore also includes at least one message voter.

To allow self-recovery of faulty or compromised supervisor replicas, the voters in Mon implement additional functionality beyond the state-of-the-art. In the following, the Inventors first detail the access right and authentication token checks performed when invoking a capability. This invocation can be direct, in case the capability refers to the resource directly, or indirectly, if the capability refers to a voter, which requires agreement of a majority of replicas before invoking a second capability stored in the voter to perform the desired operation on the resource. After that, the Inventors detail three, structurally different variants to implement this additional functionality in the Mon voters.

The Inventors now describe the hardware capability enforcement implemented in Mon, and specifically how it enforces privileges and subsystem authenticity. In contrast to traditional, more hierarchical systems, enclave-based systems break transitive trust relations by placing all resource-management decisions of trusted subsystems under the control of an untrusted management OS. The consequence for the horizontal scheme proposed in this work, is that the tile-to-subsystem mapping is not per-se trustworthy. Instead, over time, tiles may host different generations of the same or of different subsystems. Consequently, capabilities to a tile may refer to a resource offered by a previous generation. However, in the current generation, the resource may no longer be valid or worse, adversaries may exploit this access to compromise the security or integrity of this generation. For example, assume the file system in FIG. 8 belongs to a previous generation and Tile 1 still owns capability c when the management OS reloads Tile 2 with a different subsystem. If the code of this subsystem overlaps with the message buffer, adversarial code on Tile 1, by invoking c, is able to alter this code and compromise the new subsystem on Tile 2. A precondition for a secure generation change on a tile is, therefore, that all capabilities to the previous software generation on this tile loose their validity while the generation change is performed. With the help of authentication tokens (M.1), Mon prevents such cross-generation accesses.

5.0.1 Directly Accessed Resources (M.1)

FIG. 11 illustrates the interplay between components for the privilege and authentication token check for the case where a capability directly refers to a resource R. FIG. 12 shows the sequence diagram for direct access. The pseudo-code for the complete access check (direct and voted) can be found in FIG. 15.

Cores trigger operations with capabilities through Mon's capability-invocation interface. This interface is mapped as memory-mapped 10 registers into the physical address space of all active units of the tile but not to the address spaces of other tiles. Therefore, active units of a tile can only invoke capabilities in the associated Mon but not in a Mon of a different tile.

In addition to the MMIO interface, the Inventors adopt the legacy capability interface introduced in Cheri [Reference 5]. Typically applications run in an address space of virtual addresses, which the core-local MPUs, MMUs and TLBs translate to physical addresses. To support legacy applications, which fetch code and access data through normal memory operations on virtual addresses, Cheri introduced an implicit capability-invocation scheme where part of the physical address is used as capability index. Mon optionally offers this second interface for backwards compatibility with legacy applications.

Either way, the invocation of a capability starts by identifying the capability register i to be invoked and by providing the operation op that is to be invoked on the capability c in the capability register i of $Mon_{src}$ (Step 1 in FIG. 12). After this invocation, $Mon_{src}$ checks whether the capability c conveys sufficient access rights for the operation op (Step 2). That is, it checks whether the rights $perm_{op}$ needed for op are in c.perm (i.e. $perm_{op} \subseteq c.perm$). If so, (Step 3*a*) $Mon_{src}$ sends the information in the capability c—the pointer c.p, the authentication token c.auth, the label c.l—and the operation op to $Mon_{dest}$. FIG. 11 denotes this communication by the black arrow in the NoC layer. The address of the destination tile (Tile 2), and thus of $Mon_{dest}$, is stored as part of the pointer c.prt.

If the access-right check $perm_{op} \subseteq c.perm$ fails, $Mon_{src}$ optionally signals an error to the local tile (Step 3*b*) by marking the capability register as having produced an error and by triggering an exception in one of the tile's cores. By reading these status bits (which are the only part of the capability register that can be read), the operating-system on the interrupted core can then find out about the cause of the error: insufficient access rights.

After receiving c.ptr, c.auth, op and c.l, the Mon of the targeted tile—$Mon_{dest}$ (at Tile 2)—compares the received authentication token c.auth with the subsystem hash stored in its ID register (Step 4). If this check fails (Step 5*b*), it optionally signals an error back to $Mon_{src}$ who in turn optionally signals this error to a core of the local tile (Tile 1): wrong subsystem. Otherwise, if the check in Step 4 succeeds, $Mon_{dest}$ forwards the message to the local tile (Tile 2) which in turn extracts the contained information (operation op, the pointer c.p and the label l) and executes the operation on the referenced resource. In our example in FIG. 11, this is a write of some data and the label c.l to memory location c.ptr. The Inventors deliberately excluded a success notification from the destination tile (Tile 2) to the invoking tile (Tile 1) as this notification may be used as an unchecked back channel. To signal success for operations that cannot be assumed to complete successfully after reaching the resource-implementing tile, this destination tile must invoke one of its capabilities and send a message in return.

5.0.2 Voted Resource Accesses (M.1+M.2)

FIG. 13 shows the set-up for voting on a message and hence on the operation the targeted tile may perform. FIG. 14 shows the sequence diagram for this scenario. The set-up for voted operations differs in that the invoked capability in $Mon_{src}$ does not directly refer to an object. Instead, it refers to a voter and a capability register in the voter. This capability register in turn holds a capability which refers to the resource R in the tile associated with $Mon_{dest}$.

Now, because the resource R is accessed with one additional level of indirection, there are two possibilities where to perform the access right check:
1. in the capability invoking $Mon_{src}$, by mirroring the permissions of the capability stored in the voter into the capability referencing the voter; or
2. in $Mon_{dest}$ after reaching consensus on the operation, by performing an access right check.

In the first case, the access rights of the capability in the voter's capability register are also stored in the voter capability c'. This way, before voting, $Mon_{src}$ is able to perform the complete access-right check before forwarding the message to $Mon_{dest}$ for the authentication token check. In the second case, the access-right check $perm_{op} \subseteq c.perm$ is performed by the voter in $Mon_{dest}$ after consensus is reached on the operation-triggering message. The sequence diagram in FIG. 14 illustrates the first implementation variant.

Steps 1-4 are as described above for the case where capabilities directly refer to a resource. That is, the capability register is invoked and the capability identified, $Mon_{src}$ checks the access rights and sends the message to the destination $Mon_{dest}$, this time indicating a voted operation, and $Mon_{dest}$ checks the authentication token. The protocols for voted access in FIG. 14 starts to differ from the protocol for direct access (see FIG. 12) in Step 5*a*. Rather than invoking the tile with the received operation immediately after the privilege and authentication check succeeded, the receiving replica $Mon_{dest}$ merely accepts this message as this replica's vote (Step 5*a* in FIG. 14 from now on) and waits for the other replicas to contribute their votes. Only after the $Mon_{dest}$ has seen f+1 matching votes from different replicas (Step 6), will it forward the operation for execution in the local tile (Step 7*a*). Depending on the voter implementation and configuration (see Section 6.1, 6.2, and 6.3), $Mon_{dest}$ forwards the operation proceeds once f+1 matching votes arrive, irrespective of deviating votes, or it suspends the voter to allow replicas to detect and recover from this error.

5.0.3 Voted Mon Reconfiguration (M.2, M.6)

FIG. 16 shows a special kind of voted operation: the reconfiguration of $Mon_{dest}$ by $Mon_{src}$ and further replicas. Because the configuration interface of a Mon is only accessible through a voted operation targeting one of the Mon's reconfiguration voters, no minority of replicas can elevate their privileges by creating capabilities or by reconfiguring the voter settings. Instead such a reconfiguration must originate from a majority of replicas agreeing to this sensitive operation. In FIG. 16, Tile 1 holds a capability c to the reconfiguration voter of $Mon_{dest}$. Hence it can reconfigure this Mon, provided a majority of the other replicas agree. Mon reconfiguration is as described in the sequence diagram in FIG. 14 and in the pseudo code in FIG. 15. However, instead of forwarding the agreed upon operation to the tile (Step 7*a* respectively Line 28 in these Figures), $Mon_{dest}$ interprets this message itself and acts accordingly. For example, as a result of a create-capability operation, $Mon_{dest}$ inserts a corresponding capability into the capability register that is specified in this operation.

5.0.4 Pointer Layout

In the above sections, the Inventors extracted the location of destination tile in the network, the object, the replica identifier and the register index in the addressed voter from the pointer p. FIG. 17 shows an example pointer format to store all this information. The fields tile and object refer to the resource and tile in which this resource is implemented. $r_i$ identifies the replica. reg denotes the index of the capability register in the voter.

In the following, the Inventors now detail the voting in Steps 5*a*-7*a* in the sequence diagram in FIG. 14 and Line 19-28 in the pseudocode in FIG. 15, for the different voter variants.

Restartable Voting (M.5)

The Inventors now explain restartable voting, a method for sparing chip energy consumption, whereby, given the usual quorum of n replicas to mask f faults in voted computations, max Q=2f+1, the system works with the minimum replica quorums or voting structures that nevertheless ensure safe progress, min Q=f+1 replicas. Voting is tentatively performed with min Q, since reliable error detection is always ensured (there is at least one correct replica in min Q). Upon divergence, voting is suspended, the system falls back to max Q and voting is restarted, in order to allow progress (error masking and fault diagnosis). The Inventors detail three (3), structurally different variants to implement voting functionality in Mon.

The most complete instance the Mon voter (V1), works much as usual: voter structures provide sufficient storage capacity to keep all concerned messages up to 2f+1, from which the correct message can be selected. So V1 ensures error detection and masking, and fault diagnosis (which are the faulty replicas). Variant V2 has a simpler structure, with f+1 buffers. V2 basically ensures error detection, requiring in turn a more elaborate processing for masking, and fault diagnosis. Variants V1, V2 store sufficient information to proceed with the vote once f+1 replicas agree, either directly when using max Q, or by resume, or warm restart, when resorting to max Q after a suspended vote when in min Q.

Variant V3 has an even simpler structure, with just one (1) message buffer. Voting results are stored in a more compact form. So V2 basically ensures error detection, requiring in turn a more elaborate processing for masking, and fault diagnosis. However, it trades off immediate voting progress for the smaller voter size, which implies a cold restart of the vote, which has to be repeated upon recovery from a voting error.

It is possible to combine several (e.g.) all variants V1-V3 in a single variant of the envisaged system architecture (A3) and even inside a single Mon. That is, for example, some Mon may implement voter variant V1 whereas others may provide a combination of variants V2 and V3 (e.g. to support forward recovery for a few control tasks while using the single-buffer variant for less timing critical operations). The choice of which combination of voters to include has to be made at hardware construction time.

6.1 Mon Voter (V1)

FIG. 18 illustrates the building blocks of the first voter variant (V1). In this variant, $n_{max}=2f_{max}+1$ buffers are implemented for tolerating up to $f_{max}$ faults. Whereas $n_{max}$ and $f_{max}$ are parameters that are fixed at hardware construction time, the actual number f of faults to be tolerated and hence the minimally required replicas n=2f+1 can be adjusted at runtime to adapt to the risk of exposure of the system. The Inventors call this adaptation method quorum elasticity (M.3) and return to the protocols steering this adaptation in Section 10. Initially, the quorum of all voters is set to $f_{max}$ to ensure that no single supervisor replica may use a voter before the other replicas had the chance to reconfigure it to the desired quorum strength. The parameters $n_{max}$ and $f_{max}$ can be chosen at fabrication time for each voter individually. In particular, voters with different parameters may be included into the same Mon.

The voter contains three configuration registers:
quorum encodes the number of replicas that have to agree for a vote to be accepted. That is, to tolerate f faults, quorum must be set to f+1;
suspend (susp.) is a single-bit configuration register to control voter behavior in case of mismatching votes. If suspend=1, the voter suspends the vote once a mismatch is detected, which allows healthy replicas to detect and recover from this voting error. If suspend=0, a mismatch will not suspend voting. Instead the voter forwards the message and proceeds with the next vote once quorum replicas agree in their votes. With this setting, replicas may be unable to detect the voting error, that is, the fact that at least one replica provided a mismatching vote;
resume (res) controls the behavior of a voter reset operation. If resume=1, the voter will clear the error flag and re-evaluate the received votes, after a majority of replicas agreed to reset the voter. The re-evaluation is to check whether a quorum of f+1 matching votes have been received. If resume=0, the voter will be reset to its initial state once a majority of replicas agree to reset this voter;
timeout stores the timeout value used to limit the time between the arrival of the first vote until a quorum must have been reached. Once the first message block of the current vote arrives, the timer is started and fires timeout clock cycles later.

The building blocks for voting are $n_{max}$ message buffers $buf_i$ to store up to $n_{max}$ messages with up to $m_{max}$ blocks per message. The Inventors write $buf_i[k]$ to refer to the location of the $k^{th}$ block of buffer $buf_i$. In addition, the voter provides $n_{max}$ registers each to store respectively size $s_i \le m_{max}$, the index of the voter capability register $reg_i$ and the information required to signal errors to the invoking replica in the register $src_i$. Since the Inventors signal errors by setting error bits in the capability register which stores the invoked capability, this information has to identify the source tile and the capability index of the capability register in this tile's Mon. A status register offers fields to report the occurrence of an error err, the progress bit p and the sequence number seq. In addition, the voter provides a vector of $n_{max}$ bits $rv_i$ for a majority reset operation, the behavior of which is controlled by the resume flag. At fabrication time, each voter is given $c_{max} \ge 1$ capability registers. A Mon may hold voters with different numbers of capability registers.

6.1.1 Set-Up

To tolerate up to f faults when accessing a resource R, the voter is set up as follows. The quorum configuration register is set to f+1, suspend, resume and timeout are set to the desired error processing behaviour and a capability c' is stored in a capability register of the voter which refers to R. The max Q=2f+1 resource-accessing replicas receive a capability c which refers to a dedicated substructure of the voter. More precisely, c.ptr denotes the tile, the voter, the capability register in the voter (which stores c') and a replica identifier $1 \le r_i \le n_{max}$. Using this replica identifier, each replica $r_i$ receives access to the size register $s_i$, the message buffer $buf_i$ and the bit $rv_i$ of the reset vector. Replicas with different replica identifiers thus refer to different structures, which ensures independence of votes. No replica can alter the vote of another replica, provided the supervisor ensures that capabilities to voting structures with the same replica identifier are never shared between different replicas. The $src_i$ register is configured to point back to the capability register in the Mon of replica $r_i$ that holds the voter capability.

For the supervisor replicas, the configuration of the reconfiguration voters is done as part of the authenticated boot of the supervisor. After that, it becomes the responsibility of the supervisor replicas to reconfigure message and reconfiguration voters.

6.1.2 V1 Voting Operation (Normal Case)

Voting with Mon Voter (V1) proceeds as follows. To vote, at least a minimum quorum of min Q=f+1 replicas must be active and propose an operation on a capability in the voter's capability register $c_i$. Limiting the number of replicas during normal-case operation allows the tiles of the remaining replicas to enter a power-saving mode, which reduces the energy consumption of the system as a whole and reduces the heat produced by the system. Such reductions are particularly important for critical control systems (such as engine-control units) that operate in harsh environments where active-cooling techniques cannot be applied.

Replicas initiate a vote by invoking their voter capability. $Mon_{src}$ and $Mon_{dest}$ perform the access-right and authentication-token checks discussed in Section 5.0.2 to confirm that the invoking tile has access to the voter and resource R. If one of these checks cannot confirm access, $Mon_{src}$ respectively $Mon_{dest}$ discard the vote and signal an error as described above.

To allow continuous operation in the absence of errors, the voter implements a sequence number scheme, which allows replicas to progress with votes even if some replicas lag behind. For this reason, the voter accepts only messages for the current sequence number seq while discarding all messages with a different sequence number (Lines 3-5 in FIG. 19). Notice, the pseudocode in FIG. 19 merely describes the operation of the voter and its logic. The Inventors envisage that the invention does not require that the voter is capable of executing code, although this is one possible implementation variant. The progress bit p informs the replicas whether the voting for the current sequence number has already started or whether no replica has voted yet. In particular, the combination p=0 and seq=x+1 indicates that the vote with the sequence number x has already completed successfully and x+1 has not started.

The Inventors assume, as per usual, that messages sent over the on-chip network are structured into a header with metadata information and a message payload. Each block of such a message contains the sequence number and replica identifier $r_i$ to allow out-of-order arrival. However, only the message header contains the information how long the message is (i.e. its size) and which capability in the voter it addresses. Upon arrival of the header, this information is stored in the size register $s_i$ and in the $reg_i$ register, respectively. These registers are considered part of the message to ensure that replicas not only agree on the message, but also on the size of the message and on the register that is to be invoked. Otherwise, the voter could be tricked into forwarding additional information (the buffer content $s_i+1 \ldots m_{max}$) or into invoking an operation on a different object. Recall from FIG. 10 that each capability register in a Mon has tile-readable status bits for error reporting. Locating these bits with the $src_i$ register in the voter allows a tile to process multiple operations concurrently, provided they address different objects and use different capability registers. The code in Lines 10-17 stores the message header information, provided this information has not already been provided by replica $r_i$. The Inventors do not allow replicas to alter their vote because the voter may have already based a decision on this vote and altering votes would allow malicious replicas to avoid detection in case their vote caused an error. The pseudocode in Lines 19-23 stores the message payload in the corresponding block of the buffer of this replica.

Whenever a new block is stored, the voter compares the buffers and metadata registers to see whether a matching quorum is already found. If so, it selects the buffer and metadata registers of one replica whose content agrees with the majority and invokes the operation by forwarding the operation, which is encoded in the message blocks 0, ... $s^{maj}$, to the associated tile. For that, it invokes the capability c' in the capability register $reg_i^{maj}$ (Lines 36-40). After that, it sets p=0, increments the sequence number seq and stops the timer, which was started when the first block for this vote arrives. The current vote is complete and the voter proceeds by awaiting the vote for the next sequence number.

6.1.3 V1 Error Handling

Voter variant V1 offers all error-handling options (detailed in Section 8 below). While a maximum quorum of max Q=2f+1 replicas are active, mismatching votes can be ignored by setting suspend=0. The voter will then forward a message once f+1 matching votes arrive. This rolling forward to the next vote is possible because the voter provides enough storage to keep the messages of all replica, a majority of which must agree to reach consensus.

With a minimum quorum of min Q=f+1 active replicas, errors can only be detected but the replicas that caused this voting error (i.e. the mismatch of messages) cannot be identified. The latter requires activation and voting of all max Q=2f+1 replicas. Although with a minimum quorum and diverging votes, the timeout will signal an error to all replicas, which will cause the transition to a maximum quorum after all active replicas wake up the additional replicas, it is not possible for a majority of replicas to identify faulty replicas as long as suspend=0. To diagnose faults and pinpoint a faulty replica, a majority of healthy replicas must be able to introspect the state after at least f+1 matching votes have arrived at the voter. But with suspend=0, the voter would immediately advance to the next sequence once f+1 matching votes arrive and, in this situation, a faulty replica is able to prevent detection by overwriting the previously voted data with a valid message for the next vote. For this reason, the Inventors introduce suspending of votes by setting suspend=1. In this case, the voter will not proceed to the next sequence and allows healthy replicas to introspect the buffer and thereby to identify at least one faulty replica, which has provided a diverging vote. A majority vote to reset the buffer will then continue the voting process. This continuation is either by resuming the current vote to roll forward with the information provided by the healthy replicas (resume=1). Alternatively, the voter can be reset to the initial state: err=0, p=0 and seq=0 to allow repeating the vote (resume=0).

In situations where the Inventors activate additional replicas, the Inventors assume a majority of healthy replicas are at or, as part of the wakeup, will be brought to a state where they can participate in the error recovery by voting themselves and by participating in the error recovery steps of our protocols. Known techniques to achieve this include the use of k additional replicas [Reference 11] to maintain this majority during rejuvenation and the pushing of updates to inactive replicas [Reference 12].

In one instance of the implementation, the comparison of messages is implemented with the help of a majority-gate like circuits, which return the non-empty value to which f+1 replicas agree. In another instance, a multi-hot CAM [Reference 13] in combination with an adder to count the numbers of matches and to identify a line in the content addressable memory that belongs to the majority group.

6.1.4 Error Reporting

To avoid polling Mon and voter error status and to prevent a saturation of the NoC with these messages, $Mon_{dest}$ signals detected errors back to the invoking replicas and their Mons. For that, each capability register implements bits to hold error status information. In addition, all voters contain $n_{max}$ source registers $src_i$ in which they store the Mon of the replica and the capability that this replica invoked. That is, if $r_i$ invokes a capability, $src_i$ is set to the Mon of $r_i$ and to the capability-register index used. To signal an error, $Mon_{dest}$ makes use of this information to send an error signal to $r_i$'s Mon, which this Mon interprets by setting the status bits and by raising an interrupt in the tile.

6.2 Mon Voter (V2)

The voter variants V1 and V2 differ in the way in which blocks are stored and hence in the way how errors can be detected. Rather than providing $n_{max}=2f_{max}+1$ buffers, variant V2 only provides $f_{max}+1$ message buffers and metadata registers. In addition, each block is equipped with a counter. All other components (except the arrival matrix $A=(a_{ik})$, which the Inventors describe in greater detail below) are identical to those of variant V1. With the exception of storing and comparing blocks, variant V2 also exhibits the same behavior as variant V1. That is, if a block arrives, it is checked to see whether the replica has already provided this block and if not, the block is stored in a buffer. However, because the Inventors no longer have dedicated buffers for each replica, the Inventors need to rely on the arrival matrix to perform this check.

6.2.1 Set-Up

Like voter variant V1.

6.2.2 V2 Voting Operation (Normal Case)

If none of the replicas has provided data for the $k^{th}$ block, the message buffer in the first row $buf_1[k]$ is used to store the block and the counter incremented by one. If some replica has already provided data for the $k^{th}$ block, all non-empty (counter=0) blocks in the $k^{th}$ column are checked for a match, and if so, the counter of the matching block is incremented. Otherwise, the data is stored in the first empty block in the $k^{th}$ column (and the respective counter incremented to one). The same storage procedure is applied to the size s and the capability register reg.

Once a counter reaches or exceeds quorum (i.e. f+1) this block received a majority of all replica votes. Once all blocks received such a majority, the whole message reached its quorum and can be extracted for forwarding to the tile.

FIG. 21 illustrates the case for all matching votes. Only a single buffer is required because in the case of all matches, the comparison succeeds and only the counter is incremented.

Once a mismatching vote arrives, a second row needs to be used. FIG. 22 illustrates one example where for block one and three, the vote A, which received majority, arrived before the vote B. Out-of-order arrival of message blocks may reverse this order as illustrated for block two. Therefore, one A block in every column received a count of at least f+1, the message must be reconstructed from those blocks exceeding this bound.

Notice, the information provided by counters is already kept in the arrival matrix when counting how many replicas contributed a block to the same row. Still, storing counters allows for more efficient checks of which buffer to send and whether a quorum has already been reached.

6.2.3 V2 Error Handling

Like variant V1, voter variant V2 provides sufficient memory capacity for rolling the vote forward, once the active replicas go from a minimum quorum of min Q=f+1 active replicas to a maximal quorum max Q=2f+1. Therefore, like V1, variant V2 requires suspend=1 to allow replicas to analyze the error situation before proceeding with the next vote. Voter variant V2 detects an error once the second row needs to be used.

Voter variant V2 breaks the one-to-one relationship between replicas and rows. Instead, it may happen that the blocks of multiple replicas are stored in the same row. To still be able to identify faulty or compromised replicas by the mismatching vote they caused, variant V2 implements an arrival matrix $A=(a_{ik})$. Each position $a_{ik}$ of this matrix stores, for replica $r_i$ and block k, the row in which the $k^{th}$ block of the message of this replica is stored.

To process the error, a method which the Inventors describe in greater detail in Section 8.2, healthy replicas will introspect the message buffers, counters and the arrival matrix of a suspended voter to identify at least one replica $r_i$ which contributed a mismatching vote. The first column k where there are more than one row used, reveals the mismatching vote(s). For each of those positions, say $buf_j[k]$, whose counter is less than f+1, the content of column k of the arrival matrix is scanned, looking for the value j. A standard, single-match content addressable memory (CAM) suggests itself for implementing the buffer memory.

6.2.4 Error Reporting

Like voter variant V1.

6.3 Mon Voter (V3)

Reference is made to FIG. 23. Voter variant V3 further reduces the memory space available for storing messages inside the voter to one message.

6.3.1 Set-Up

Like voter variant V1.

6.3.2 V3 Voting Operation (Normal Case)

The first data block $b_k$ that arrives for location k is stored in the message buffer buf[k] at this location. Subsequently arriving data blocks for location k are compared against this stored block. The arrival matrix stores the results of these comparisons and whether a replica has provided the stored block, in the form of the following codes:

00—initialized value.

11—replica provided the stored block.

01—replica copy agrees with the stored block.

10—replica copy disagrees with the stored block.

More precisely, initially, when a vote starts, all positions $a_{ik}$ of the arrival matrix A are set to empty (i.e. $a_{ik}$=00). Then, whenever a block $b_k$ for location k arrived from replica $r_i$, the block is stored in the buffer but[k] at location k and $a_{ik}$ set to the value $a_{ik}$=11 to indicate that $r_i$ provided this block. If $b_k$ was not the first data for location k, the block $b_k$ is compared to the stored data buf[k]. In this latter case, $a_{ik}$=01 denotes a match between the stored and received data, $a_{ik}$=10 denotes a mismatch and hence a voting error.

Consensus is reached if f different replicas $r_i$ agree to the provided data (e.g. from replica $r_j$). That is, $a_{jk}$=01 must hold for f replicas $r_i$ across all blocks, and $a_{jk}$=11 for the data-providing replica $r_j$, which sums up to a majority of f+1 agreeing replicas. FIG. 24 illustrates this case for all matching votes. Notice that the second blocks of $r_1$ and $r_2$ arrived in reverse order and thus both $r_1$ and $r_2$ are marked as being data providers. Fortunately, both replicas agree in their vote and hence it does not matter which replica has provided the data.

6.3.3 V3 Error Handling

FIG. 25 shows the same example with the inverted arrival of block 2 but this time replica $r_2$ is faulty or compromised and supplies a mismatching vote. If such a vote is the first data that arrives for location 2, the message buffer but[2] may store data for which no agreement can reached unless more than f replicas are faulty or compromised. In this case, such a vote receives a majority of disagreements $a_{jk}$=10 by the healthy replicas Naturally, proceeding with this vote is not possible, because the stored data may origin from a faulty or compromised replica. For this reason, voter variant V3 always operates with suspend=1 and suspends the vote. Moreover, because the stored data may be wrong as illustrated in FIG. 25, the voter cannot resume the current vote. Therefore, the voter also operates with resume=0 and resets to the initial state in case a majority of replicas request such a reset.

Like variants V1 and V2, variant V3 can operate with a minimum quorum of min Q=f+1 active replicas until a mismatch occurs. In this situation, any active replica may wake-up the remaining f inactive replicas to analyze the cause of this mismatch and to take corrective steps.

In addition to the arrival matrix, the buffer and the reset vector, voter variant V3 also implements a mask-out matrix $M=(m_{ij})$, whose role the Inventors discuss in greater detail in Section 8.2 where the Inventors discuss recovery from suspended votes. The matrix allows a majority of replicas to exclude another replica from participating in subsequent votes. Matrix $M=(m_{ij})$ consists of positions $m_{ij}$, one for each pair of replicas $r_i$, $r_j$, where position $m_{ij}$ set denotes that replica $r_j$ wishes to mask-out replica $r_i$. If a majority of different replicas $r_j$ agree on masking out $r_i$ by setting $m_{ij}$, replica $r_i$'s subsequent message, reconfiguration and reset votes are ignored. The replica can still participate in the mask-out vote and set/reset the matrix bits $m_{ji}$ for the other replicas $r_j$.

6.3.4 Error Reporting

Like variant V1.

6.4 Voter Simplifications

All voter variants described so far work under the assumption of out-of-order message delivery. In case message blocks arrive in order and if messages from different replicas are not interleaved, the substructure of buffers and arrival matrix as well as the logic for comparing and storing votes can be simplified. In this case, the voter waits for the arrival of the complete message before it performs the required comparisons. In this delivery scheme, it also suffices to send the replica ID $r_i$ and the sequence number seq only in the message header, but not in every block.

6.5 Comparison of Voter Variants

When going from voter variant V1 to V2 to V3, the Inventors expect a reduction of the state that have to be maintained in an error-free manner (i.e. stored with sufficiently strong error correction codes) and hence an increase in robustness and a decrease in size. In contrast, the voter logic becomes slightly more complex with increasing variant numbers as do the protocols for identifying faulty or compromised replicas. With variant V3 the Inventors lose the ability to immediately roll forward votes with mismatching contributions by the replicas, but reach the objective by repeating the vote.

Vote Shielding (M.2)

Before the Inventors return to the recovery of suspended votes, let us first highlight the application of voted message transmission and voted reconfiguration to enforce consensus among the supervisor replicas.

At the time when the supervisor replicas are started, the management OS selects $n=2f+1$ tiles to host the supervisor replicas and performs an authenticated boot of these replicas with the help of the authenticated boot unit. During this boot process n capabilities are created for each replica to reconfigure the Mons of these n tiles in a voted operation with a minimum quorum of f+1 (i.e. each replica holds a capability to the reconfiguration voter of its own Mon and one capability for the reconfiguration voter of the Mon of each other replica). FIG. 26 illustrates this set-up.

7.1 Privilege Elevation for Supervisor Replicas

During execution, whenever a supervisor replica $r_i$ needs more privileges, it coordinates with the other replicas for a coordinated privilege elevation. Because this privilege elevation involves creating capabilities in the Mons of the different replicas, this elevation is performed as a sequence of voted capability create operations. For that, all replicas agree on an order in which replicas receive capabilities (e.g. $r_1, \ldots, r_{n+1}$) and vote to create a capability in the Mon of each such supervisor replica $r_i$. The capability will be created only if f+1 supervisor replicas agree to $r_i$ receiving this capability. After that, the supervisor replicas proceed with the next replica in this order until all have received the requested capability.

Now, as the Inventors have already discussed in Section 6.1, because the replicas create capabilities one by one, compromised replicas may receive their capability earlier than healthy replicas. To prevent these replicas from utilizing their capability before f+1 replicas received their capability, voters are initialized with quorum=$f_{max}+1$. But then, as a result of quorum elasticity, the supervisor may operate at a lower quorum $f<f_{max}$, which would prevent the supervisor replicas from reaching consensus at all. To resolve this situation, the Inventors introduce a special Mon-generated reconfiguration message through which the Mons of f+1 supervisor replicas can insert the quorum of their reconfiguration voter into the quorum configuration register of other Mons. It is important that this special reconfiguration message is generated by a Mon to avoid replicas from inserting an arbitrary quorum in such a message. The important invariant, which guarantees that this operation is secure, is that only supervisor replicas hold a capability which allows them to create further capabilities by reconfiguring a Mon. Then it is up to the quorum-elasticity protocol (M.3) to consistently upgrade voter quorums if the number of tolerated faults increases.

7.2 Application-Supervisor Interaction

For its operation, the supervisor needs to be able to obtain access to all system resources. However, this access bears also the threat of misuse by modifying resources that other applications use or by reading sensitive information from applications. In combination, this allows the supervisor to convey sensitive information to an application that is not cleared by the system's security policy to see this information. Information is leaked.

To prevent a minority of supervisor replicas from tampering with the integrity of applications or to leak sensitive information, the response channel from the supervisor replicas to the application is a voted message channel. That is, the supervisor is set up such that each supervisor replica holds a capability to a message voter in the application's Mon and this voter is configured to a quorum of f+1 and to hold a capability to a message buffer in the application's tile memory. Because no message is forwarded to the application that has not reached consensus, supervisor responses to system calls do not leak information.

While executing system calls, the supervisor may have to elevate the privileges of an application or it might need to grant itself access to additional resources. The latter follows the privilege elevation protocol described hereinbefore in Section 7.1. Elevating application privileges follows a similar protocol. Instead of reconfiguring a supervisor Mon, the supervisor replicas vote to change the configuration of the Mon of an application tile.

7.3 Voted Application-Application Interaction (M.9)

Besides using Mon voters for supervisor-application replies, it is also possible to set up voted message channels between applications. The use of Mon voters thereby helps accelerating voting operations between application-level server replicas and their clients, provided both execute on different tiles of the multi- or many-core system.

Except for the error handling options, the set-up is as described hereinbefore in Section 7.2. FIG. 27 illustrates this set-up. Client capabilities directly refer to a message buffer in the replicas of the application-level server. To avoid leakage, the response is through a message voter in the client's Mon to ensure all replies reach consensus.

8 Reflective Consensus (M.4)

Unlike application-level voting where replicas can revert to the supervisor replicas for assisting in the recovery, supervisor replicas are confronted with the fact that there is no further, more privileged software layer below the supervisor to recover replicas. For this reason, votes require a reconfiguration of the supervisor replicas, achieved by consensus amongst the majority of correct replicas, so that reconfiguration operations are coherently reflected on the structure of the supervisor replicas themselves.

Both, application-level votes and supervisor votes, receive support by the Mon voter to detect error situations which require recovery in order to: reliably identify the potentially faulty or compromised replicas that caused such a voting error; and to recover from the suspended vote. In the following, the Inventors detail this support for the voter variants V1, V2, and V3.

8.1 Error Detection and Replica Identification

All voter variants have built-in means to detect voting errors and to identify the replicas that caused this error. At least a minimum quorum of f+1 active replicas is needed, to detect any error. The vote fails if there is disagreement in the message or message metadata to which all replicas should agree. As long as all f+1 replicas agree to an operation, the Inventors can safely consider this operation to be correct because: (i) f−1 forms a majority out of the total of 2f−1 replicas, as long as our assumption of at most f faulty or compromised replicas holds (T4); and (ii) agreement of f+1 replicas implies that at least one healthy replica is enforcing the operation and that, therefore, the other f replicas (even if they are compromised but stealthy) follow the correct values.

8.1.1 Voter V1

In voter variant V1, each replica inserts its vote into a dedicated message buffer and into dedicated metadata registers for storing the size $s_i$ and the invoked voter capability register $reg_i$. If error detection is enabled (i.e. suspend=1), the voter suspends the vote once two message buffers deviate in their values.

Now, with a minimum quorum of min Q=f+1 active replicas, errors can be detected but not recovered from or masked; there is not enough redundancy to guarantee that the error-causing replica can be identified or overruled. With up to f faulty or compromised replicas, f such replicas may be in the set of active replicas. In this situation, the deviating vote may originate from the single healthy replica in this set. To reliably identify a faulty or compromised replica causing a fault, the other replicas must, therefore, be activated and they have to participate in the vote. Only then, with a maximum quorum of max Q=2f+1 now active replicas, a majority of f+1 replicas can reliably outvote up to f faulty or compromised replicas. The recovery procedure (detailed in FIG. 28) therefore proceeds with one or more replicas waking up the remaining f inactive replicas, requesting them to participate in the vote. Once f+1 rows agree in their values, a majority is reached and any row diverging from these values can be discharged as originating from a faulty or compromised replica.

Voter variant V1 allows to proceed with the vote, which will forward the message of the f+1 agreeing replicas. For that, replicas perform a voted resume or reset operation, respectively: if resume=1, it will recheck the quorum and set the voter in a state where it accepts the next message (resume); or, if resume=0, the vote can be aborted (reset) and more heavyweight corrective actions started, such as the rejuvenation or relocation of a replica.

8.1.2 Voter V2

With voter variant V2, the same recovery options exist as with variant V1. However, since the buffers are no longer assigned to specific replicas, the arrival matrix has to be analyzed. Voter V2 signals an error situation once a second row of buffers needs to be used to store the first deviating block. In this error case, let $buf_x[k]$ be the buffer for the $k^{th}$ message block of row x that received f+1 or more agreeing votes after all replicas have been activated, then all replicas that offered a block which is stored in a different buffer row, $buf_y[k]$, x≠y, disagree with the majority and therefore are considered faulty or compromised. The arrival-matrix position $a_{ik}$ for block k of replica $r_i$, records in which row that block was stored. In our example, a value $a_{ik}$≠x indicates a faulty or compromised replica.

8.1.3 Voter V3

Voter variant V3 suspends the vote and signals an error immediately one of the replicas disagrees with the data block stored in the buffer. This disagreement may be: legitimate if a faulty or compromised replica has provided the data block, in which case, after switching to max Q active replicas, that faulty replica will be exposed by f+1 or more replicas disagreeing with this value; or illegitimate, if at least f+1 other replicas agree on the stored value. To identify faulty or compromised replicas, replicas must, therefore, investigate the arrival matrix for a location k. If this location received a majority of agreements ($a_{ik}$=11 or $a_{ik}$=01 from f+1 or more different replicas $r_i$), the disagreeing replicas $r_j$ with $a_{jk}$=10 are considered to be faulty or compromised. If the location received a majority of disagreements ($a_{ik}$=10 for f+1 or more different replicas $r_i$), the data-providing replica $r_j$ with $a_{jk}$=11 and all agreeing replicas $r_i$ with $a_{ik}$=01 are considered faulty or compromised.

In addition, replicas may not respond (i.e. $a_{ik}$=00). The Inventors consider all replicas that have not responded to a vote within a certain configurable time to be faulty. For that, the voter programs a timeout and wakes up all replicas in case this timeout fires. No further votes are accepted after this timeout has fired. Therefore, all replicas with $a_{ik}$=00 are considered to be faulty.

8.2 Recovering from Suspended Votes

To recover from suspended votes, voter variants V1 and V2 offer sufficient storage space to roll forward the vote once f+1 replicas agree. To perform such a roll forward, the replicas simply vote to resume the vote which, after at least f+1 replicas agree to the resuming, causes the voter to clear the error flag and re-check the quorum. If now, during this re-checking, f+1 or more matching rows could be found (for voter variant V1) respectively if all blocks received a count of at least f+1 in one of the rows (for variant V2), the message receiving this quorum is forwarded to the tile or interpreted by the Mon in case the vote was a reconfiguration request.

In FIG. 25, the Inventors show an example where a faulty replica provides data that is stored in the single buffer of voter variant V3 but that is later out-voted to be incorrect by the other replicas providing their values. Naturally, if this happens, the data stored in the buffer must not be used for invoking the capability in the voter. The Inventors, therefore, concluded that voter variant V3 necessitates a reset and repetition of the vote. A crucial step in the recovery is, therefore, for the healthy replicas to vote to reset the buffer in order to repeat the vote. However, without any further precaution, the faulty replica could simply vote again and cause the voter to suspend for any subsequent vote. To ensure that an identified faulty replica cannot disturb the progress of the repeated vote, voter variant V3 implements the mask-out matrix to allow healthy replicas to vote on masking out identified faulty replicas by issuing a special mask-out request. More precisely, if replica $r_j$ votes to mask out replica $r_i$, the flag $m_{ij}$ is set to 1 in the mask-out matrix M. If $r_j$ votes to mask in replica $r_i$ the flag is cleared. A replica $r_i$ with at least f+1 flags $m_{ij}$=1 from different replicas $r_j$ cannot participate in subsequent message votes until this number drops below f+1. It can still participate in votes to mask-out/mask-in other replicas and to reset the voter.

Unfortunately, faulty or compromised replicas may remain stealthy during the repetition. However, if all replicas remain stealthy and participate in the vote with a correct value, the vote succeeds as desired. Therefore, each time a vote diverges on data, there must be at least one faulty or compromised replica to diverge from the majority and the voter ensures that healthy replicas can identify this replica by introspecting the voter. Now, once identified, the healthy replicas vote to mask out the identified faulty replica, which reduces the set of replicas to participate in the next round by one faulty replica. Therefore, latest after f repetitions, only healthy replicas remain and the vote is guaranteed to succeed under the Inventors assumption of at most f faults.

FIG. 28 shows the sequence diagram for this recovery and for the situation where f replicas out of the minimum quorum of f+1 replicas are faulty. Recovery starts after a diverging vote (Step 1 in FIG. 28) by waking up the additional f inactive replicas (Step 2), which contribute their votes (Step 3). After that, all healthy replicas introspect the arrival matrix and buffers (Step 4) to identify at least one of the faulty replicas which caused the diverging vote. Before repeating this vote, the healthy replicas vote to mask out this identified replica (Step 5) and to reset the voter (Step 6) to allow for the repetition. The repetition is executed with one faulty replica less, but another faulty replica may manifest itself this time. The procedure is repeated, in a worst case f times, until the vote succeeds or the last faulty replica is masked out, which allows the vote to succeed with the remaining f+1 replicas. However, note that there are always enough healthy replicas, at least n−f, to produce correct voting operations.

8.3 Recovering from Suspended Votes by Reflecting Exceptions to the Supervisor Replicas Reflective consensus is essential for the recovery of votes which aim at reconfiguring the Mon of a supervisor replica. For other votes (by application-level server replicas or supervisor replicas) a slightly simplified recovery is possible which works by requesting the supervisor replicas to assist in the recovery and perform a reconfiguration of the stuck voter. FIG. 30 illustrates this recovery method in a sequence diagram. Again, recovery becomes necessary if at least one replica (e.g. $r_1$) issues a vote (Step 1 in FIG. 30) and at least one other replica (e.g. $r_2$ or $r_3$ or both) disagree with the voted message (Step 2). The mismatch causes the voter to suspend the vote (Step 3) and to signal an error to the voting replicas, the healthy of which will check the error (Step 4) and invoke the supervisor for recovery (Step 5). The supervisor replicas in turn introspect the voter (Step 6) to identify a faulty replica as described in Section 8.1 (Step 7). Once identified, the supervisor replicas may reset the tile of the faulty replica to rejuvenate the replica or they may relocate the replica to a different tile in case a fault persists to occur at the hardware level or in case of hardware-level compromise (Step 8). The possibly repaired replicas proceed by re-executing the vote after the supervisor replicas have voted to reset the voter (for variant V3) or to resume the vote (for the other two variants V1 or V2).

9 Reflective Rejuvenation (M.6)

Reflective rejuvenation is an application of reflective consensus to repair compromised replicas by rebooting them into a new, sufficiently diverse instance. Unlike rejuvenation in classical BFT protocols, reflective rejuvenation aims at ultra-low latency reboots and reconfigurations of individual tiles, not of entire server systems in cloud scenarios. Moreover, the Inventors aim to preserve our assumption T2, that the computing resources (cores, accelerators, etc.) inside a tile are not necessarily trustworthy. Hence, reflective rejuvenation does not rely on tile-internal resources to execute through a sequence of steps to establish the new replica state. But in a tiled architecture, such sequences occur naturally if the Inventors aim at the same time to keep the trusted-trustworthy component as simple as possible to increase the coverage of our correctness assumption (T2.b). For example, a typical sequence to reboot a single tile is to stop tile execution; copy bootstrapping code into the tile's local memories; reconfigure the tile's capabilities to grant read access to the system image to be loaded; cause the tile to start executing the bootstrapping code.

At the chip-level, that is, when rebooting the entire system, the bootcode may be drawn from ROM or from an external flash memory to allow updates of the bootcode. However, the complexity of the BIOS code needed to gain access to flash and the difficulties of tightly integrating flash and logic hardware processes, ask for a different solution when rebooting individual tiles. Reflective rejuvenation provides this solution by allowing replicas to transition through a sequence of voted boot steps, which are applied to the rejuvenated replica after they receive consensus.

As usual [Reference 14], the Inventors distinguish reactive rejuvenation and proactive rejuvenation. Reactive rejuvenation repairs a replica that has been positively identified as being faulty of compromised. Because at most f replicas may be compromised (see assumption T4), with a maximum quorum of n=2f+1, f+1 healthy replicas plus f−1 potentially faulty or compromised replicas (if any) are in the set of replicas that participate in the rejuvenation (the healthy of which with the goal of repairing the identified faulty replicas). The left part of FIG. 31 illustrates this situation for f=2 for the worst case of f faulty or compromised replicas (shown in red).

Proactive rejuvenation repairs replicas periodically irrespective of whether they have been identified as being faulty or compromised. By proactively rejuvenating replicas, the system limits the exposure of these replicas to the attacker and renders un-useful the information an adversary may have learned about these replicas. The right-hand part of FIG. 31 illustrates the situation where a healthy replica is rejuvenated and f faulty or compromised replicas are in the set of replicas that participate in the rejuvenation. In this situation, the healthy replicas no longer have a majority over the faulty or compromised replicas in this set. Reflective proactive rejuvenation is still able to rejuvenate replica $r_1$ by reflecting error situations back to all supervisor replicas $r_1, \ldots, r_5$ to allow them to first perform a reactive rejuvenation of the replica that has prevented the proactive rejuvenation of $r_1$.

In the following, the Inventors describe reflective reactive and proactive rejuvenation in greater detail.

9.1 Trusted-Trustworthy Reset

To perform proactive rejuvenation, the Inventors extend Mon to perform the following three operations:

1. a voted pre-empt operation to stop all cores while maintaining their state;
2. a voted reset operation to divert the bootstrapping core to a fixed (or, alternative voted upon location) from which it starts executing the first instruction of the bootcode. Reset is executed conditionally to the constraint that the cores of the tile are still preempted. If this constraint is not met, reset returns with an error; and
3. a non-voted resume operation, to continue the cores of a preempted tile at the same positions where they have been pre-empted.

Due to the above-mentioned constraint of reset, resumed tiles cannot be reset until they are pre-empted again. In addition the Inventors define hard reset as an atomic pre-empt and reset and stop as a non-state-preserving pre-emption. One implementation of stop causes the tile and all cores in this tile to enter a deep (i.e. not necessarily state-preserving) sleep mode. Another, more simplistic implementation of stop is to redirect all cores to a jump instruction with the address of this instruction as branch target. The Inventors allow the tile to lose any state except for the bootcode, which the Inventors copy into some local data and instruction memory in this tile. Notice, the Mon does not belong to this tile and, therefore, cannot be affected by the deep sleep mode. If the hardware in the tile works correctly, the Inventors assume it adheres to these operations, after which the only way for memory to change is by Mon issuing DMA-like memory transfers. Still, the Inventors assume Mon to track resume operations and also to keep track of which source tile issued such a resume operation. This way, irrespective of whether the tile adhered to the pre-emption, reset will fail if the Mon of a tile has seen a resume. The Inventors return to the point of failing cores in Section 9.4.

Reflective reactive rejuvenation will use stop followed by a hard reset to prevent a tile from avoiding rejuvenation, whereas reflective proactive rejuvenation makes use of a simple pre-empt followed by reset if not already resumed to prevent resource exhaustion. If some operation other than a diverging vote causes a replica to be suspected to be faulty, the other replicas must be more careful in reactively rejuvenating this replica to account for the possibility that a healthy replica is suspected. In this case (i.e. suspicion without proof), replicas have to follow the reflective proactive rejuvenation protocol to still be able to resume the rejuvenated replica in case f other replicas reveal themselves as faulty. The Inventors now describe these protocols in greater detail.

9.2 Reflective Reactive Rejuvenation

As mentioned above, reflective reactive rejuvenation is only applied after a replica has reliably been identified as faulty (see Section 8.1 hereinbefore on error detection and replica identification). In this case, a maximum quorum of max Q=2f+1 replicas are active. Let in our example, $r_1$ be the replica to rejuvenate. Then the set of rejuvenating replicas $S_{rej}=\{r_2, \ldots, r_{2f+1}\}$. In this set, at most f−1 faulty replicas are tolerated to be faulty or compromised, because the Inventors already identified one faulty replica and the algorithm tolerates at most f such replicas (see assumption T4).

FIG. 32 illustrates the sequence diagrams of the reflective reactive rejuvenation protocol (for f=2). First, the rejuvenating replicas vote to stop the tile of the replica to rejuvenate (Step 1 in FIG. 32). A tile is stopped if all active units (i.e. cores, accelerators, FPGA tiles, etc.) stop executing code. More precisely, the Inventors assume that those parts of the instruction and data memory of the tile, into which the Inventors will copy the new bootcode, will not change until the tile undergoes a hard reset other than by this copy operation. After the tile is stopped, the replicas vote on transferring the boot code and an initial set of capabilities (Step 2). Through these capabilities, the replica will be able to pull in additional state and further capabilities (e.g. to communicate with the other replicas). The last vote (Step 3) is to perform a hard reset on the tile. This hard reset, will cause at least one core to invoke the bootstrap code which, depending on the tiles bootstrap procedure, will reactivate the other cores.

Now, because up to f−1 faulty or compromised replicas may remain in $S_{rej}$, the reconfiguration votes for performing the stop and hard reset of the to-be-rejuvenated tile and the message transfers, for copying in the bootcode, may get suspended and need recovery. With voter variants V1 and V2 and a maximum quorum of max Q=2f+1, the f+1 or more healthy replicas in $S_{rej}$ are able to roll forward all votes by resuming the vote. In the following, the Inventors therefore focus on voter variant V3.

To roll forward through the recovery of one replica in order to then rejuvenate and thereby recover any other failed replica, the replicas in $S_{rej}$ vote to mask out those replicas that are hindering the progress of the protocol. The important observation here is that replicas have to have a data mismatch in the vote for the overall protocol to not make process. But introspecting the voting structures in the voter allows replicas to identify faulty replicas. With this information at hand, the replicas then further reduce $S_{rej}$ by masking out any additionally identified faulty replica (see Step 5 in FIG. 28 highlighting the reflective consensus recovery protocol). Now because with each suspended vote, the healthy replicas identify at least one faulty or compromised replicas, latest after f−1 repetitions, all tolerable faulty or compromised replicas have been identified and as long as assumption T4 holds, the to-be-rejuvenated replica (in our case $r_1$) will be rejuvenated. After rejuvenation of replica $r_1$, the healthy replicas can reactively rejuvenate all replicas that, in the progress of rejuvenating $r_1$ have been identified to be faulty or compromised. Once rejuvenation succeeds on a masked-out replica, the healthy replicas vote to mask-in this replica.

9.3 Reflective Proactive Rejuvenation

It is important that reflective reactive rejuvenation is only invoked on a replica that has positively been identified faulty. The reflective proactive rejuvenation protocol, which the Inventors discuss now, can also be used when the replica has not yet been identified as being one of the tolerated f faulty or compromised replicas. Proactive rejuvenation periodically invokes this protocol. However, as the Inventors have seen above, the protocol for reflective proactive rejuvenation will also be used during reactive rejuvenation if a replica is suspected but not proven to be faulty. Proactive rejuvenation is performed with a maximum quorum of max Q=2f+1 active replicas. If not all replicas are active, the healthy replicas will activate them prior to initiating the reflective proactive rejuvenation protocol.

Now, the invention may find the situation that only f replicas in $S_{rej}$ are healthy and up to f replicas are faulty or have already been compromised (like in the right-hand part of FIG. 31). This situation occurs if the replica the invention rejuvenates is in fact a healthy replica. Unfortunately, without reliable identification by the trusted-trustworthy voter, the Inventors cannot know whether or not the to-be-rejuvenated replica is healthy. In this situation, stopping a healthy replica unconditionally brings us into a situation where the Inventors may enter resource exhaustion: the Inventors may run out of enough healthy replicas to outvote compromised ones.

The following protocol ensures that the rejuvenation process is reversible during most part of it—so that, in case of voting conflicts, the (healthy) replica can be used to re-establish the voting quorum maintaining the majority—until the point in time when the rejuvenation process can be reliably rolled forward (i.e. until the point in time where no more votes are required to complete the rejuvenation). This implies that the proactive rejuvenation is postponable, though for a pre-defined maximum period in time.

FIG. 33 shows the sequence diagram for reflective proactive rejuvenation. In order not to lose the to-be-rejuvenated replica (in the example $r_1$) for subsequent majority votes, the protocol starts by pre-empting the tile of $r_1$ (Step 1 in FIG. 33). Because, unlike a stopped tile, a pre-empted tile maintains all its state, a resume operation will bring back this replica to its previous state from which a healthy replica will participate in the recovery. Now, while pre-empted and assuming the hardware of $r_1$'s tile is correct, memory changes occur only by Mon performing DMA like operations. Under these assumptions, it is safe to proceed with the same step as for reactive rejuvenation by copying in the new bootcode into a memory region which is not required by the replica during normal operation (Step 2). In this step, the replica is also provided with the capabilities needed for continuing the reboot. Again these capabilities are stored in a subset of the capability registers that are not used during the recovery process of this replica. Therefore, when resumed, the replica's old state (plus possibly part of the new state) will already be resident and can be used to assist in the recovery process. Now, if all these votes (including the following) succeed (i.e. none of the faulty replicas proposes a diverging message), the rejuvenation completes with a voted reset to the bootcode (Step 3). From this point on, the old state is no longer needed and the replica will pull in the required state with the help of the initial capabilities provided. The rejuvenation succeeds.

However, if one of the votes in the Step 1, Step 2 or Step 3 fails, any of the voting replicas may start the reflective recovery process for this failing vote by resuming the to-be-rejuvenated replica ($r_1$) to re-create the maximum quorum of n=2f+1 of which at most f replicas are faulty or compromised. But now, in order for such a vote to fail, one of the faulty replicas must deviate in the vote or otherwise $r_1$ would be rejuvenated. But this is only possible by issuing a diverging message, which the trusted-trustworthy voter will detect. After resuming, the subset of f+1 or more healthy replicas will reliably identify this diverging replica. In this case, proactive rejuvenation is postponed, and reactive rejuvenation of this latter (diverging, thus faulty) replica is immediately attempted, after which proactive rejuvenation is resumed. Because each time the proactive rejuvenation fails at least one faulty or compromised replica is identified, latest after f repetitions, the proactive rejuvenation succeeds.

9.4 Reflective Relocation

In the previous two sections, the Inventors assume that the hardware of the tile to rejuvenate works correctly. Now, of course, this assumption is not justified as the Inventors want to anticipate hardware-level faults and compromises, though within the bound of f simultaneously faulty or compromised replicas. Therefore, after reactively or proactively rejuvenating tiles, the tile itself may remain compromised due to a persistent hardware fault or hardware-level compromise. Therefore, if replicas experience or suspect continuous fault of a tile, they go through the following relocation protocol to silence the permanently damaged tile and move the (supervisor) replica to a different tile.

The Inventors assume relocation only occurs in a reactive fashion. That is, the set $S_{rel}$ of relocating tiles consists of at least f+1 healthy plus at most f−1 faulty of compromised replicas. With this majority of healthy replicas, a vote is performed to silence the Mon followed by a sequence of capability creation votes to obtain reconfiguration privileges to a new tile. After that, the steps of reflective reactive rejuvenation are performed to install the missing replica on the newly selected tile. Like reset, silence is a voted reconfiguration message interpreted by Mon, which instructs to cut any communication between the tile and the network on chip. The system survives persistent attacks until no more tiles are available that are not compromised or faulty at the hardware level, provided of course that hardware-level faults and compromises adhere to the independence assumption.

10 Quorum Elasticity (M.3)

The quorum configuration register in all three voter types and the possibility to use a different voter with more built-in message buffers and voting structures, allows to adjust the number f of tolerated faults and compromises, including those of the supervisor replicas. The following protocol ensures that:

1. supervisor replicas stay in control of all reconfiguration voters; and
2. no reconfiguration voter remains with a quorum below the current level of risk (expressed in terms of number of tolerated faults f) after the protocol has transitioned to the new quorum.

The second property is security critical because if a reconfiguration voter is left behind with a quorum of f+1, while the system is in a state where f>f+1 faults are to be tolerated, outstanding capabilities to this voter may grant faulty replicas access to the capability creation function of this Mon and in consequence also to all system resources.

10.1 Quorum Increase/Decrease

The two necessary steps to perform a quorum increase/decrease are:

1. to reset all reconfiguration voters to their initial quorum of $f_{max}+1$ replicas and to invalidate all outstanding capabilities that refer to voters except those that are used to reconfigure supervisor replicas as shown in the set-up of reflective consensus (see FIG. 26); and
2. to adjust the quorums of the reconfiguration voters for reflective consensus to match the desired risk level.

To decrease the quorum size, the above two steps have to be executed in the mentioned order because otherwise, too few supervisor replicas would be present to perform this change. To increase the quorum size, it is purposeful/beneficial to execute the requests in reverse order to quickly benefit from the additional replicas for the supervisor modes. Moreover, first adjusting the reflective-consensus quorum before adjusting individual voters avoids a race condition with the voted quorum-copy operation, which was discussed in Section 7.1 hereinbefore. Note, however, the risk expressed above remains until both steps complete.

The first step requires the supervisor replicas to undergo a sequence of voted operations, each of which first resets the voter to the initial maximum quorum of $f_{max}+1$ and then, one by one, invalidates all outstanding capabilities to these voters in the supervisor (and other) the invention uses the same algorithm to adjust quorums of message voters replicas. Since the supervisor is able to create capabilities as a voted process, there is no need to keep more capabilities to reconfiguration voters in non-supervisor tiles and because after creation of such capabilities, the supervisor is able to copy its quorum, there is no need to keep replication of other replicas configured when they are not actively used in the near future.

To increase the quorum size, the second step proceeds by allocating new supervisor replica tiles and by reconfiguring their Mons to extend the structure of FIG. 26. Because replicas lose their ability to copy a smaller quorum once their is increased, the reconfiguration of the new tiles must complete before quorums of the existing supervisor tiles are adjusted. Shrinking the quorum size is simpler because additional replicas are available to vote with the original quorum size f+1. However, care must be taken to not take over faulty replicas, because these faulty replicas may be the majority in the new, smaller quorum size. For this reason, quorums are best shrunk immediately after all replicas have been rejuvenated.

11. Comparison of the Present Invention (Second Invention) with Prior Art

A comparison will now be given between the prior art (such as Reference 15) and the present invention (Second Invention).

Figure 1:
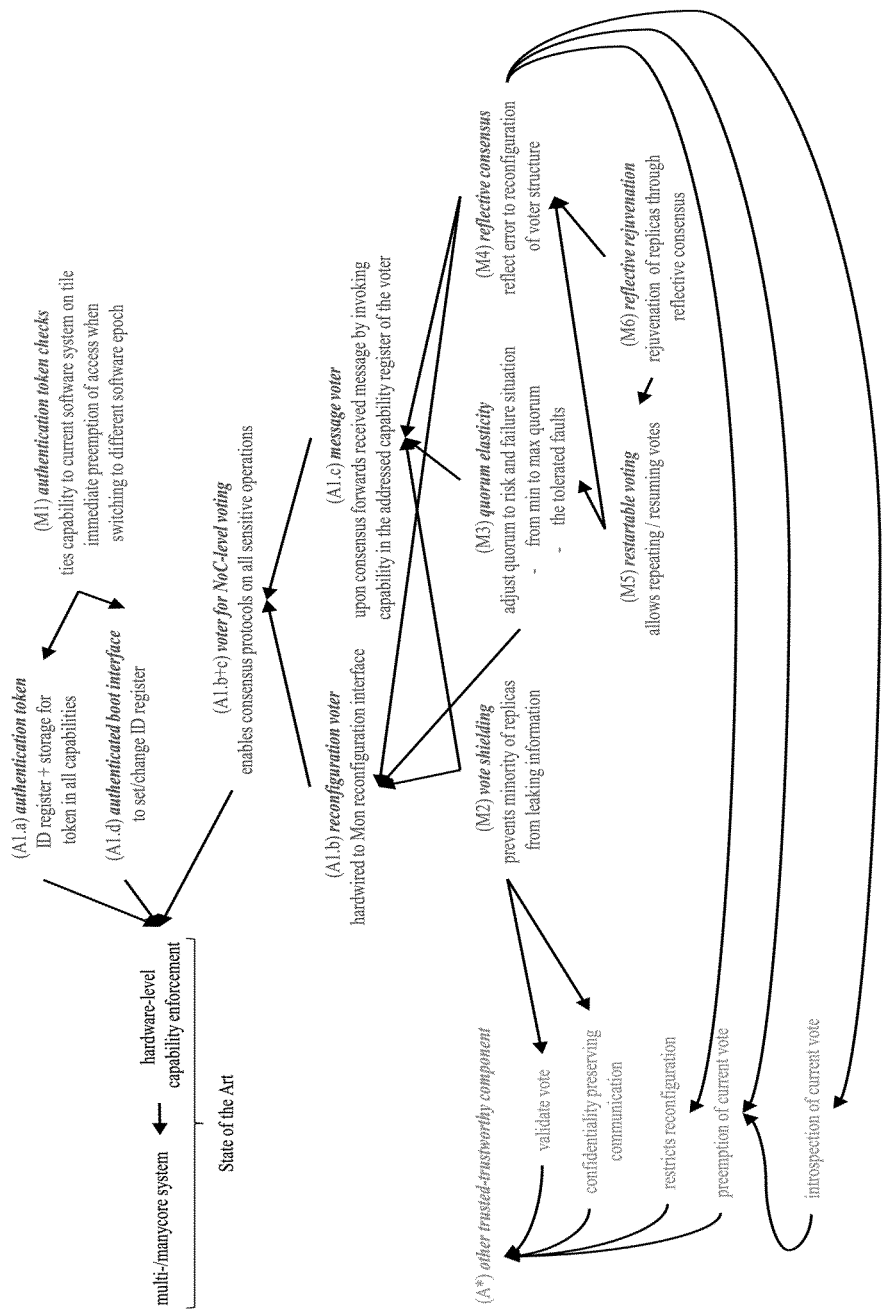
Figure 2:
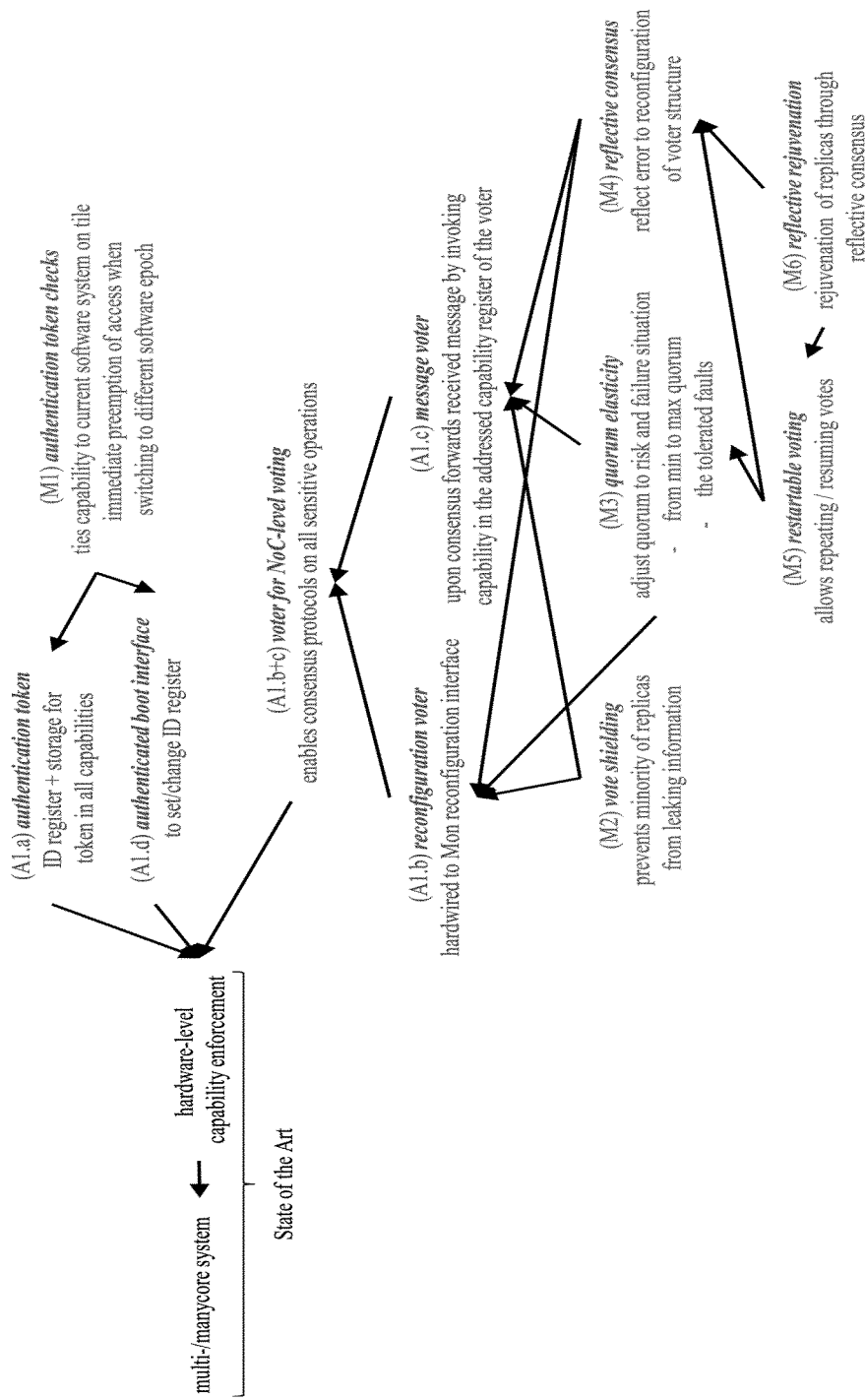
Figure 3:
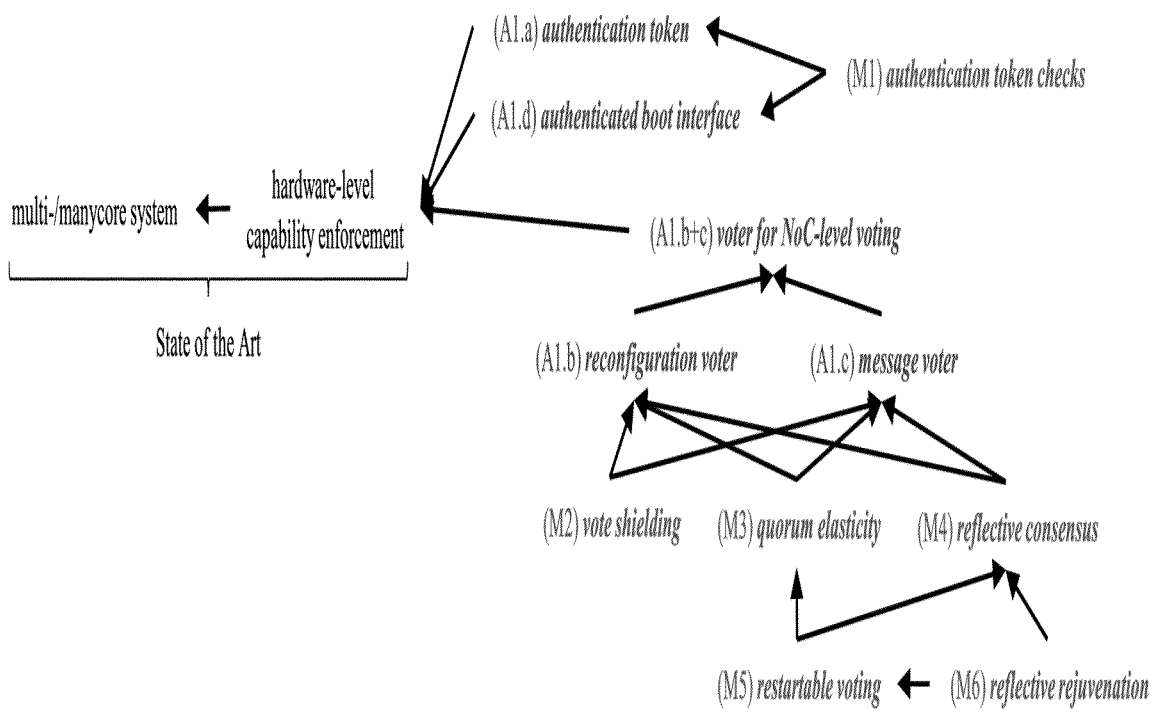
Figure 4:
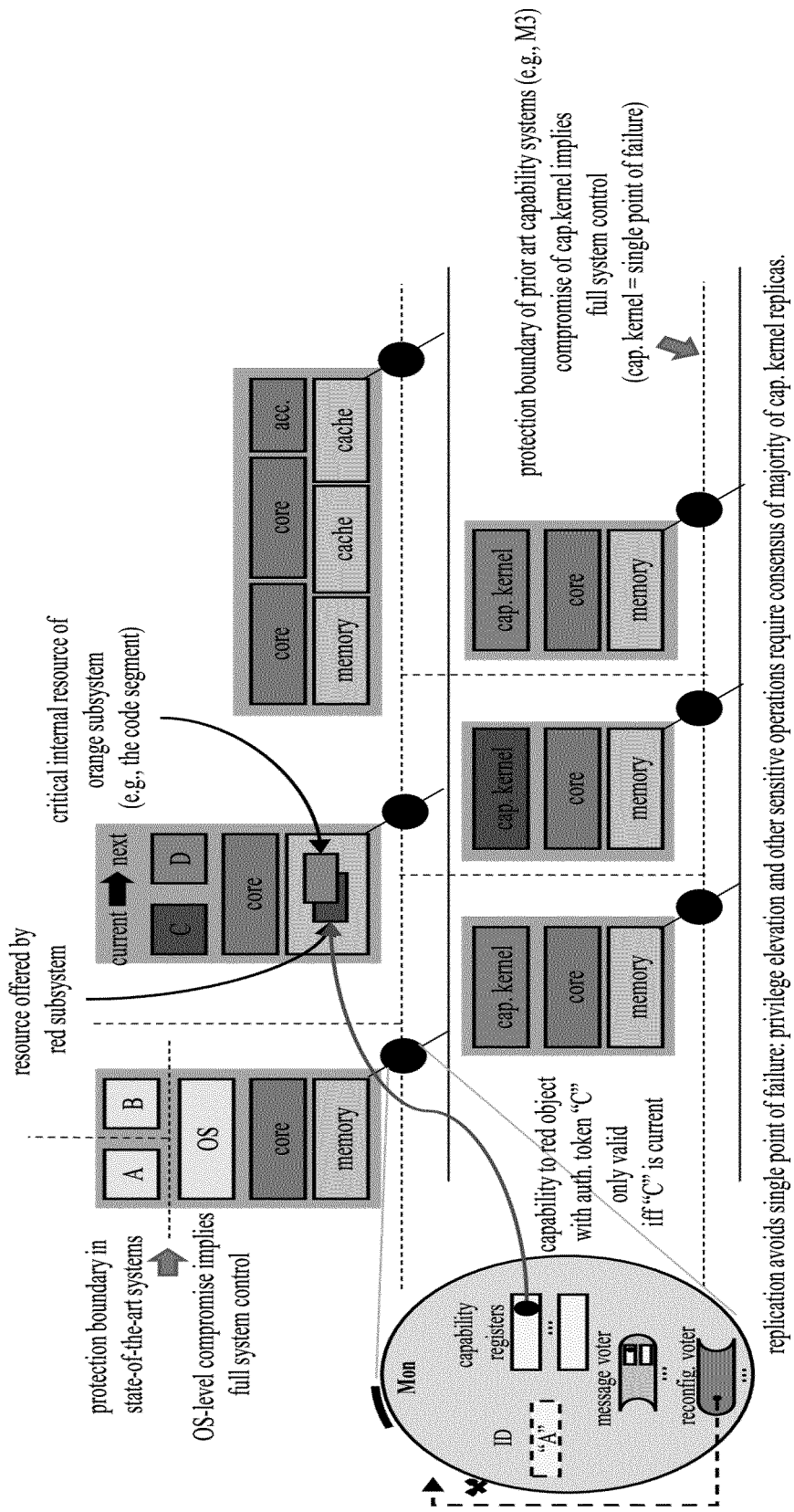
Figure 5:
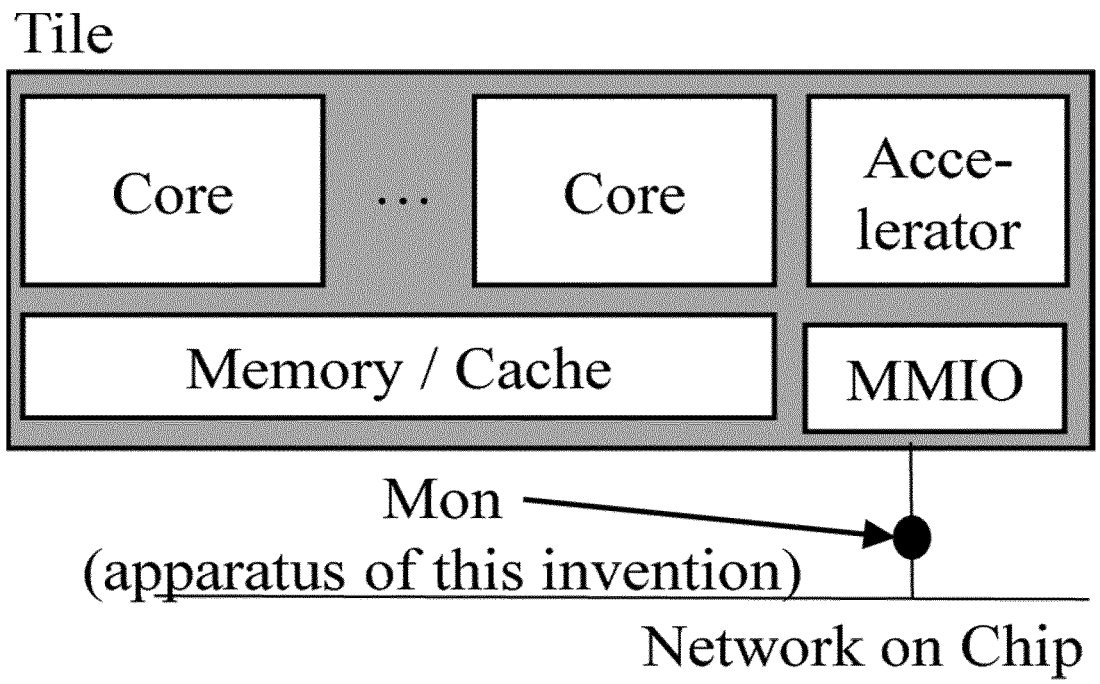
Figure 6:
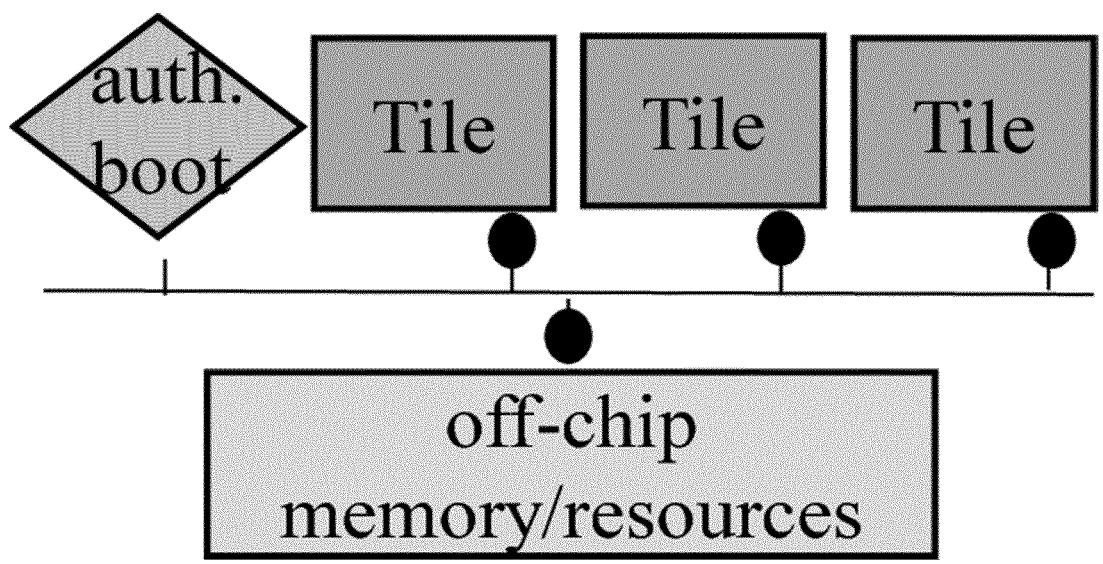
Figure 7:
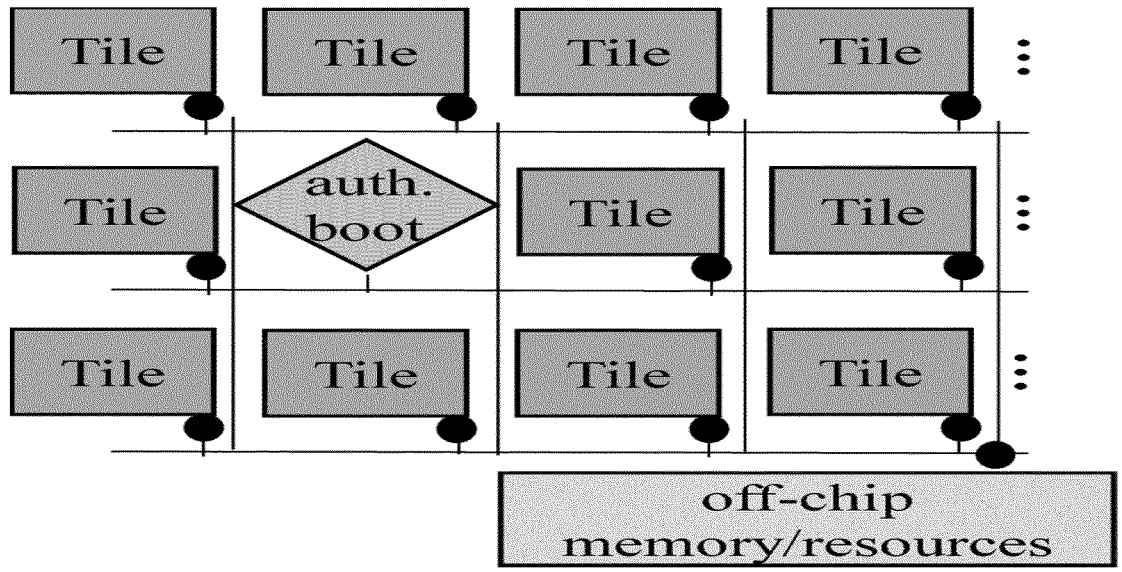
Figure 8:
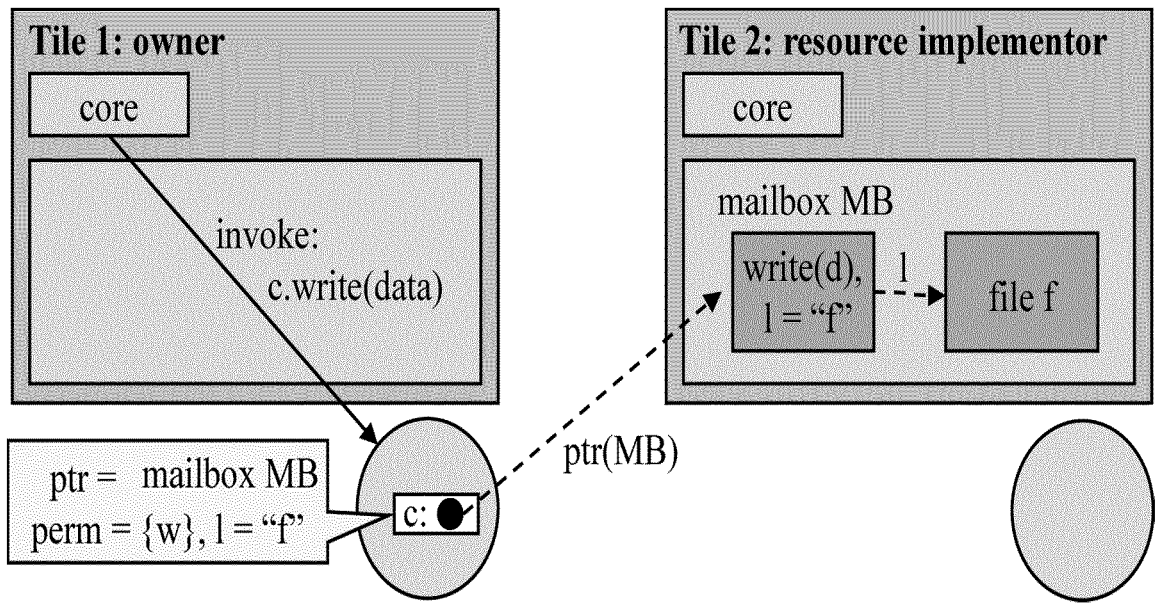
Figure 9:
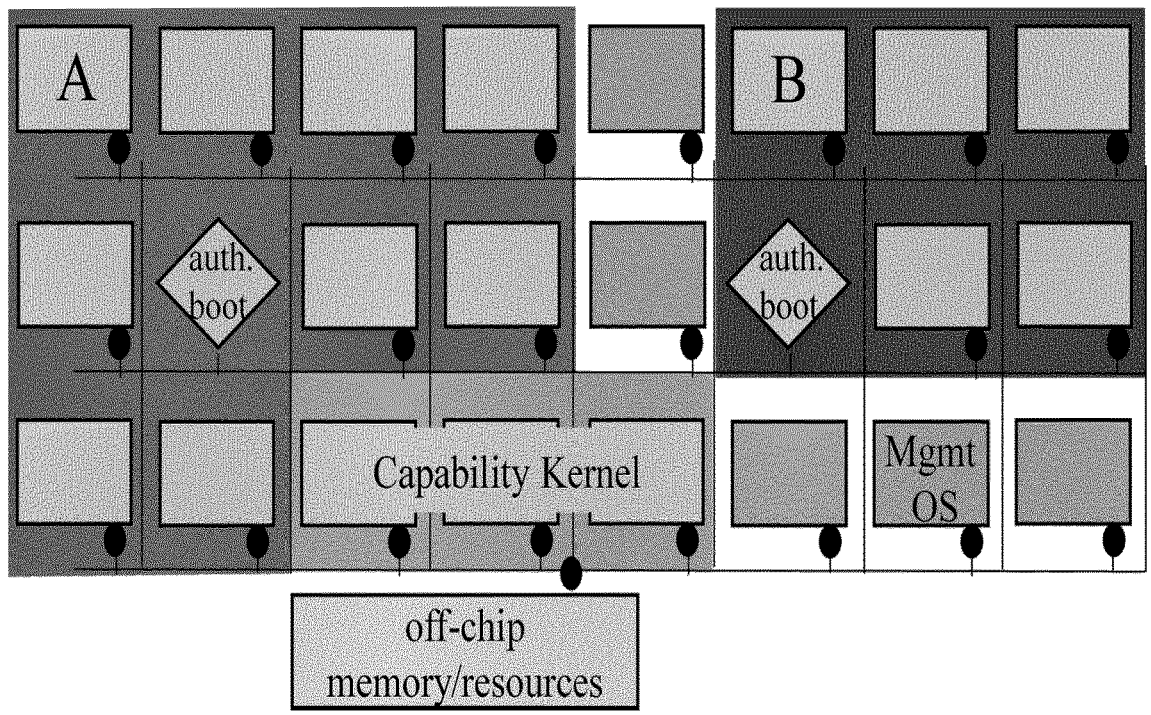
Figure 10:
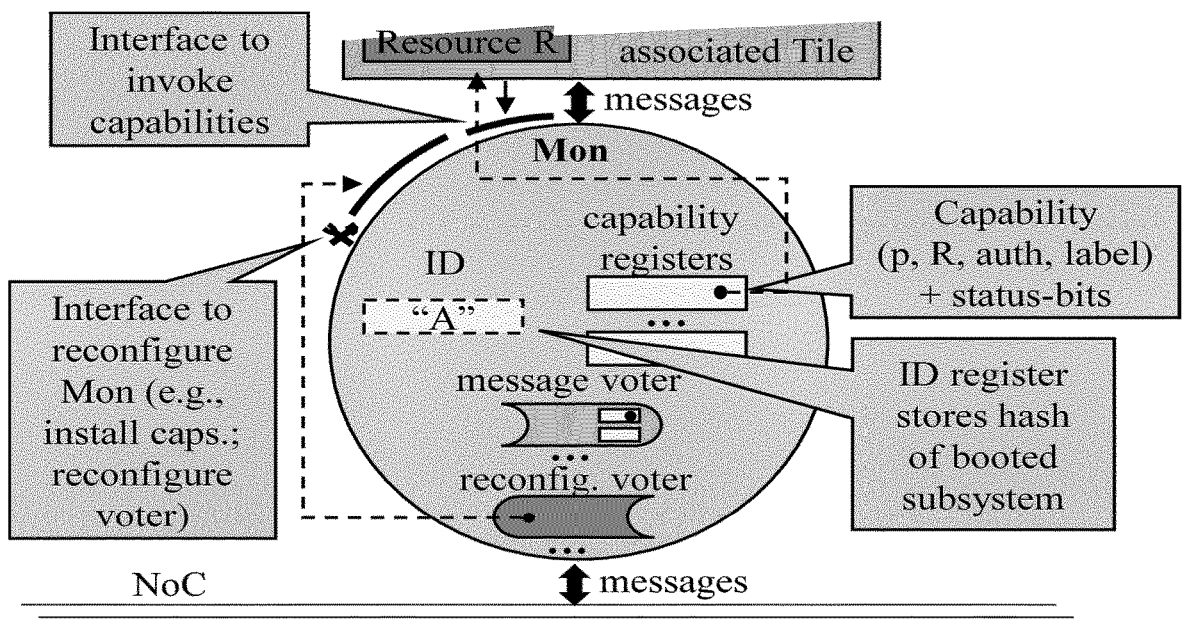
Figure 11:
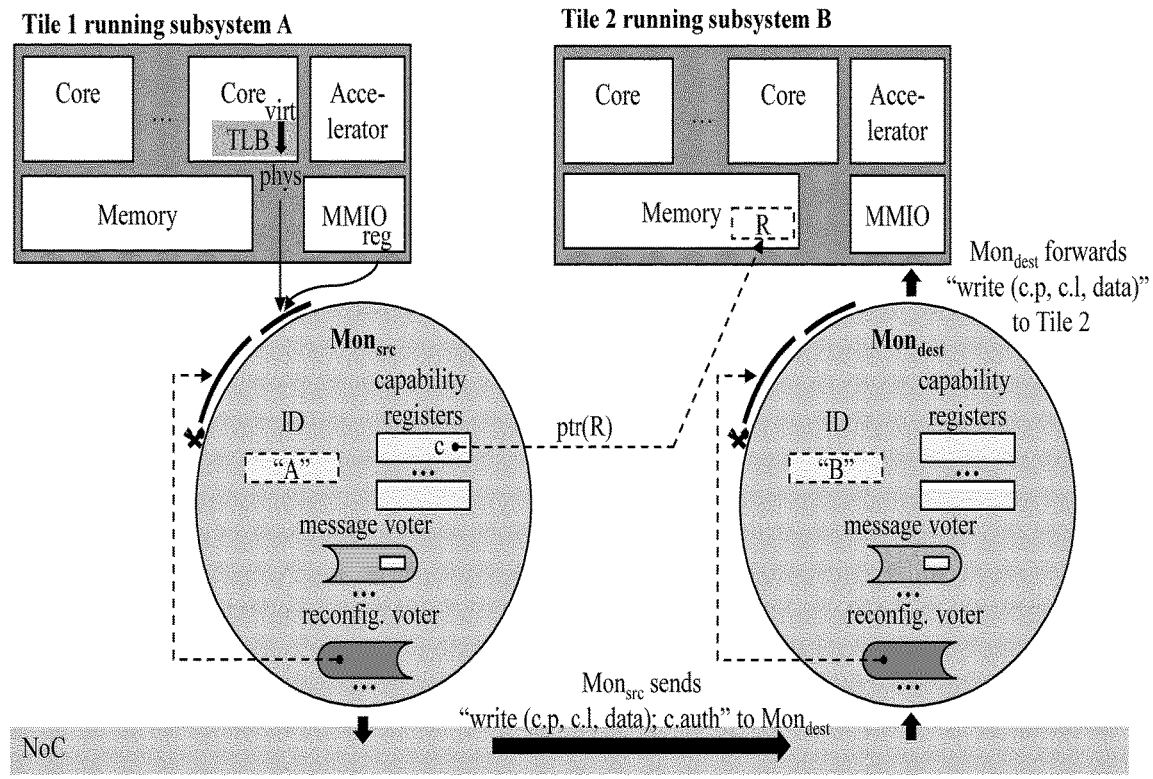
Figure 12:
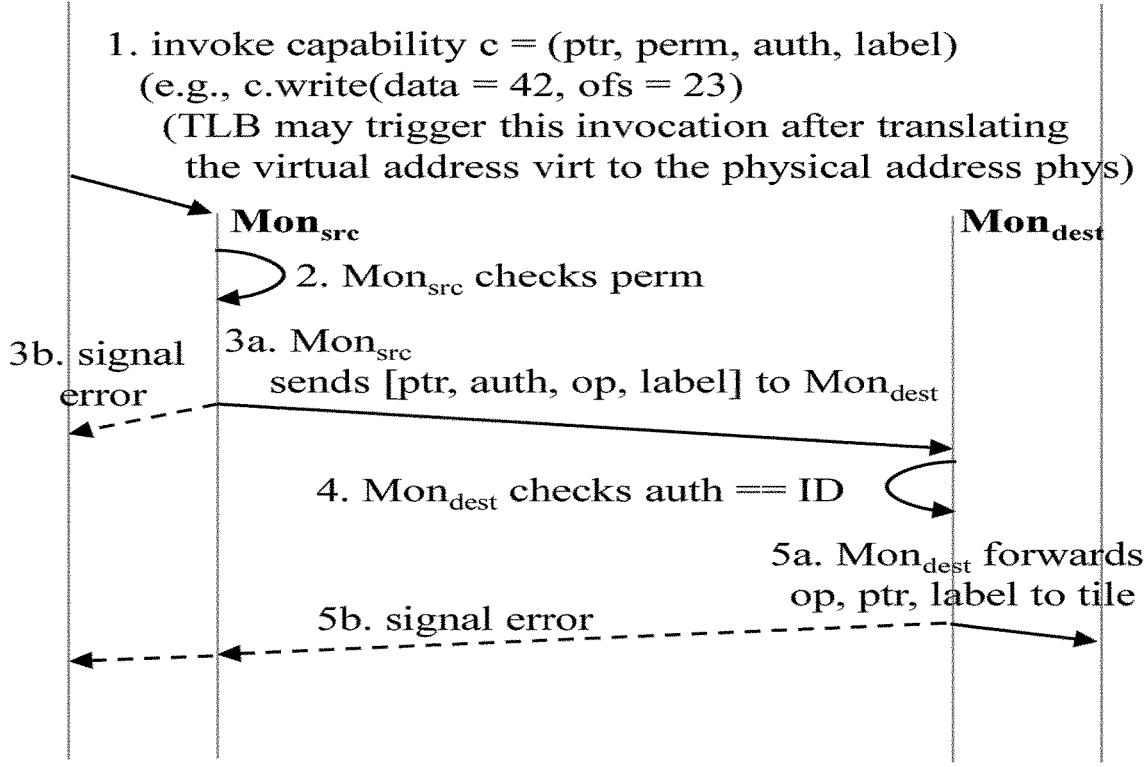
Figure 13:
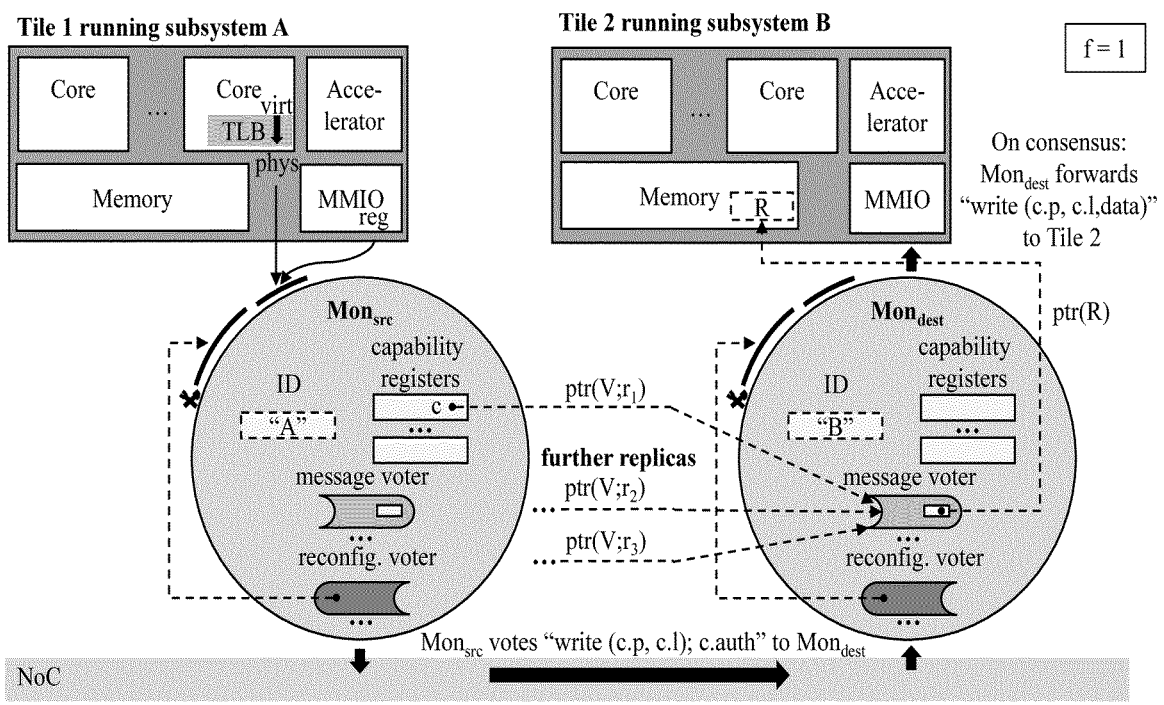
Figure 14:
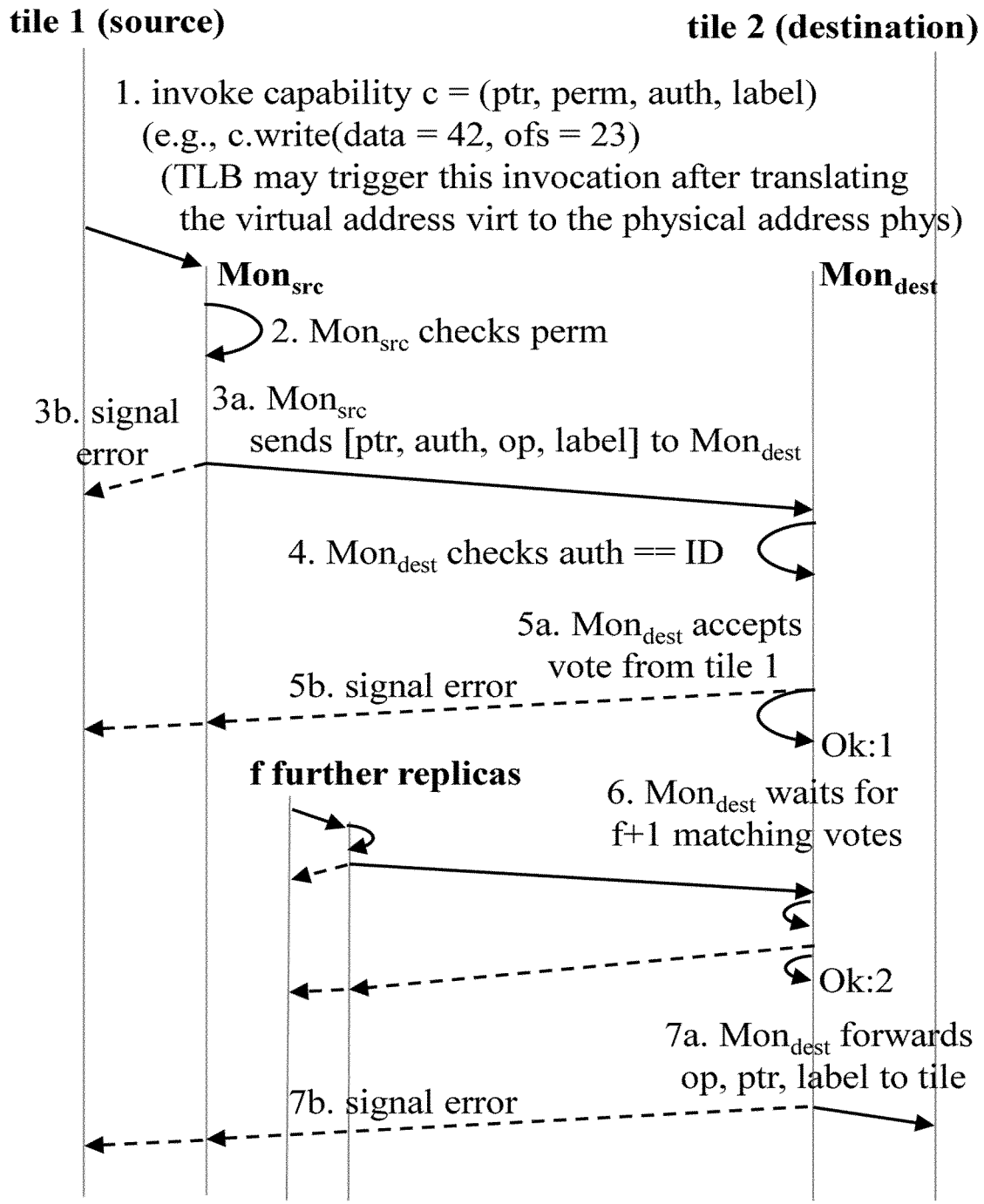
Figure 16:
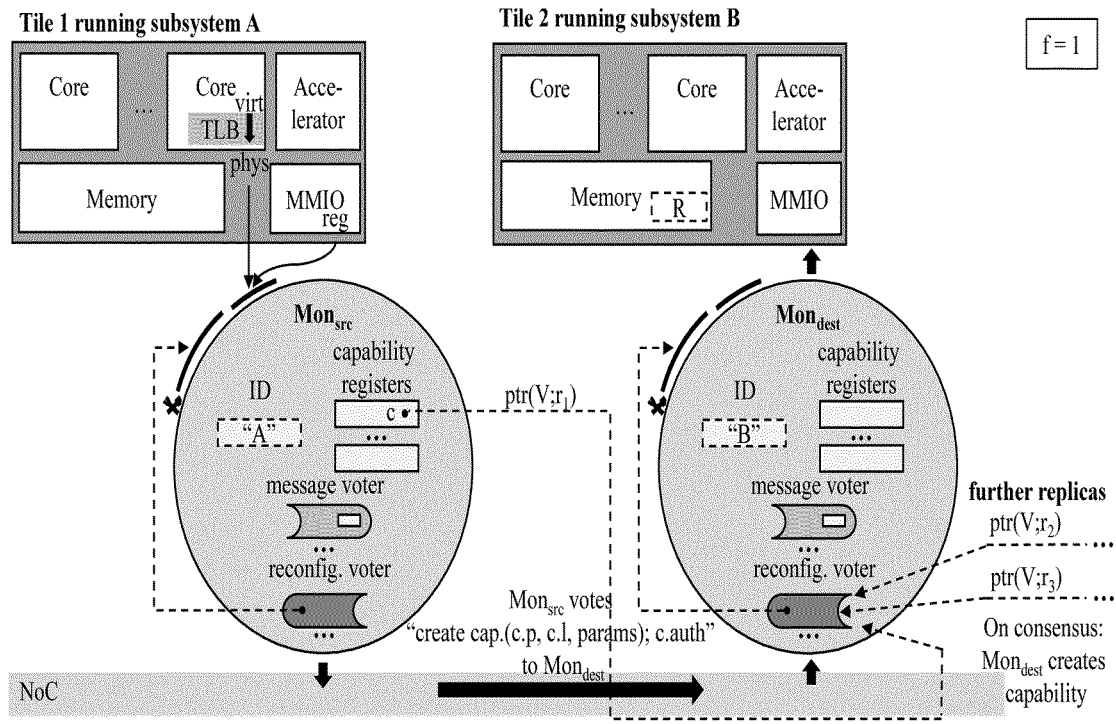
Figure 17:
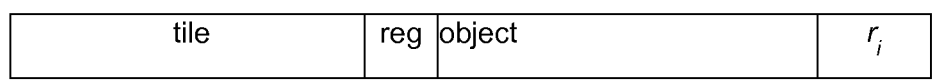
Figure 18:
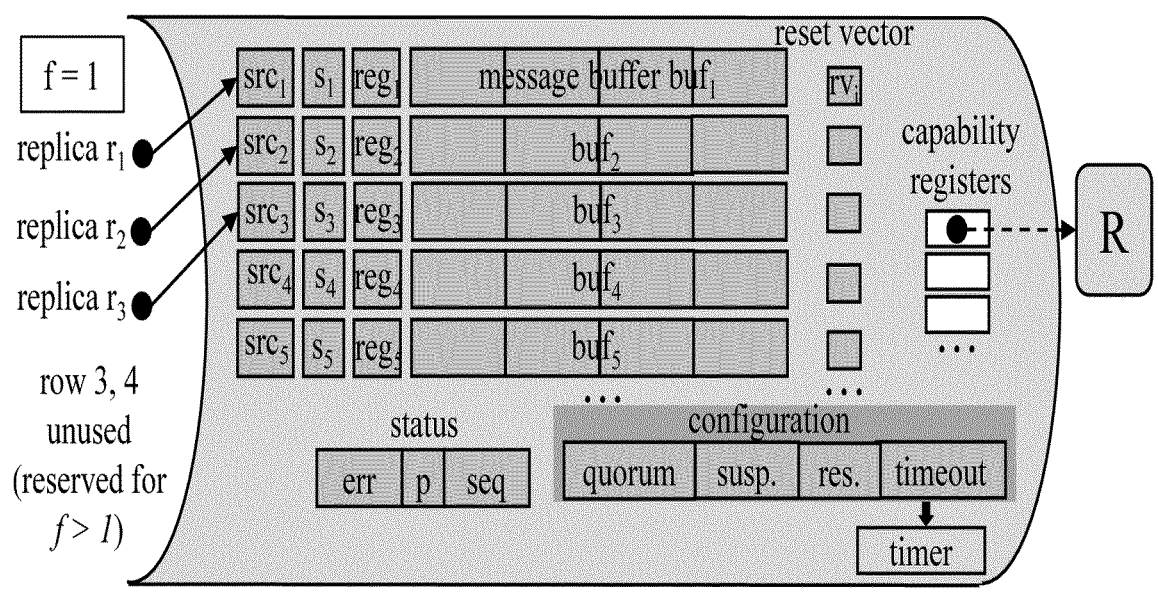
Figure 20:
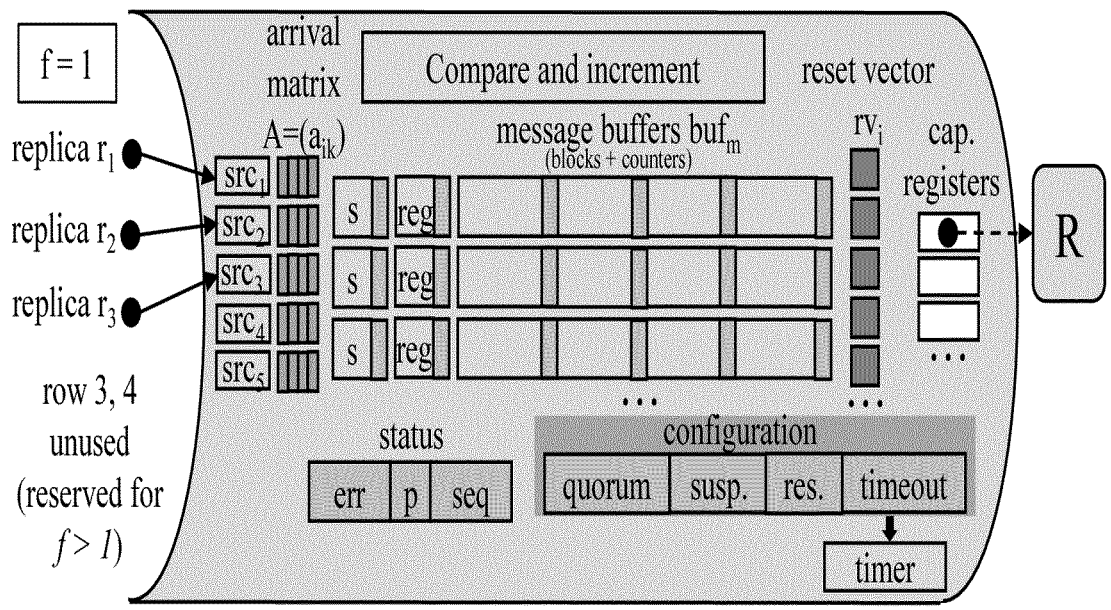
Figure 21:
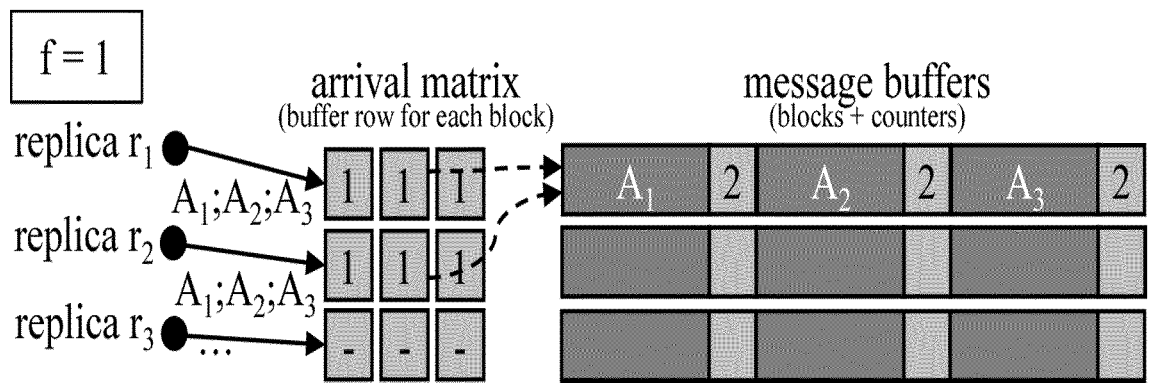
Figure 22:
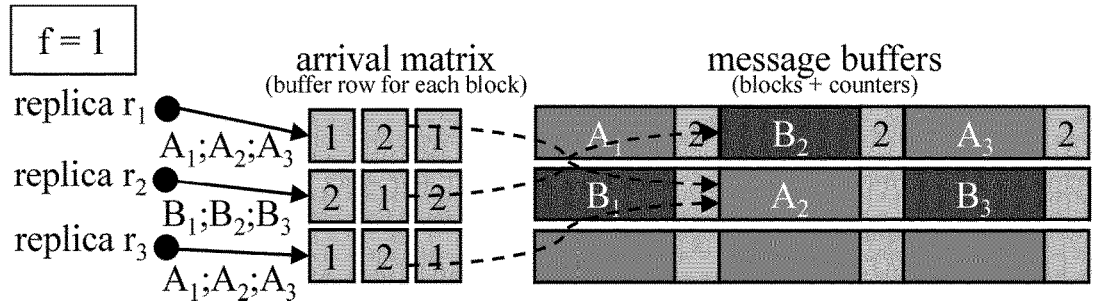
Figure 23:
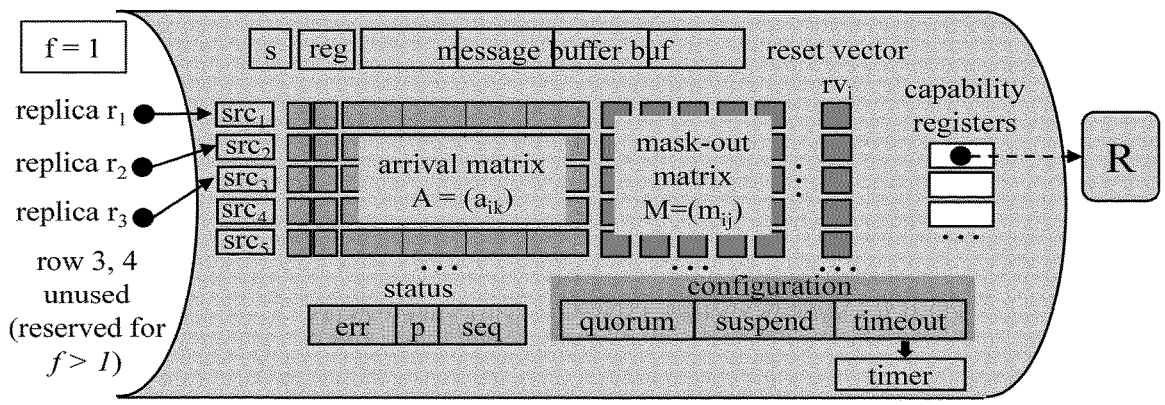
Figure 24:
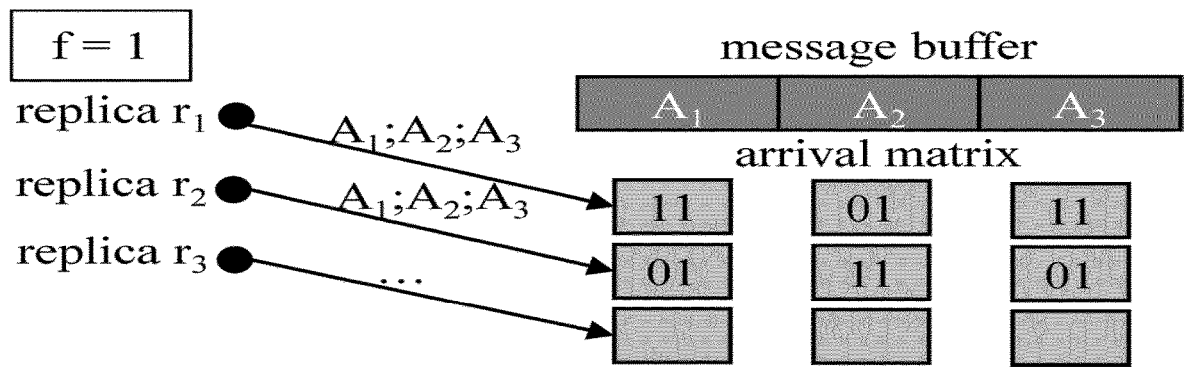
Figure 25:
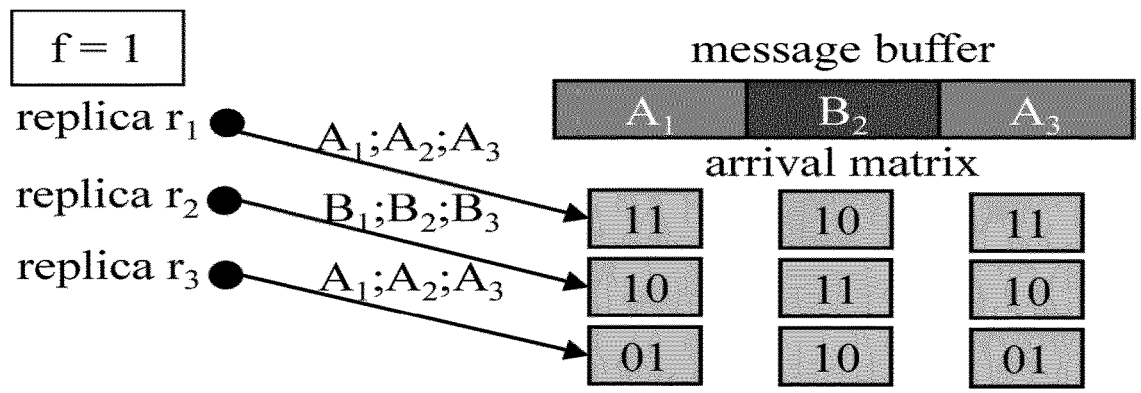
Figure 26:
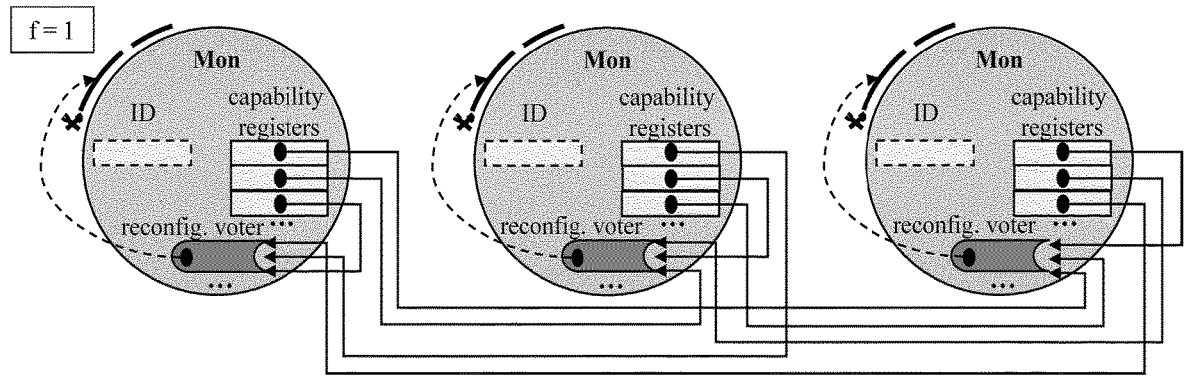
Figure 27:
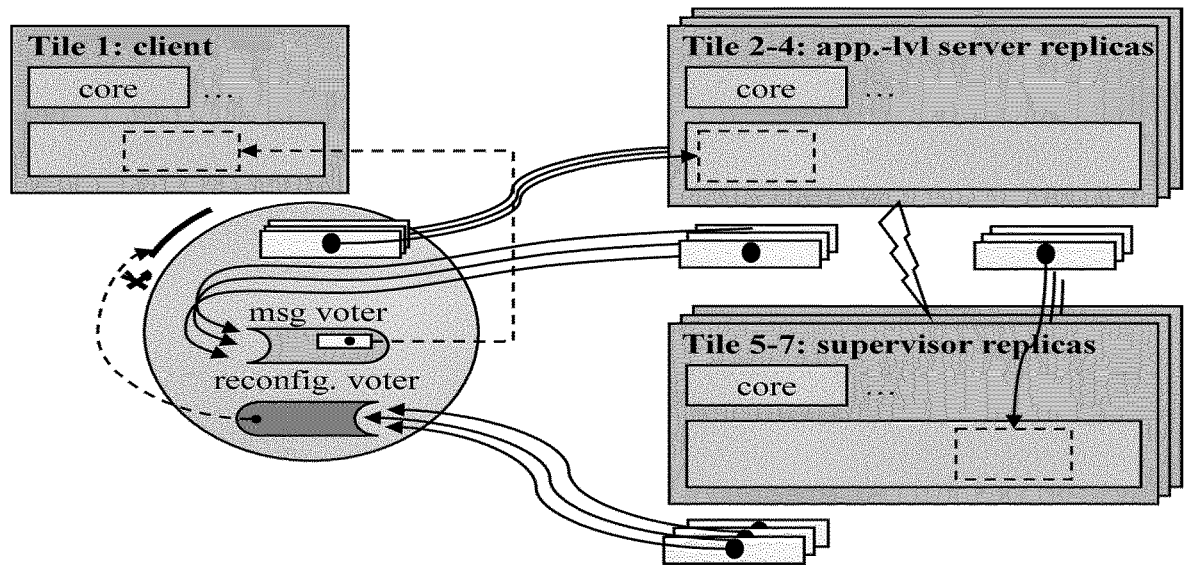
Figure 28:
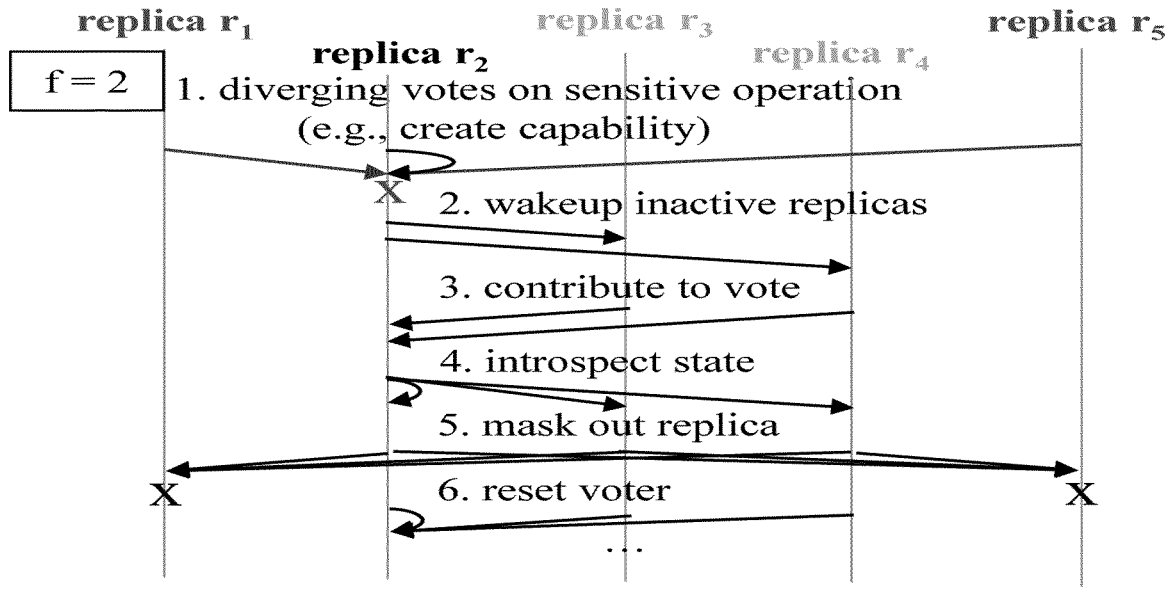
Figure 29:
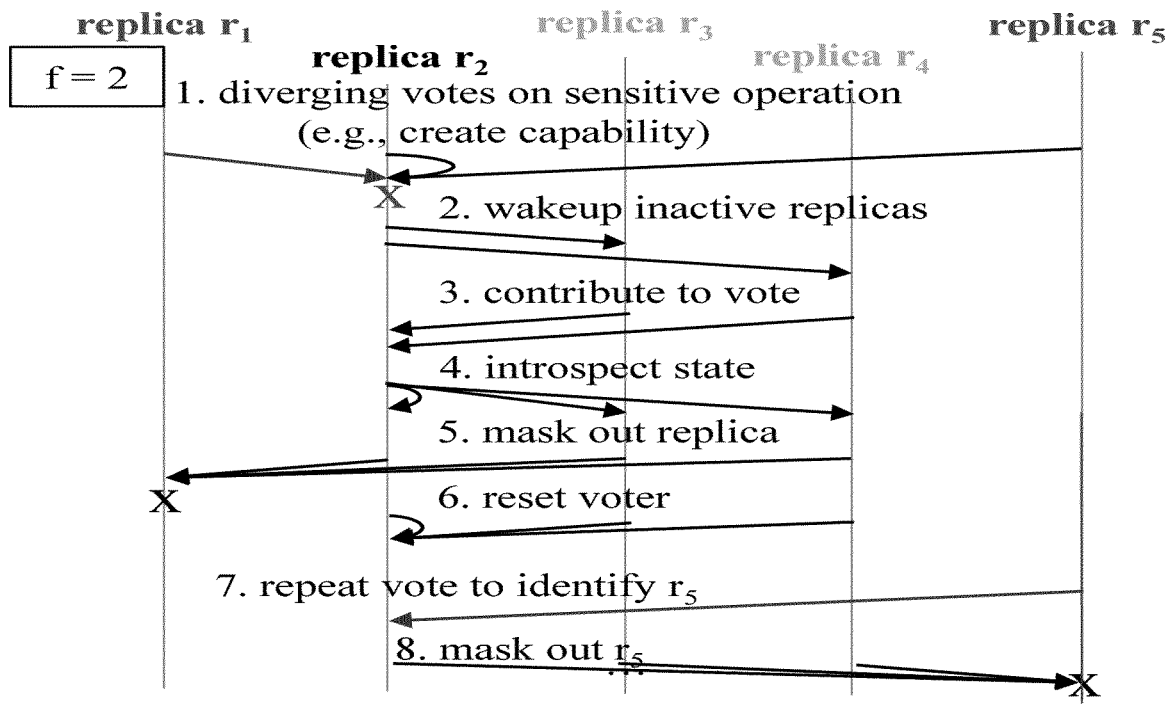
Figure 30:
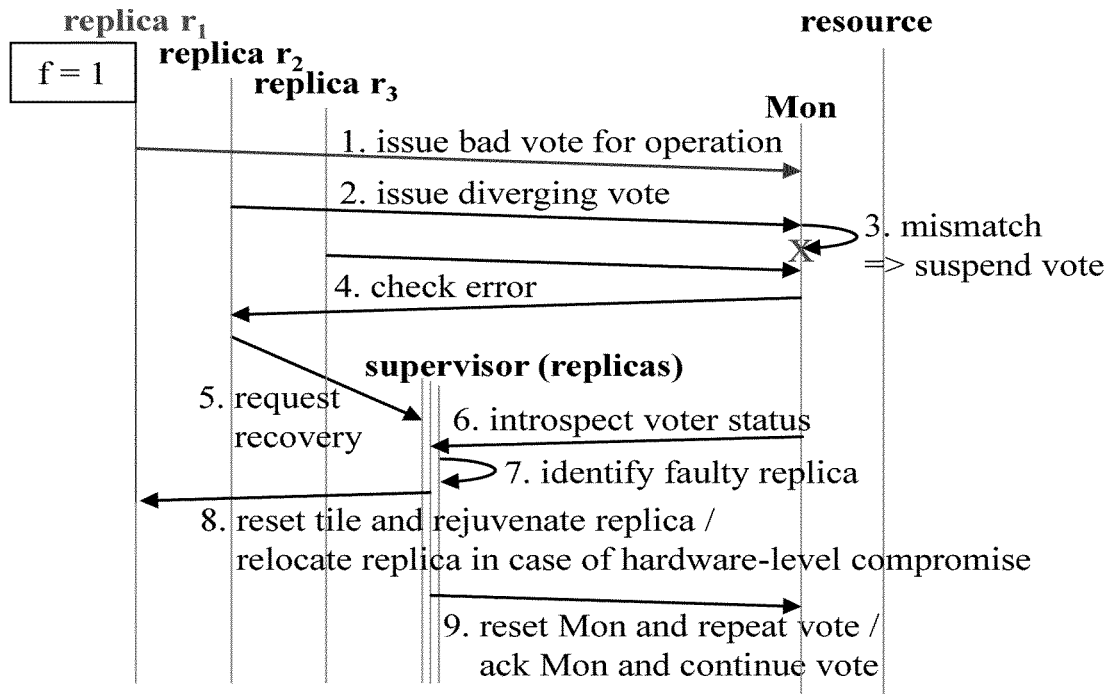
Figure 31:
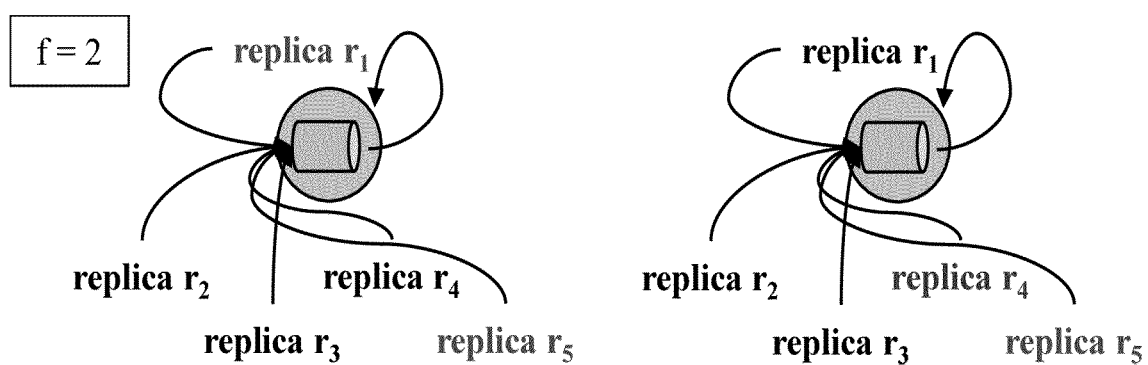
Figure 32:
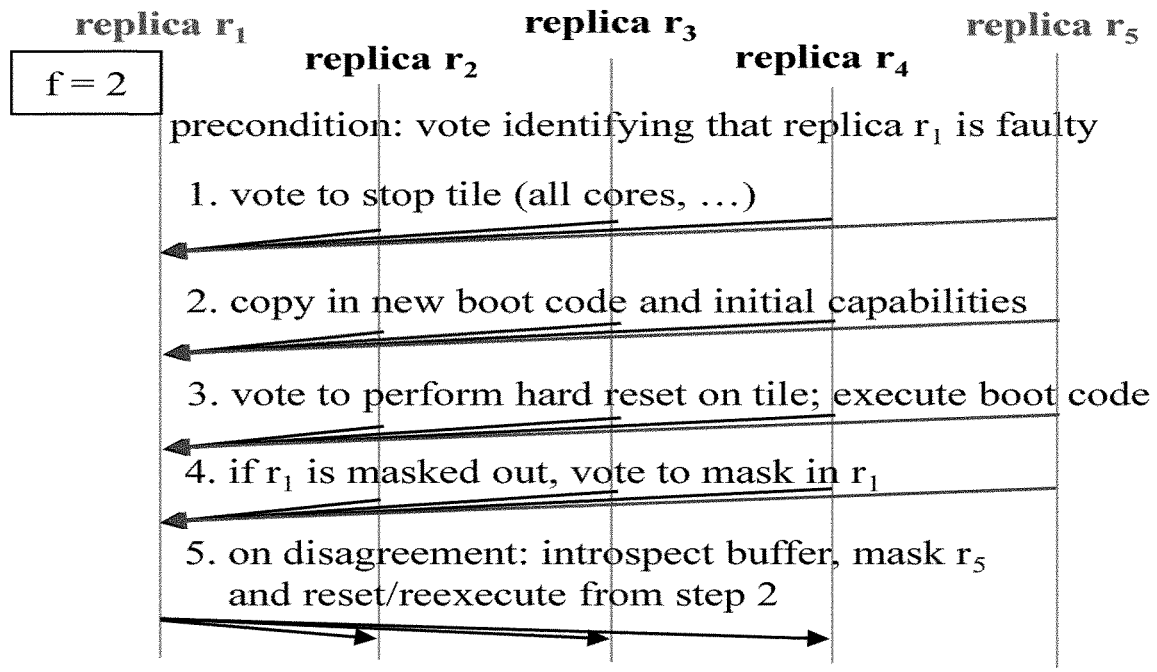
Figure 33:
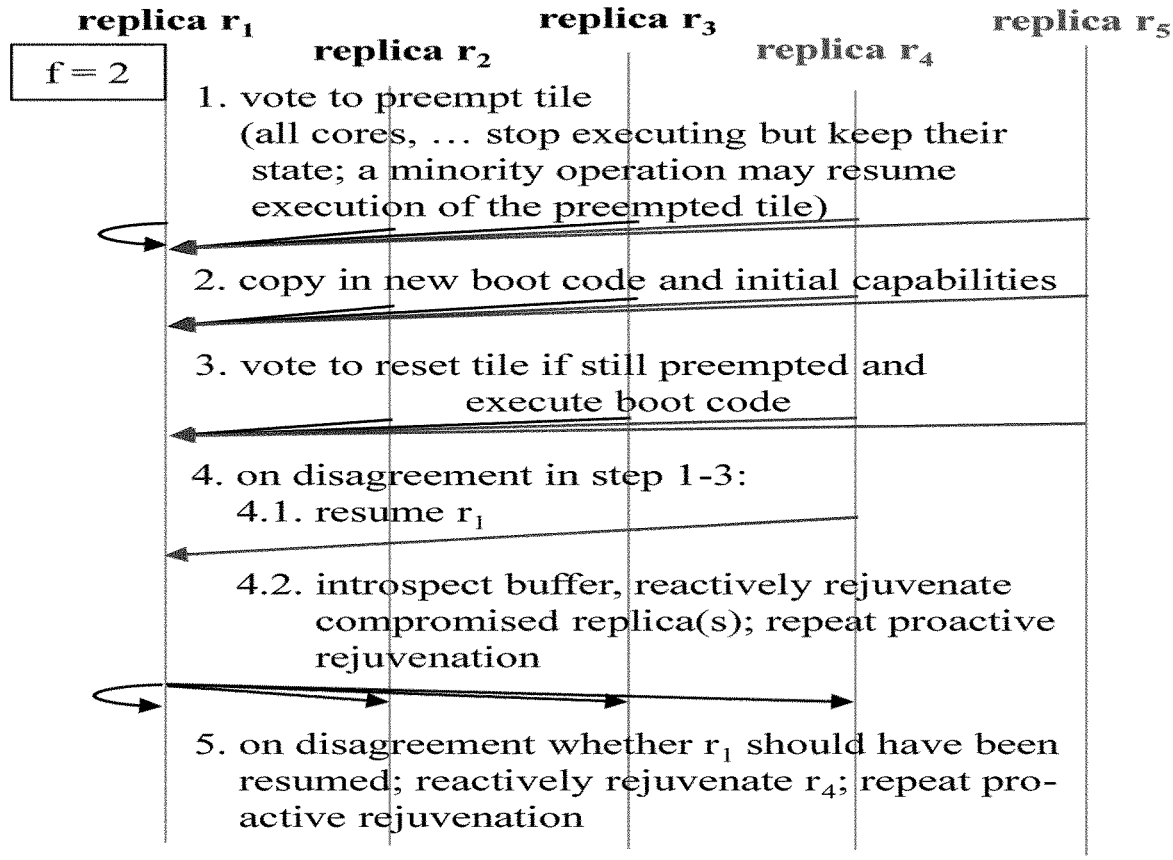
Figure 34B:
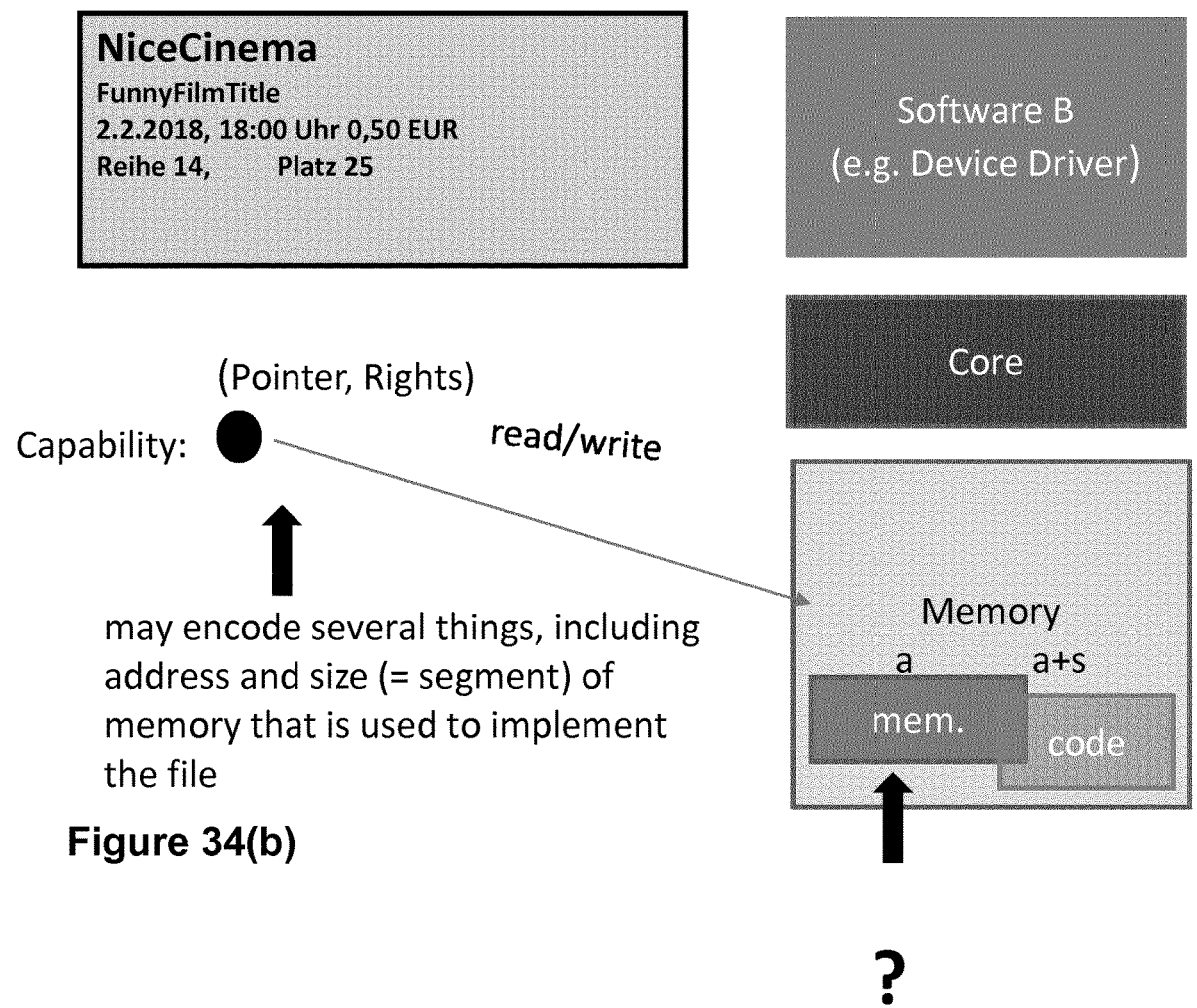
FIG. 34(b) illustrates a problem with the prior art, namely that over time, a core is used for other things.
Figure 34C:
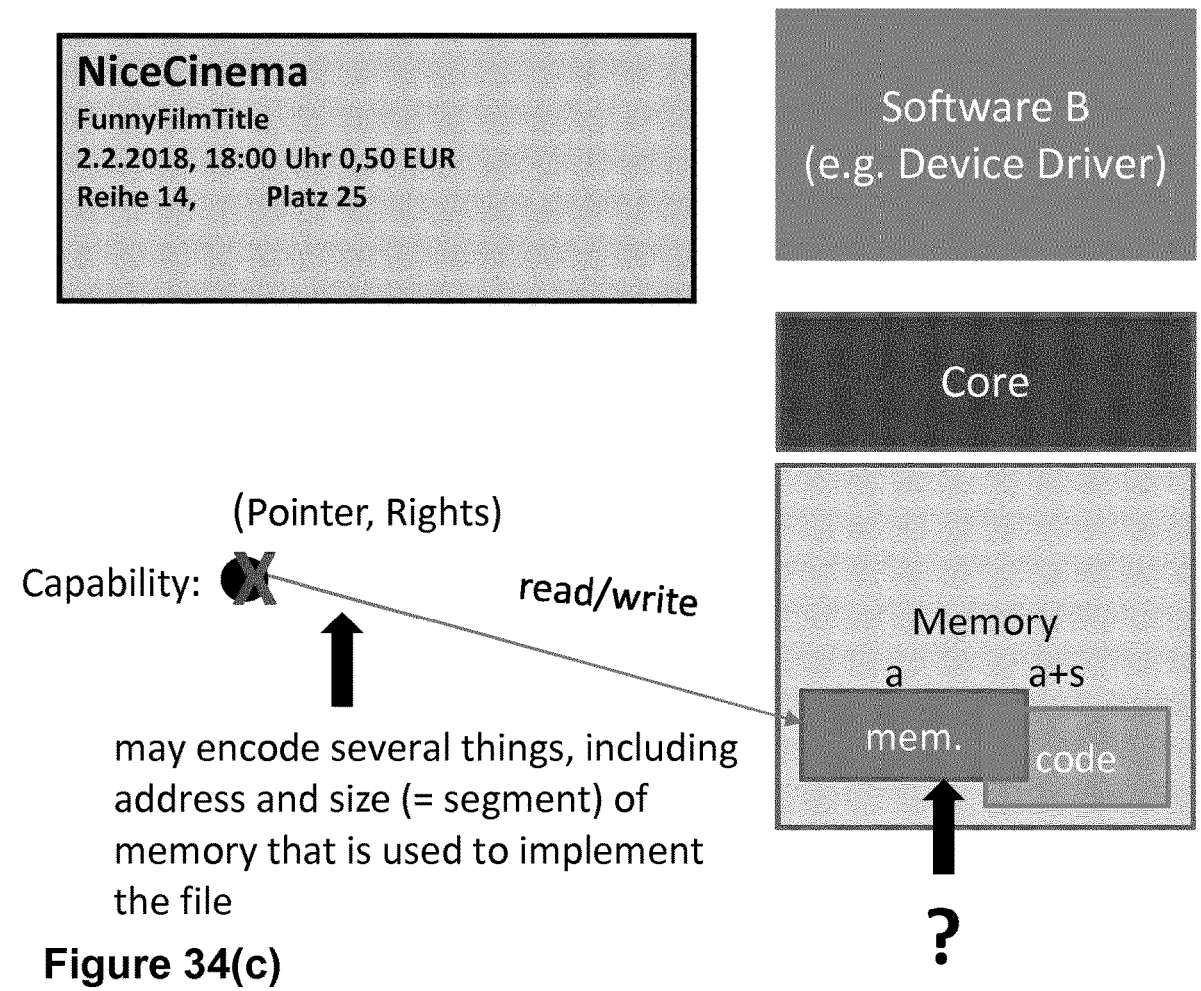
FIG. 34(c) illustrates a solution according to the prior art, namely find all guests and invalidate tickets.
Figure 34D:
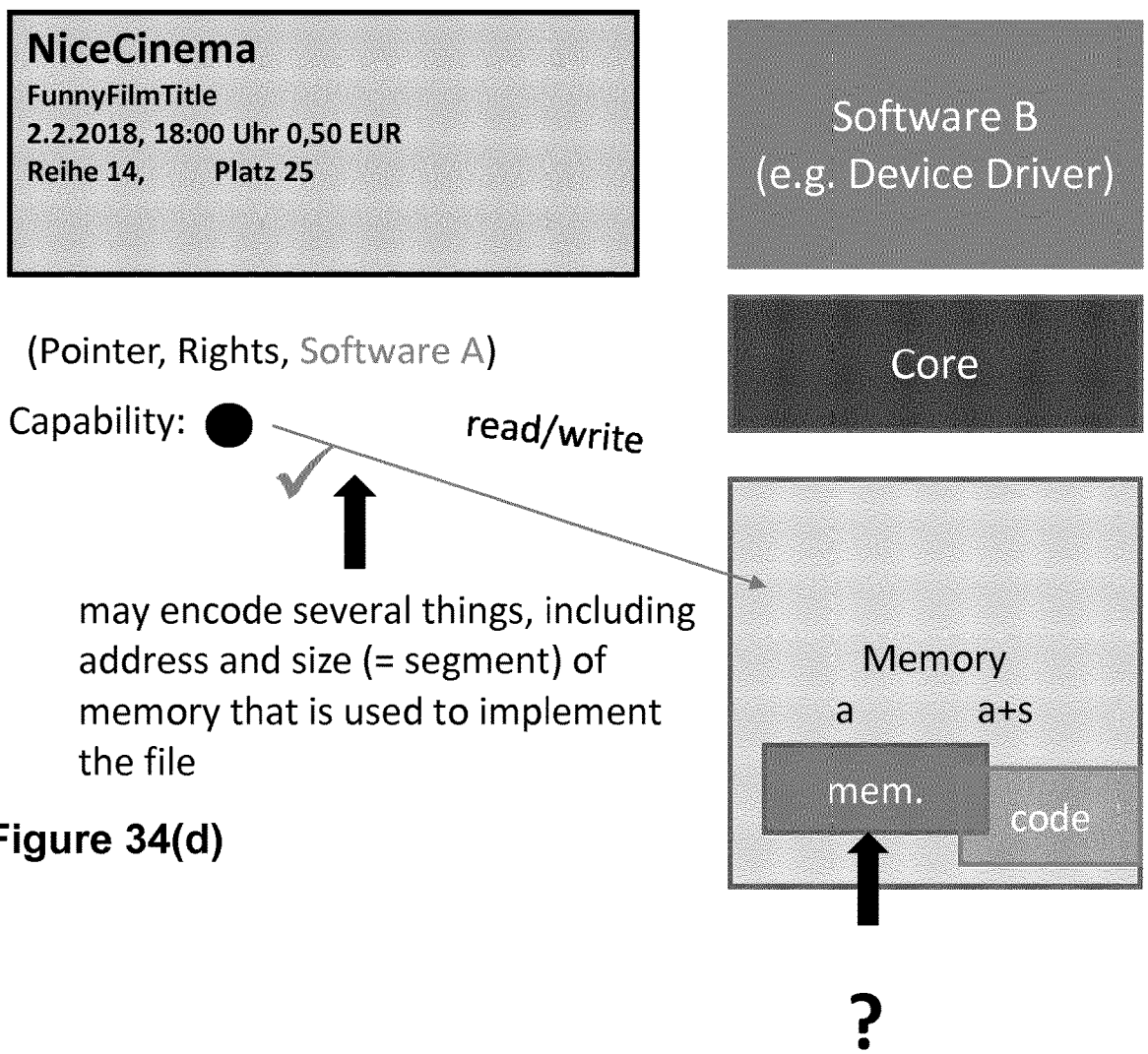
FIG. 34(a) illustrates an example (ticketing) arrangement according to the prior art (see Miltos et al [Reference 15]).
Figure 34:
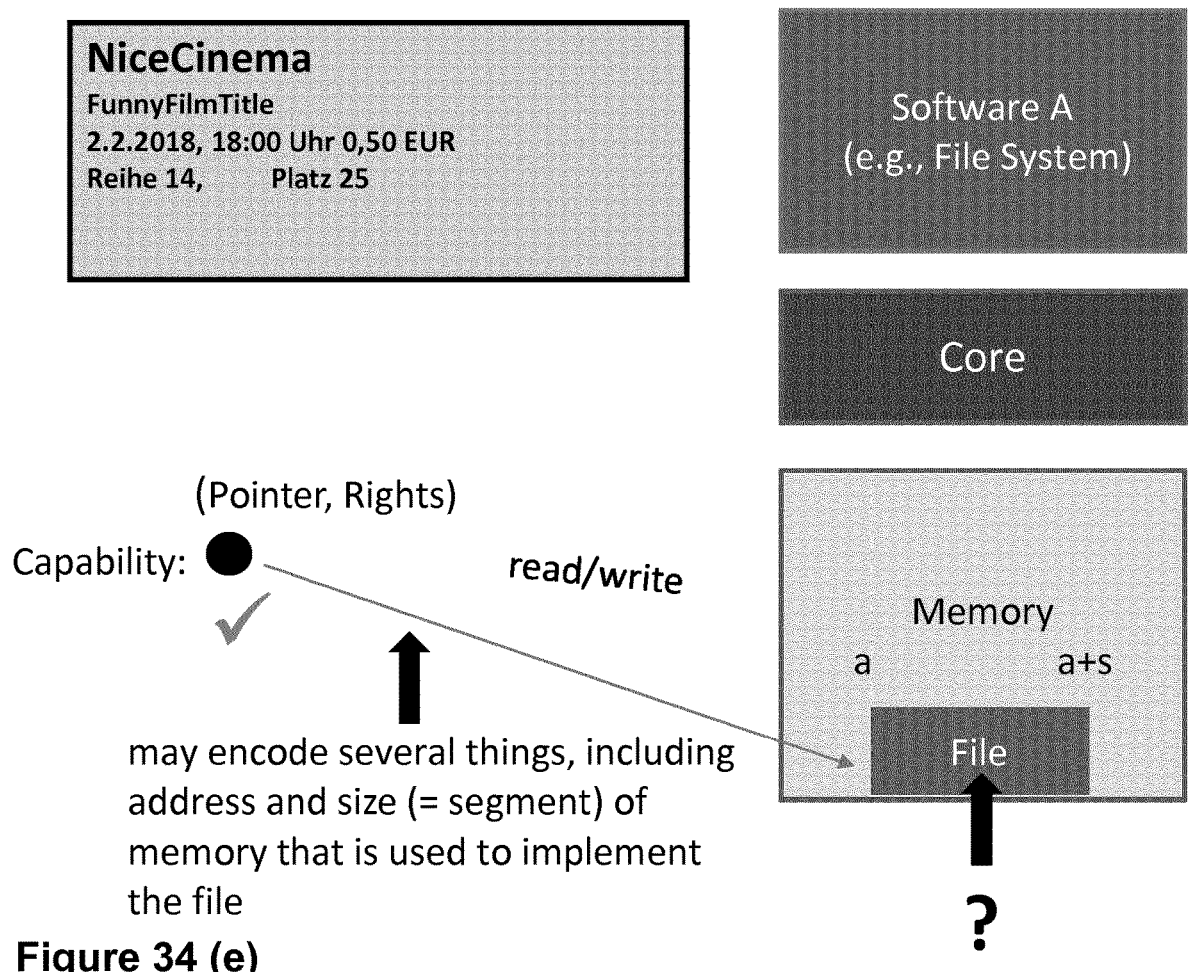

FIGS. 34(d) and (e) illustrate a solution according to the present invention, namely encoding "Software A" into a Capability. Software A can be conveniently referred to as a numerical representation of the computing resource or a label.

12. Comparison of the Present Invention (First Invention) with Prior Art

A comparison will not be given between the prior art (such as References 15 and 16) and the present invention (First Invention).

Figure 35:
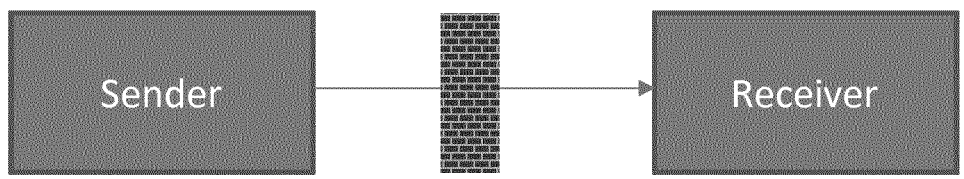
Figure 35:
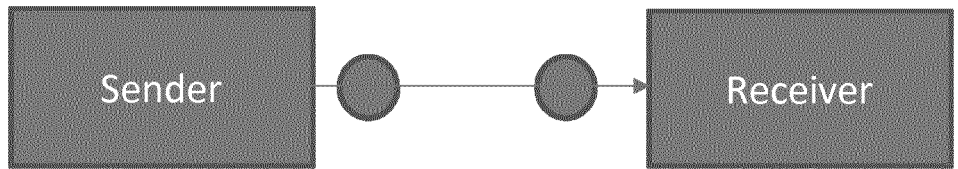

Referring to FIG. 35(a), in the prior art regarding a Firewall, a computer is provided between a sender and a receiver. A message is intercepted by looking up a sender specific rule, checking access and forwarding a request. A Firewall is not aware of software that runs the Receiver.

Referring to FIG. 35(b), in the present invention Mons are provided. Two Mons are involved, a Sender Mon and a Receiver Mon. Regarding the Sender, there is provided a Capability Unit. Permissions are checked by forwarding a request to the Receiver Mon.

Regarding the Receiver, validation that software stack match's expected stack (label) is undertaken. There is no more access check for non-voted capabilities. For voted access, the invention collects votes; applies operation of agreement is reached; provide recovering information(s).

FIGS. 36(a) and (b) illustrate Voting Systems according to the prior art.

Figure 36C:
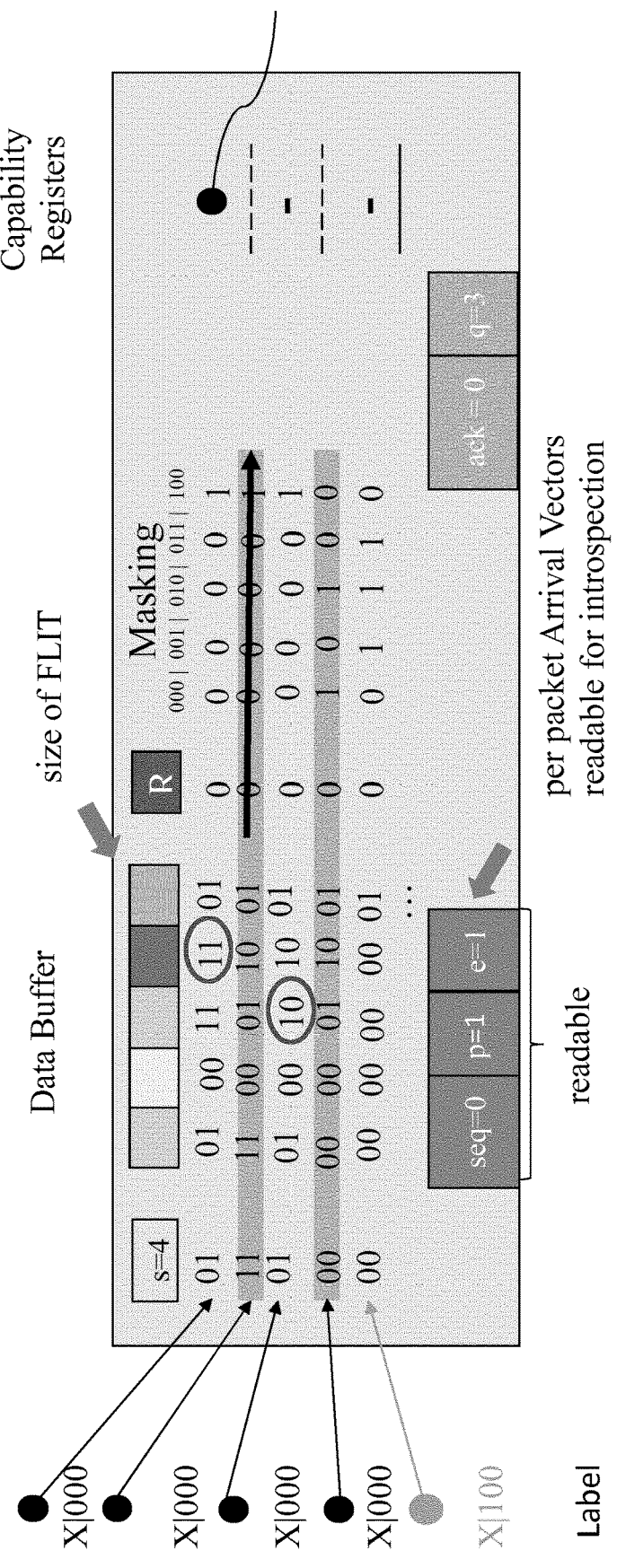
Figure 37:
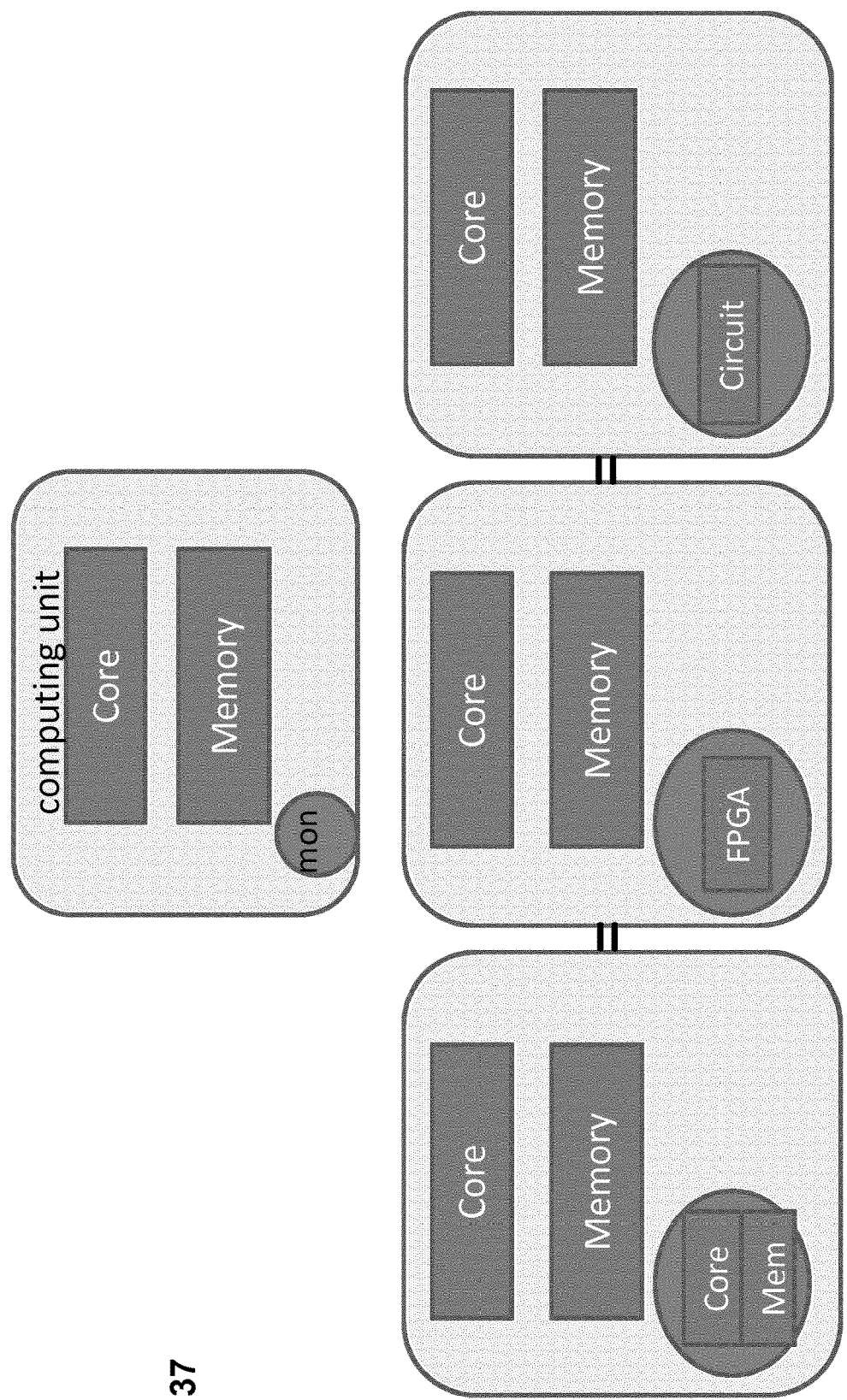

FIG. 36(c) illustrates a Voting System according to the present invention. Referring to FIG. 37 there are illustrated a variety of ways in which the invention can be embodied.

Figure 38:
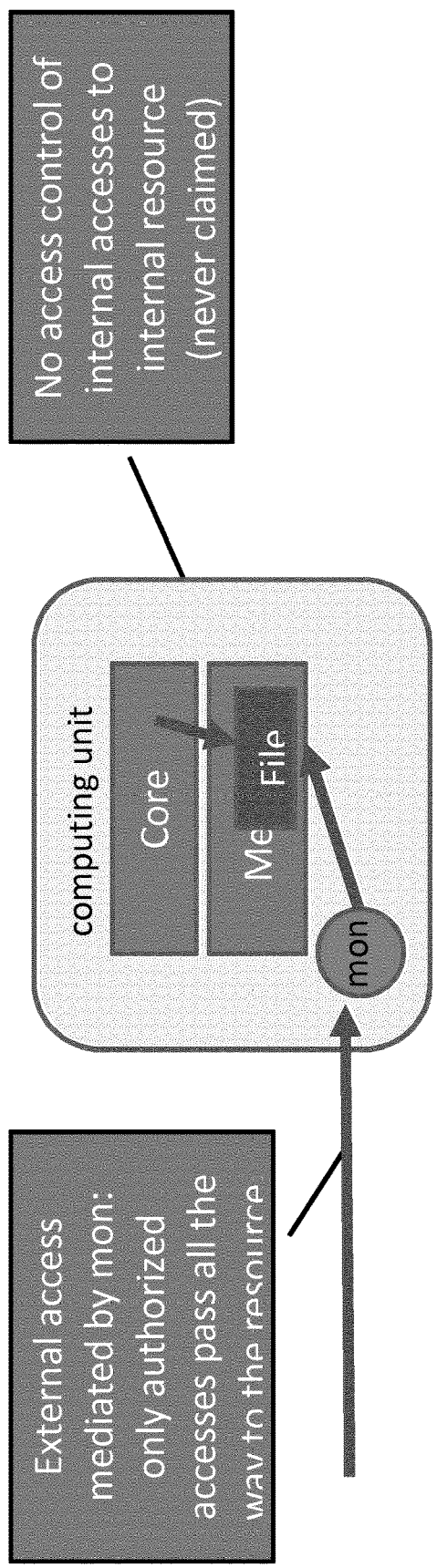

Referring to FIG. 38 there is illustrated an access manager embodied as a hardware item separate from a computing unit it is associated to but not part of, and how an external access manager can counter access to such internal resources.

Figure 39:
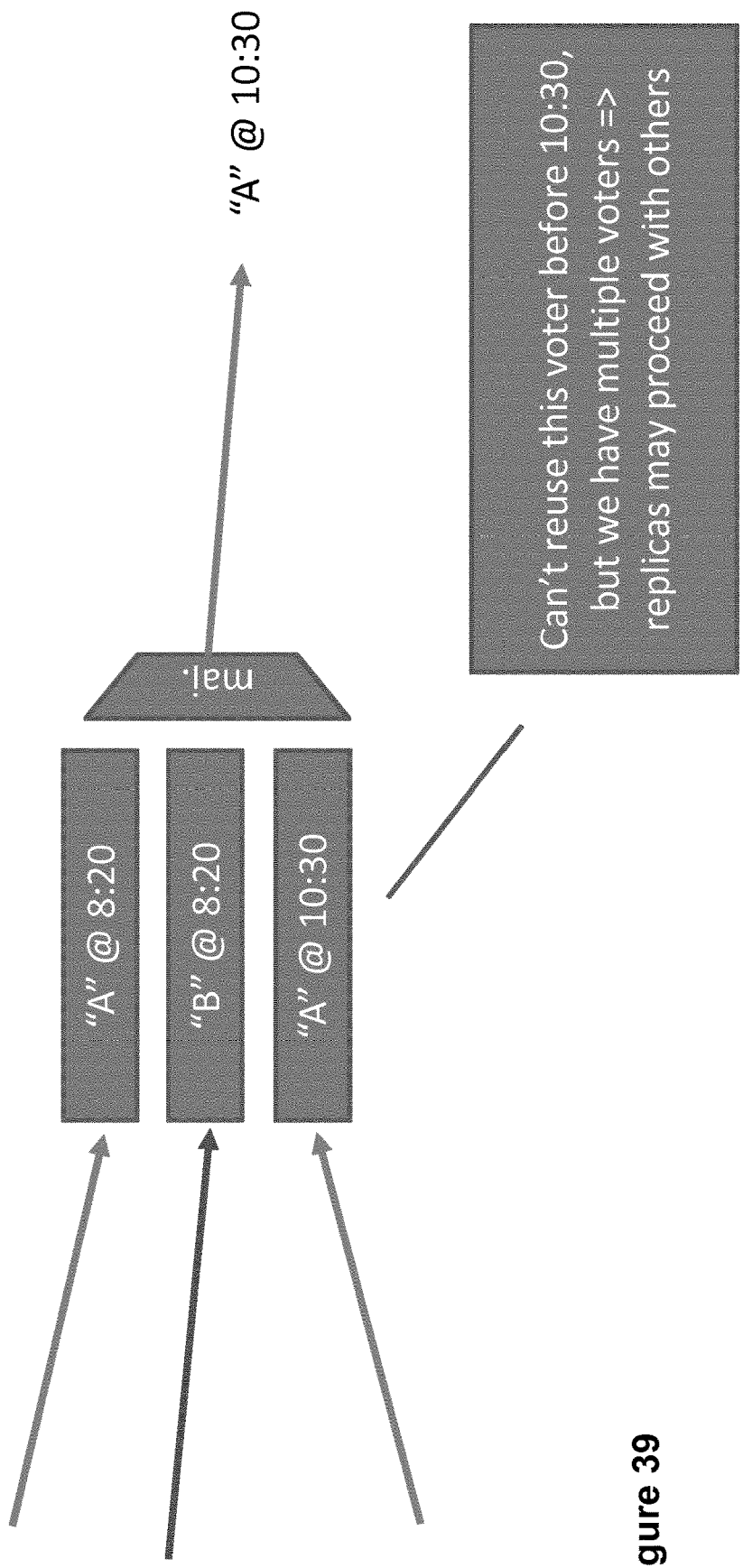

Referring to FIG. 39 there is show an illustration of how an access manager only allows a response to an at least one request if a majority of computing units provide a same response to the at least one request. Such is the case for responses received over relatively large periods of time, as illustrated.

13. Use of Mon in Local/Wide Area Network (LAN/WAN)

Figure 40:
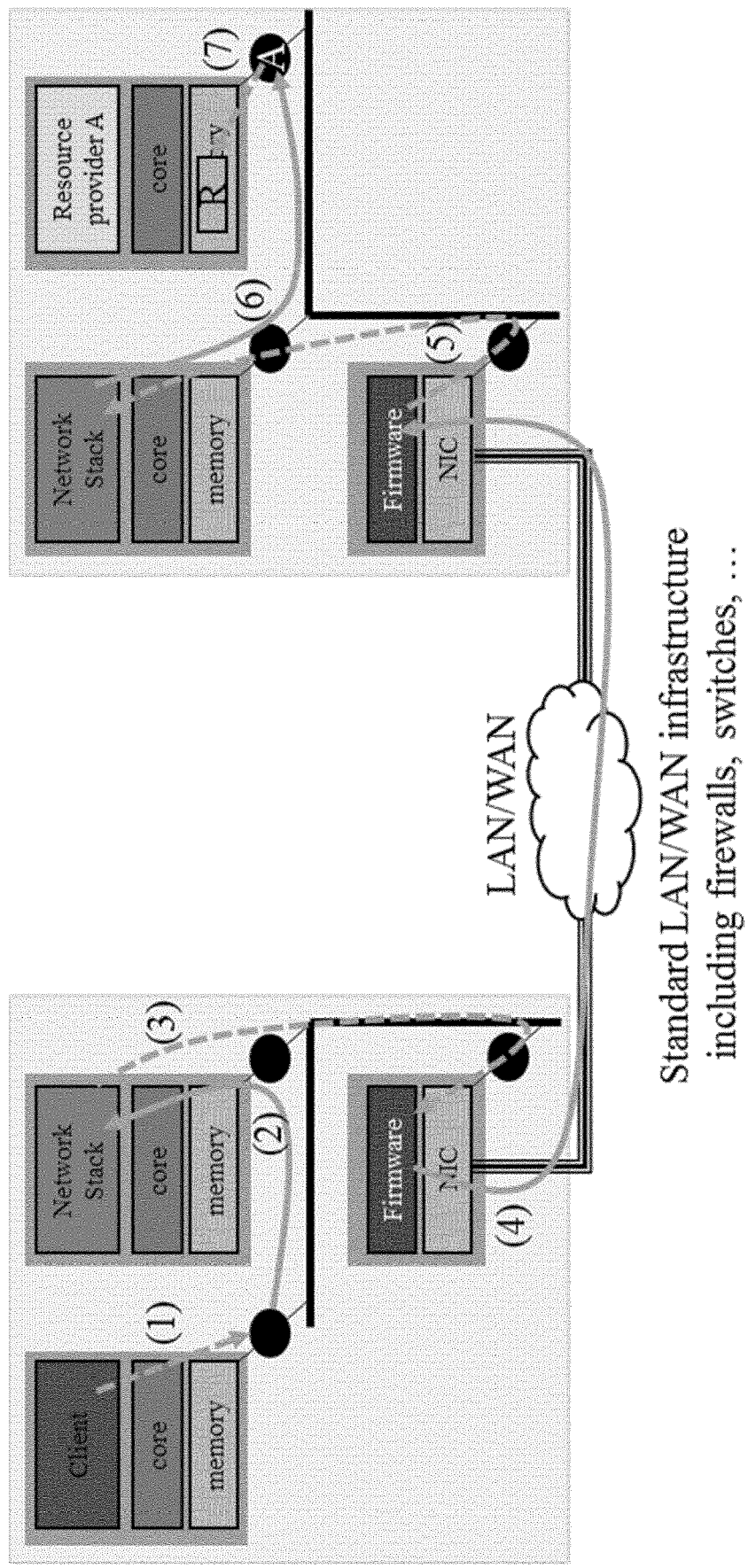

FIG. 40 shows an example use of Mon in a distributed system according to the present invention. Shown is the invocation part of a directly accessed resource (see Section 5.0.1). Other scenarios, including remote Mon reconfiguration, for example, to establish new capabilities, work in a similar fashion. The setup shows two nodes: a client node on the left comprised of a dual core system and a network interface card (NIC), and a server node on the right of similar components. The Inventors distinguish two types of networks: the on chip network (single solid line) connecting the Mons in each node, and the local (LAN) or wide area network (WAN) connecting the nodes. The NICs interface with the LAN/WAN in the usual way and setups may include the usual network infrastructure components (including firewalls, switches, etc.).

To invoke the resource R of resource provider A, the client invokes a capability in its local Mon (see Step (1)). The invocation is as described in Section 5.0.1 with the exception that because the LAN/WAN is not per-se trustworthy, the communication between the client Mon and the resource provider Mon is serialized and cryptographically protected (e.g. by encrypting and signing the message using public key cryptography). The such serialized message is sent to the network stack of the local node (2) which transmits it over the LAN/WAN by invoking its capability to the NIC (3). Encryption ensures that neither the network stack nor the NIC can see the content and signing of keyed hashing ensures modifications of the message are detectable.

At the destination node, the process is reversed by the NIC sending the cryptographically protected message to the network stack (5) who forwards it to the Mon of the resource provider (6). There the message is verified and decrypted and then processed as described in Section 5.0.1. That is, the label in the capability is checked to match the current resource provider (i.e. "A") and if so the access to resource R is executed. Because step (2) and (6) constitute state-of-the-art serialization and deserialization operations and because, with the exception of the capability invocation of the network stack and NIC (Steps (3) and (5)), the message transfer follows standard protocols, we do not claim the node-to-node communication as part of our invention, but include this example to illustrate how Mon-based access control can be extended to more loosely coupled systems. In case of a voted operation (see Section 5.0.2) and in case of a Mon reconfiguration (see Section 5.0.3), the deserialized message is the contribution of one replica. The used voter keeps this message until a quorum of matching votes arrive. Until this happens, the voter cannot be used for a different operation unless the voting is aborted (and e.g. later retried). The other voters of the Mon remain available during this time. Replies from the Mon of the resource provider to the Mon of the client perform the same steps (2-6) but in the opposite direction.

It will be appreciated that the embodiments of the invention hereinbefore described are given by way of example only, and are not meant to be limiting of the scope of the invention in any way.

For example, each voter variant described above has a section on error handling and error reporting, which describes how to setup the quorum size (i.e. number of replicas that have to agree f+1), behaviour of coupling units requesting the computation access manager to repeat/re-evaluate the vote (suspend=0/1) and the ability to read out vote state. For V1 these are Paragraphs 6.1.3 and 6.1.4, for V2 this is Paragraph 6.2.3, and for V3 this is Paragraph 6.3.3.

Reflective consensus is covered in Paragraph 8; reflective rejuvenation in Paragraph 9 and quorum elasticity in Paragraph 10.

It will be appreciated that any of the features and/or techniques variants hereinbefore described, e.g. A1 to A3, M.1 to M.9, or V1 to V3, may be implemented in one or more embodiments of the present invention either alone or in combination with one or more of the other features, techniques and/or variants.

The invention claimed is:

1. A computing and/or data processing device comprising:
   a plurality of computing units, each of the computing units comprising a computing resource;
   the computing device comprising at least three of the computing units, each of the computing units comprising the same computing resource;
   each of the computing unit further comprising a computing unit access manager, each computing unit access manager being adapted to control access to the computing resource of the respective computing unit in response to at least one request;
   wherein the computing unit access manager only allows the response to the at least one request if a majority of the computing units provide a same response to the at least one request;
   wherein the computing unit access managers are adapted to provide for recovery of or on mismatching responses (votes) if a majority vote is not provided;
   wherein a reconfiguration majority response (voting) is applied to reconfiguration of the computing unit access managers; and
   wherein the computing device comprises a network-on-a-chip, is provided on a chip or comprises an integrated chip (IC) or microprocessor.

2. The computing and/or data processing device as claimed in claim 1, wherein each of the computing units comprises a microprocessor core; or wherein the integrated chip comprises a Field-Programmable Gate Array (FPGA) device.

3. The computing and/or data processing device as claimed in claim 1, wherein the computing device comprises at least one regulator.

4. The computing and/or data processing device as claimed in claim 1, wherein:
   each of the unit access managers controls access to the respective computing resource based on a token without affecting an entire chain, such that independent chains can be created and destroyed as needed or the computing units booted and rebooted.

5. The computing and/or data processing device as claimed in claim 4, wherein results from each of the computing units are compared by voting, such that access can be allowed after the majority vote by creating the token.

6. A computing system and/or data processing apparatus comprising at least one computing and/or data processing device according to claim 1.

7. A method of controlling, such as controlling access to, at least one computing resource of a computing and/or data processing device, the device comprising:
   a plurality of computing units, each of the computing units comprising a computing resource;
   the device comprising at least three computing units, each of the computing units comprising the same computing resource;
   each of the computing units further comprising a computing unit access manager, adapted to control access to the computing resource of the respective computing unit in respect to at least one request;
   wherein the device comprises a network-on-a-chip, is provided on a chip or comprises an integrated chip (IC) or microprocessor;
   the method comprising:
   the computing access manager allowing or only allowing a response to the at least one request upon determining a majority of the computing units providing the same response to the at least one request;
   the computing unit access managers providing for recovery of or on mismatching responses (votes) upon determining a majority vote is not provided; and
   applying reconfiguration majority responses (voting) to reconfiguration of the computing unit access managers.

8. The method as claimed in claim 7, wherein only f+1 computing units are actively participating of which up to f diverges in the response; the computing access manager allowing the response to at least one request upon determining all f+1 active computing active units provide the same response to the at least one request.

9. The method as claimed in claim 8, wherein the computing access manager provides a change from f+1 active computing units to 2f+1 active computing units upon determining up to f computing units diverge in the response, the computing access manager providing the response to at least one request upon determining at least f+1 of the 2f+1 computing units provide the same response to the at least one request.

10. The method as claimed in claim 8, wherein a divergence in the response by the f+1 active computing units causes the computing access manager to suspend the response to the at least one request in such a way that the response of each computing unit is read by other computing units without them being able to change their vote, at least agreement/disagreement to the response to the at least one request becomes visible; and
   wherein the computing units responds to the computing access manager to repeat the vote, and wherein the computing access manager repeats the vote upon the majority of computing units requesting such a repeating.

11. The method as claimed in claim 10, where any of the f+1 active computing units triggers error recovery in the involved computing units such that all involved computing units read, analyse and resolve the error situation by responding to the computing access manager.

12. The method as claimed in claim 11, where a found to be diverging replica is rejuvenated to a healthy state, the method comprises a step which involves the at least one request which the computing access manager allowing the response to the at least one request upon determining a majority of the computing units providing the same response to the at least one request.

13. A non-transitory computer readable storage medium for storing computer readable instructions, the computer readable instructions being adapted to implement the steps of the method of claim 7.

14. A non-transitory computer readable storage medium comprising software code adapted to perform the steps of the method of claim 7.

15. A computing and/or data processing device comprising:
- a plurality of computing units, each of the computing units comprising a computing resource;
- each of the computing units further comprising a computing unit access manager, said computing unit access manager controlling access to the computing resource in respect to requests;
- wherein each of the computing unit access managers controls access to each of the respective computing resources based on a token;
- wherein the computing unit access managers are adapted to provide for recovery of or on mismatching responses (votes) if a majority vote is not provided, and wherein reconfiguration majority response (voting) is applied to reconfiguration of the computing unit access managers; and
- each of the tokens comprises a pointer to the respective computing resource, a set of rights relating to the computing resource, and a numerical representation of the respective computing resource or label.

16. The computing and/or data processing device as claimed in claim 15, wherein the numerical representation is encoding of software which provides each respective computing resource.

17. The computing and/or data processing device as claimed in claim 15, wherein the device comprises a network-on-a-chip, is provided on a chip or comprises an integrated chip (IC) or microprocessor.

18. The computing and/or data processing device as claimed in claim 15, wherein provision of the numerical representation of the resource allows the computing unit access manager to control access, such as directly control access, the computing resource or specific resource, without affecting the entire chain, such that independent chains can be created and destroyed as needed or computing units booted and rebooted as required.

19. The method as claimed in claim 9, wherein the number f and hence the active computing units in error-free operation (f+1) and in an error case (2f+1) is adjusted dynamically to reflect the risk of computing units becoming faulty and hence diverge in the response to the at least one request.

* * * * *